United States Patent
Chiang et al.

(10) Patent No.: US 7,340,995 B2
(45) Date of Patent: Mar. 11, 2008

(54) FRUIT RIPENING DISPLAY

(76) Inventors: Chia C. Chiang, 418 N. La Jolla Ave., Los Angeles, CA (US) 90048; Brent D. Sokol, 418 N. La Jolla Ave., Los Angeles, CA (US) 90048

( * ) Notice: Subject to any disclaimer, the term of this patent is extended or adjusted under 35 U.S.C. 154(b) by 365 days.

(21) Appl. No.: 10/920,044

(22) Filed: Aug. 16, 2004

(65) Prior Publication Data

US 2005/0056158 A1 Mar. 17, 2005

Related U.S. Application Data

(60) Provisional application No. 60/495,497, filed on Aug. 15, 2003.

(51) Int. Cl.
*A23B 7/00* (2006.01)
*B65D 81/24* (2006.01)

(52) U.S. Cl. .................. 99/467; 99/472; 220/367.1; 220/23.6; 426/112; 426/118

(58) Field of Classification Search .............. 99/467, 99/472; 206/503, 504, 505, 507, 508, 509, 206/511; 426/112, 118, 395, 419, 124, 106; 220/360, 361, 366.1, 367.1, 368, 371, 373, 220/23.6, 23.4
See application file for complete search history.

(56) References Cited

U.S. PATENT DOCUMENTS

| | | | |
|---|---|---|---|
| 1,126,258 A | 1/1915 | Myers | |
| 1,829,951 A | 11/1931 | Walsh | |
| 1,985,670 A | 12/1934 | Sykes | |
| 2,412,325 A | 12/1946 | Devine et al. | |
| 3,030,212 A | 4/1962 | Hyson et al. | |
| 3,069,274 A | 12/1962 | Concannon | |
| 3,298,511 A | 1/1967 | Schertz | |
| D210,311 S | 2/1968 | Newman | |
| 3,459,116 A * | 8/1969 | McDonnell | ............... 99/485 |
| 3,480,197 A | 11/1969 | Massey | |
| 3,578,464 A | 5/1971 | Mpelkas | |
| 3,620,765 A | 11/1971 | McDonnell et al. | |

(Continued)

FOREIGN PATENT DOCUMENTS

CA 2113230 2/1999

(Continued)

OTHER PUBLICATIONS

Chia C. Chiang et. al., Portions of a Fruit Display, U.S. Appl. No. 29/275,641, (unpublished copending US design patent application), continuation of U.S. Appl. No. 29/223,882, filed Feb. 16, 2005.

(Continued)

*Primary Examiner*—Reginald L. Alexander
(74) *Attorney, Agent, or Firm*—Brent D. Sokol, Esq

(57) ABSTRACT

Apparatuses and methods for ripening and displaying fruit are provided. Methods of making those apparatuses are also disclosed. In one aspect, the apparatuses and methods employ multiple platforms and other features for ripening fruit that increase fruit ripening speed, improve fruit flavor, reduce fruit bruising, and accommodate different ripening rates of different fruit. Other aspects and features disclosed herein further help achieve those goals, and particularly help fruit consumers to ripen store bought fruit.

47 Claims, 49 Drawing Sheets

U.S. PATENT DOCUMENTS

| | | | |
|---|---|---|---|
| 3,924,010 A | 12/1975 | Erb | |
| D244,246 S | 5/1977 | Daenen | |
| D247,945 S | 5/1978 | Saunders | |
| D252,312 S | 7/1979 | Ackeret | |
| D259,400 S | 6/1981 | Carroll et al. | |
| D267,071 S | 11/1982 | Carlson | |
| 4,440,321 A | 4/1984 | Cambell et al. | |
| D273,652 S | 5/1984 | Lederman et al. | |
| D278,674 S | 5/1985 | Tardif et al. | |
| D291,397 S | 8/1987 | Unger | |
| D293,082 S | 12/1987 | Butler | |
| 4,842,875 A | 6/1989 | Anderson | |
| 4,886,372 A | 12/1989 | Greengrass et al. | |
| D305,618 S | 1/1990 | Blaser | |
| D312,555 S | 12/1990 | Daenen et al. | |
| D322,186 S | 12/1991 | Rubbico | |
| D327,394 S | 6/1992 | Scherer | |
| 5,121,877 A | 6/1992 | Bodary et al. | |
| D336,596 S | 6/1993 | Osgood et al. | |
| 5,254,354 A | 10/1993 | Stewart | |
| D346,552 S | 5/1994 | Krupa | |
| 5,316,178 A | 5/1994 | Garber, Jr. | |
| 5,345,784 A | 9/1994 | Bazemore et al. | 62/371 |
| 5,419,153 A | 5/1995 | Hartley | |
| 5,427,808 A | 6/1995 | Adams | 426/419 |
| D360,825 S | 8/1995 | Knoss et al. | |
| 5,438,917 A | 8/1995 | Bolkestein et al. | |
| 5,475,926 A | 12/1995 | Bolkestein et al. | |
| D379,300 S | 5/1997 | Krupa et al. | |
| D380,381 S | 7/1997 | Krupa et al. | |
| 5,658,607 A | 8/1997 | Herdeman | |
| 5,661,979 A | 9/1997 | DeBoer | |
| 5,667,827 A | 9/1997 | Breen et al. | |
| 5,711,978 A | 1/1998 | Breen et al. | |
| 5,758,794 A | 6/1998 | Rider, Jr. et al. | |
| D396,408 S | 7/1998 | Carver | |
| D398,448 S | 9/1998 | Zanni | |
| 5,829,602 A | 11/1998 | St. John Danko | |
| 5,878,881 A * | 3/1999 | Hunt | 206/361 |
| D411,714 S | 6/1999 | Wilson et al. | |
| 5,916,614 A | 6/1999 | Gorlich | |
| 6,013,293 A | 1/2000 | De Moor | 426/106 |
| 6,074,676 A * | 6/2000 | Cadiente et al. | 426/106 |
| 6,135,307 A | 10/2000 | Fahy | |
| 6,168,044 B1 * | 1/2001 | Zettle et al. | 220/784 |
| D442,031 S | 5/2001 | Perez | |
| D442,834 S | 5/2001 | Perez | |
| 6,376,032 B1 | 4/2002 | Clarke et al. | |
| 6,409,041 B1 * | 6/2002 | Overholt et al. | 220/669 |
| 6,527,121 B1 | 3/2003 | Flynn | |
| 6,548,132 B1 | 4/2003 | Clarke et al. | |
| D475,621 S | 6/2003 | Buchalski et al. | |
| D475,897 S | 6/2003 | Zettle et al. | |
| D476,506 S | 7/2003 | Sneider | |
| 6,625,991 B1 * | 9/2003 | Clark | 62/3.6 |
| 6,651,445 B1 | 11/2003 | Clark et al. | |
| D487,698 S | 3/2004 | Rasmussen | |
| D494,062 S | 8/2004 | Willis | |
| 7,017,775 B2 * | 3/2006 | Zettle et al. | 220/781 |
| D533,394 S | 12/2006 | Chiang et al. | |
| 2002/0090425 A1 | 7/2002 | Clarke | |
| 2002/0127305 A1 | 9/2002 | Clarke | |

FOREIGN PATENT DOCUMENTS

| | | |
|---|---|---|
| CN | 1306748 A | 8/2001 |
| DE | 2259561 | 6/1974 |
| DE | 3219079 A1 | 11/1983 |
| EP | 0162674 A2 | 11/1985 |
| EP | 0282180 A2 | 9/1988 |
| EP | 0417947 A1 | 3/1991 |
| EP | 0636555 A1 | 7/1993 |
| EP | 0438210 B1 | 11/1995 |
| EP | 1092649 A1 | 4/2000 |
| ES | 2008626 A6 | 7/1987 |
| FR | 2242872 | 3/1975 |
| GB | 2215173 A | 9/1989 |
| GB | 2223656 A | 4/1990 |
| HK | 0500356.9 | 6/2005 |
| HK | 0500357.1M001 | 6/2005 |
| HK | 0500357.1M002 | 6/2005 |
| HK | 0500357.1M003 | 6/2005 |
| HK | 0500357.1M004 | 6/2005 |
| HK | 0500328.0M001 | 9/2005 |
| HK | 0500328.0M002 | 9/2005 |
| HK | 0500328.0M003 | 9/2005 |
| JP | 64-84871 A | 3/1989 |
| JP | 64-85064 A | 3/1989 |
| JP | 11-46677 A | 2/1999 |
| JP | D1068100 S | 4/2000 |
| JP | 2000(12)-300174 A | 10/2000 |
| TW | 286124 | 9/1996 |
| WO | WO 99/46175 | 9/1999 |
| WO | WO 03/043447 A1 | 5/2003 |

OTHER PUBLICATIONS

Chia C. Chiang et. al., Portions of a Fruit Ripening Display, U.S. Appl. No. 29/250,630, (unpublished copending US design patent application), continuation of U.S. Appl. No. 29/223,882, filed Feb. 16, 2005, Revised Drawings.

Chia C. Chiang et. al., Vent and Base Portions of a Fruit Ripening Display, U.S. Appl. No. 29/223,882, filed Feb. 16, 2005 (unpublished copending US design patent application): Revised Drawings and Claim Amendment.

Chia C. Chiang et al., Portions of a Fruit Ripening Container U.S. Appl. No. 29/224,068, filed Feb. 23, 2005 (unpublished copending US design patent application): Revised Drawings and Claim Amendment.

Chia C. Chiang et. al., Base Portions of a Fruit Ripening Display, U.S. Appl. No. 29/250,628, (unpublished copending US design patent application), continuation of U.S. Appl. No. 29/223,882, filed Feb. 16, 2005.

Chia C. Chiang et. al., A Vent Portion of a Fruit Ripening Display, U.S. Appl. No. 29/250,629, (unpublished copending US design patent application), continuation of U.S. Appl. No. 29/223,882, filed Feb. 16, 2005.

Chia C. Chiang et. al., Portions of a Fruit Ripening Display, U.S. Appl. No. 29/250,630, (unpublished copending US design patent application), continuation of U.S. Appl. No. 29/223,882, filed Feb. 16, 2005.

Chia C. Chiang et al., Portions of a Fruit Ripening Container, U.S. Appl. No. 29/250,626, (unpublished copending US design patent application), continuation of U.S. Appl. No. 29/224,068, filed Feb. 23, 2005.

Chia C. Chiang et. al., Features of a Fruit Ripening Display, U.S. Appl. No. 29/223,882, filed Feb. 16, 2005 (unpublished copending US design patent application).

Chia C. Chiang et al., Features of a Fruit Ripening Display, U.S. Appl. No. 29/224,068, filed Feb. 23, 2005 (unpublished copending US design patent application).

Chia C. Chiang et al., Platter and Base, U.S. Appl. No. 29/224,069, filed Feb. 23, 2005 (unpublished copending US design patent application).

Chia C. Chiang et al., Platter and Base, U.S. Appl. No. 29/224,073, filed Feb. 23, 2005 (unpublished copending US design patent application).

Mitcham, Beth, "Optimum Procedures for Ripening Apples," Perishables Handling Newsletter, Nov. 1994, all pages, Issue No. 80, U.S.A.

Arpaia, Mary Lu, "Optimum Procedures for Ripening Avocados," Perishables Handling Newsletter, Nov. 1994, all pages, Issues No. 80, U.S.A.

Kader, Adel, et al., "Optimum Procedures for Ripening Bananas," Perishables Handling Newsletter, Nov. 1994, all pages, Issue No. 80, U.S.A.
Crisosto, Carlos, "Optimum Procedures for Ripening Kiwifruit," Perishables Handling Newsletter, Nov. 1994, all pages, Issue No. 80, U.S.A.
Kader, Adel, et al., "Optimum Procedures for Ripening Mangos," Perishables Handling Newsletter, Nov. 1994, all pages, Issue No. 80, U.S.A.
Cantell, Maria, "Optimum Procedures for Ripening Melons," Perishables Handling Newsletter, Nov. 1994, all pages, Issue No. 80, U.S.A.
Mitcham, Beth, "Optimum Procedures for Ripening Pears," Perishables Handling Newsletter, Nov. 1994, all pages, Issue No. 80, U.S.A.
Cantwell, Maria, "Optimum Procedures for Ripening Peppers," Perishables Handling Newsletter, Nov. 1994, all pages, Issue No. 80, U.S.A.
Crisosto, Carlos, "Optimum Procedures for Ripening Stone Fruit," Perishables Handling Newsletter, Nov. 1994, all pages, Issue No. 80, U.S.A.
Cantwell, Maria, "Optimum Procedures for Ripening Tomatoes," Perishables Handling Newsletter, Nov. 1994, all pages, Issue No. 80, U.S.A.
Konig, Ross E., "Fruit Ripening," Plant Physiology Information Website, © 1994 (copyright and citation p. 4 before effective date), all pages http://plantphys.info/plants_human/fruitgrowripe.html, U.S.A.
Kitinoja, Lisa et al., "Ripening," UC Davis Postharvest Horticulture Series No. 8, Mar. 1995, entire document and last page with ripening bowl, University of California—Davis, Postharvest Technology Research and Information Center, Davis, California, U.S.A.
Kitinoja, Lisa, et al., "Small-scale Postharvest Handling Practices—A Manual for Horticultural Crops—3rd Ed.," Postharvest Horticulture Series No. 8—Mar. 1995, entire page—except from Section 9 on Ripening, University of California—Davis, Postharvest Technology Research and Information Center, Davis, CA, U.S.A.
Produce Marketing Association, "Ethylene Gas," AboutProduce.com FAQ, © 2000 (copyright before effective date), all pages, http://www.aboutproduce.com/faq/ethylene.html, U.S.A.
Kader, Adel, et al., "Storing Fresh Fruits and Vegetables for Better Taste," Poster and Text published by Postharvest Technology Research and Information Center, Department of Pomology, University of California, Davis, Jan. 10, 2000, entire page and Countertop Storage section, Davis, California, U.S.A.
Brody, Aaron J., "Smart Packaging Becomes Itellipac™," Food Technology, Jun. 2000, vol. 54, No. 6, p. 104-107, U.S.A.
Marks, Michael, "Fresh Tips," LamasBeauty.com, Jul. 2000 column, all pages, http://www.lamasbeauty.com/lifestyle/july00/freshtips2-print.html, U.S.A.
RETROMODERN.COM, "Lobo Fruit Bowl / Bread Basket design year 1977," http://www.retromodern.com, © 2000-2001 (copyright before effective date), all, U.S.A.
Green, Dennis, Produce Tips, Mr. Greene's Produce Tips, © 2001 (copyright before effective date), all pages http://www.dennisgreenltd.com/ExtraLifeClub/tips_2.html, Englewood, CO, U.S.A.
Marty, Isabelle, "The Secrets of Fruit Ripening Press Release," Service de Presse et Relations Publiques, Institut National de la Recherche Agrononique, Jun. 2002, all pages, Paris, France.
CATOLOGCITY.COM, "Kitchen Basket—Banana Tree," http://amos.catalogcity.com.cc?main=catalog&pcd=4328503&prd=6291163&ccsyn=22, Jan. 22, 2003, all, U.S.A.
CATALOGCITY.COM, "Ripen-Right Fruit Bowl," www.http://amos.catalogcity.com/cc.class/cc?main=catalog&pcd=4989142&prd=7194690&ccsyn=22, Jan. 22, 2003, all, U.S.A.
TABLETOOLS.COM, "Filio Fruit Tray, by Mono Table Top," http://www.tabletools.com/tabletools/showdetl.cfm?&DID=G&user_ID=2327780&st=5803, Feb. 2, 2003, all, U.S.A.

DESIGNSTORE.COM, "Rosendahl stainless steel fruit dish," http://www.designstore.com/rosstainsteel.html, Feb. 2, 2003, all, U.S.A.
SURPRISE.COM, "Fruit Ripening Bowl," http://surprise.com/food/foodie/fruit_ripening-bowl.cfm, Feb. 2, 2003, all, U.S.A.
STARTSAMPLING.COM, "Hammacher Ripening Bowl," http://www.startsampling.com/SIProduct.iphtml?name=Ripening%20Bowl, Feb. 3, 2003, all, U.S.A.
CATALOGCITY.COM, "Spathe Bowl," http:r2.us.rmi.yahoo.com/rmi/http://amos.catalogcity.com/cc.class/cc/rmivars?target=top?main=catalog&pcd=2921396&ccsyn, Feb. 4, 2003, all, U.S.A.
CATOLOGCITY.COM, "Fruit Bowl—Natural Wood," http:r2.us.rmi.yahoo.com/rmi/http://amos.catalogcity.com/cc.class/cc/rmivars?target, Feb. 4, 2003, all, U.S.A.
Techno Scout, "Fruit Saver Advertisement," Parade Magazine, Feb. 9, 2003, Parade Publications, N.Y., U.S.A.
First Capital Craft Mall & Family Ties, "Banana Hanger," http://imagineifyouwill.site.yahoo.net/bananahanger.html. Feb. 11, 2003, all, U.S.A.
TABLETOOLS.COM, "Top Serve Container," http://www.tabletools.com/tabletools/showdetl.cfm?&DID=G&Product_ID=2940&CATID, Feb. 11, 2003, all, U.S.A.
TARGET.COM, "Arthur Court Kitchen Banana & Fruit Bowl," http://www.target.com/gp/detail.html/sr=1-1/qid=1044982115/ref=sr_1_/601-9410451_73..., Feb. 11, 2003, all, U.S.A.
EBAY.COM, 70's "Space Age Terrarium Fruit Ripener," http://cgi.ebay.com/wseBayISAA.d117ViewItem&item=2306242466&Category=367, Feb. 12, 2003, all, U.S.A.
KITCHENCLASSICS.COM, "The Ingenious Kitchen Tool"—Koller-Craft Fruit Ripener, http://kitchen-classics.com/fruitripener.html, Feb. 12, 2003, all, U.S.A.
Koller-Craft Plastic Products, "How It Works," Product Insert for Koller-Craft Fruit Ripener, Feb. 12, 2003 or earlier, Koller-Craft Plastic Products, Fenton, MO, U.S.A.
Stedelijk Museum, "Gij's Bakker Flow (Fruit Bowl) 2000-2002," Stedelijk Museum Bulletin, Apr. 2003, p. 37, photo, Netherlands.
Reid, Michael S., "Biology of Ethylene Production & Action," Management of Fruit Ripening, Apr. 2003, pp. 8-9 and Index of Topics, U.C. Davis Postharvest Technology Research and Information Center, Davis, California, U.S.A.
Kader, Adel A., "Fruit Maturity, Ripening and Quality Relationships," Management of Fruit Ripening, Apr. 2003, pp. 3-7, U.C. Davis Postharvest Technology Research and Information Center, Davis, California, U.S.A.
Thompson, James F., "Ripening Facilities," Management of Fruit Ripening, Apr. 2003, pp. 16-131, U.C. Davis Postharvest Technology Research and Information Center, Davis, California, U.S.A.
GIFCO, Gift Consultant Magazine, 1999, p. 203 93823S, Japan.
Chia C. Chiang et. al., Portions of a Fruit Ripening Container, U.S. Appl. No. 29/282,887, (unpublished copending US design patent application) filed Jul. 31, 2007, continuation of U.S. Appl. No. 29/250,629, filed Nov. 23, 2006, in turn a continuation of U.S. Appl. No. 29/223,882, filed Feb. 16, 2005.
Chia C. Chiang et al., Portions of a Fruit Ripening Display, U.S. Appl. No. 29/282,889, (unpublished copending US design patent application) filed Jul. 31, 2007, continuation of U.S. Appl. No. 29/250,629, filed Nov. 23, 2006, in turn a continuation of U.S. Appl. No. 29/223,882, filed Feb. 16, 2005.
Chia C. Chiang et al., Portions of a Fruit Display, U.S. Appl. No. 29/282,891, (unpublished copending US design patent application) filed Jul. 31, 2007, continuation of U.S. Appl. No. 29/250,626, filed Nov. 23, 2006, in turn a continuation of U.S. Appl. No. 29/224,068, filed Feb. 23, 2005.
Chiang, Sokol, Knapp, Draft Liivia Fruit Ripener Quick Start Guide, Jul. 2007 (Unpublished), entire document.
Chiang, Sokol, Knapp, Draft Liivia Fruit Ripener: Real Technology instruction manual, Jul. 2007 (Unpublished), entire document.

* cited by examiner

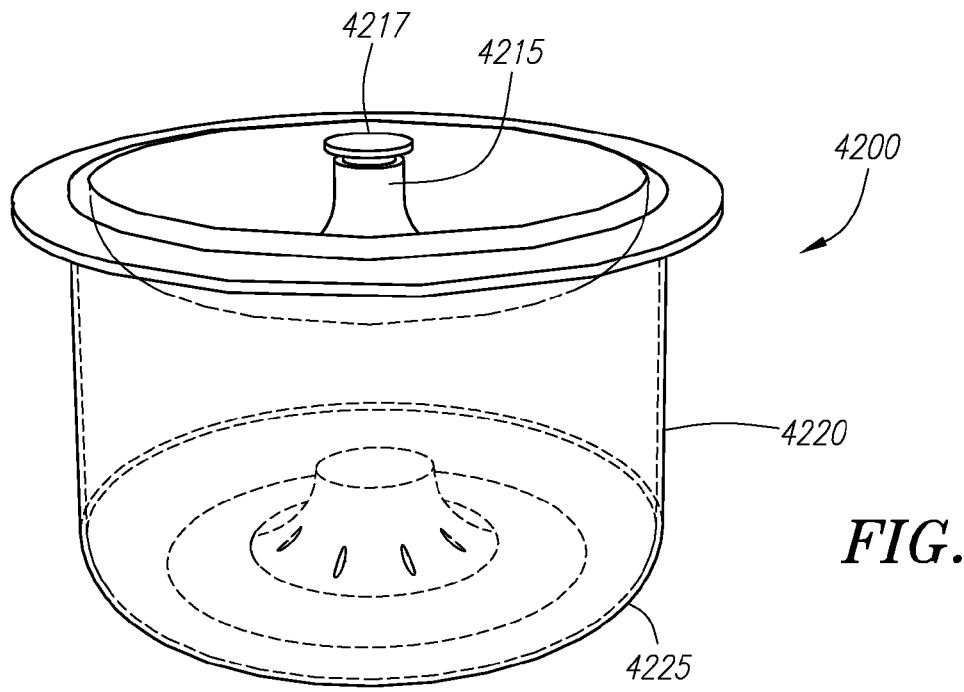
*FIG. 42a*
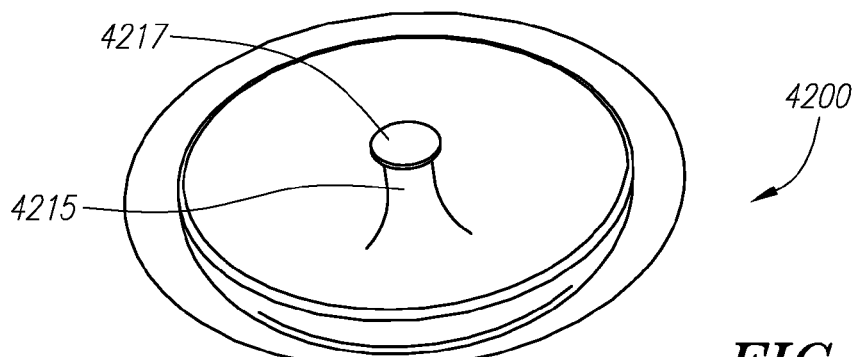
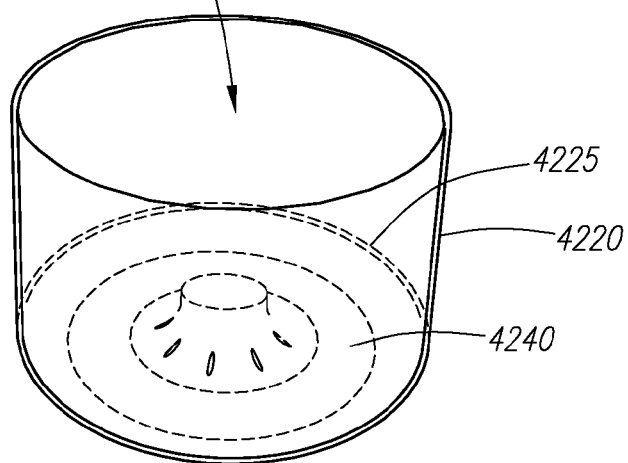
*FIG. 42b*

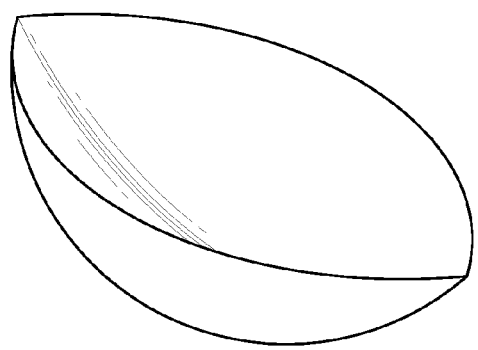
*FIG. 48*
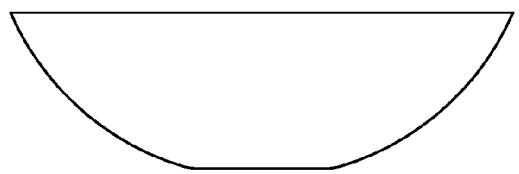
*FIG. 49*
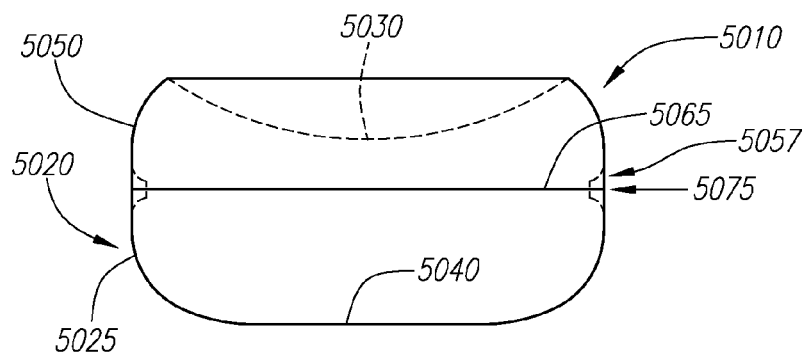
*FIG. 50*
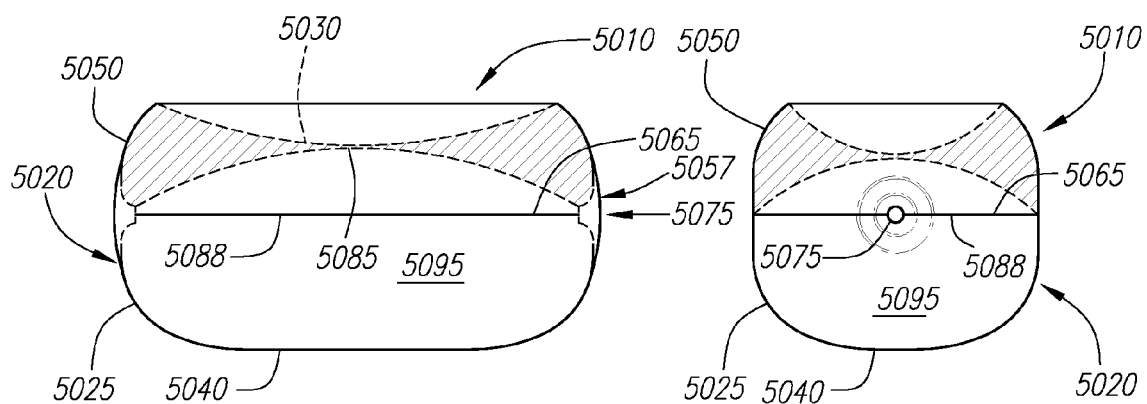
*FIG. 51*  *FIG. 52*

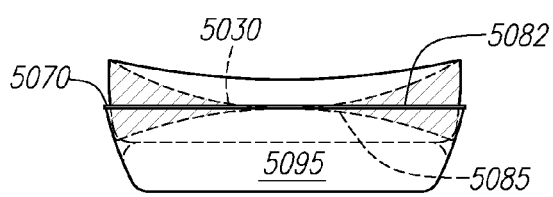
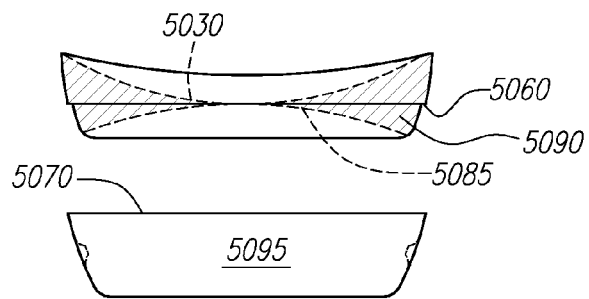
FIG. 53              FIG. 54
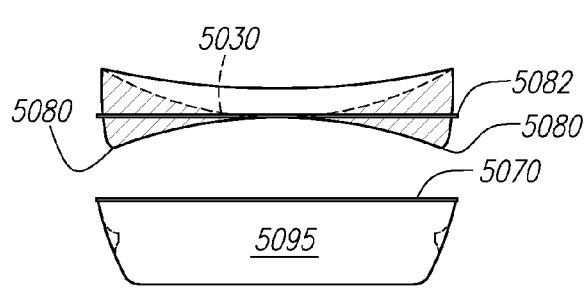
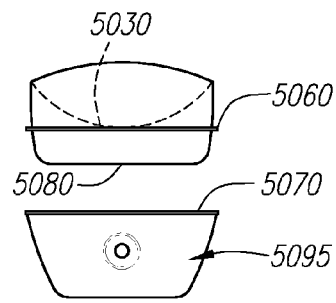
FIG. 55              FIG. 56
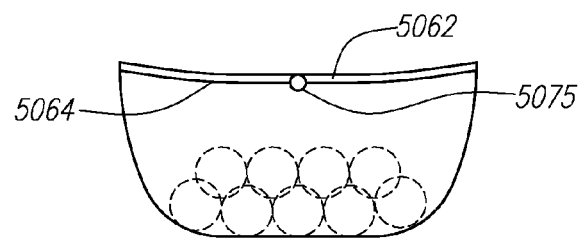
FIG. 57

FRUIT RIPENING DISPLAY

CROSS-REFERENCE TO RELATED APPLICATION

The present application claims priority to U.S. provisional application No. 60/495,497, filed Aug. 15, 2003, by Chiang et. al., which is incorporated by reference herein.

BACKGROUND

Supermarkets and other fruit sellers often sell fruit that isn't ripe. There are several reasons for this. For one, fruit sellers are concerned that their fruit inventory will rot on the shelf or in storage before they can sell it. Additionally, fruit transporters are concerned that ripe fruit will bruise or damage during transport. Consequently, supermarkets and other fruit retailers purchase and receive unripe fruit to avoid damage during shipment and to minimize spoilage before the fruit is sold. These practices have become more prevalent in recent years as supermarket consolidation and centralized buying requires fruit to travel farther in order to reach the store. As a result, purchasers are often offered fruit that is not ripe enough for their purposes or ready to eat.

Yet many fruit purchasers want to eat their fruit soon after they purchase it. And they want their fruit to taste the best that it can taste. To this end, they sometimes place their fruit in paper bags or in a ripening dome to ripen. Or they may ripen the fruit by keeping it in a warm place, exposed to the air.

Various attempts to address these problems can be seen in fruit holders: a Filio Fruit Tray by Mono Tabletop comprises a brushed 18/10 stainless steel sheet that has been bent into a wave profile; a Rosendahl stainless steel fruit dish comprises polished matte 18/08 stainless steel that has been bent into a curve profile with two rectangular legs that form two of its sides; a Lobo fruit bowl/bread basket comprises a square sheet of stainless steel having its sides elevated to form a receptacle having a gradual slope; Stacks and Stacks offers a banana tree/fruit bowl comprising an open chrome wire basket for storing fruit and an integral hook for suspending bananas; Stacks and Stacks also offers a fruit bowl made of natural wood having aluminum legs; and Gumps's of San Francisco offers a bowl made of an unwound coconut palm spathe having four legs.

Yet these fruit holders ignore an important principle of fruit ripening: exposure to concentrated ripening gas accelerates fruit ripening and improves fruit flavor. Fruit falls into two categories: 1) fruit that can continue the ripening process after harvesting and 2) fruit that cannot continue the ripening process after harvesting. Fruits that can continue ripening after harvesting are called climacteric fruits. They include many of the most popular fruits including apples, banana, pears, plums and peaches. After harvesting, these fruits continue to respire and naturally produce their own fruit ripening gas—ethylene.

Since at room temperature ripening gas accelerates fruit ripening and improves fruits flavor, it is desirable to retain such gas in a chamber along with fruit that needs to be ripened. If the chamber is appropriately ventilated, the fruit will continue to ripen, which in turn will generate more ripening gas. This creates a positive feedback loop of fruit ripening.

Yet each of the foregoing fruit holders lacks a chamber for retaining fruit ripening gas. They also only have one fruit-ripening environment. As a result, these fruit holders have at least the following disadvantages: they do not exceptionally accelerate fruit ripening, they only marginally improve the taste of the fruit, they do not accommodate variations in ripening rates of different fruits, and they do not readily allow the user to change the ripening rates for select fruit.

For over twenty years fruit holders with domed tops and chambers for retaining ripening gas have been described or offered: Hammacher-Schlemmer describes a "ripening bowl" comprising a clear dish with a clear bell-shaped top containing ventilation holes. According to Hammacher-Schlemmer, the "ripening bowl" is "specially designed with a domed lid that provides an ideal climate"; U.S. Des. Pat. No. 247,945, awarded to Saunders in 1978, shows a design for a ripening bowl with ventilation holes. The bowl has a convex bell-shaped top containing ventilation holes; the Koller-Craft division of Koller Enterprises, Inc. has manufactured a fruit holder with a domed top and chamber for retaining ripening gas. According to Koller-Craft, Inc. the design provides "proper" circulation; U.S. Des. Pat. No. 273,652, awarded to Lederman et al. in 1984, shows a design for a fruit ripener having a bottom with several ventilation holes and a dome top with one principal and several smaller ventilation holes; Japanese reference JP1085064 A, published Mar. 30, 1989, and assigned to Matushita Electric Works Ltd., describes containers with plastic domes, and plastic bags, for ripening fruits in which a ripening gas source is placed "in a case for housing fruits"; The University of California-Davis' March 1995 publication, PostHarvest Horticulture Series No. 8, recommends ripening fruit by placing it into a domed bowl made of clear molded plastic having ventilation holes around the top. Alternately, the publication recommends placing fruits in a paper bag to ripen them.

Yet these fruit holders featuring a "ripening dome" and a single support surface for ripening fruit have at least the following disadvantages: they do not accommodate variations in ripening rates of different fruits; they do not readily allow the user to change the ripening rates for select fruit; they do not substantially reduce bruising caused by stacking and rolling, and they do not always provide the best fruit flavor and hydration.

Various other apparatuses and materials have been described, although their inclusion in this Background is not an admission that they are prior art or analogous art with respect to the inventions disclosed herein. All references in this Background section, however, are hereby incorporated by reference as though fully set out herein, including the following references: U.S. Pat. No. 1,985,670, issued Jun. 16, 1934 to Sykes, describes "ripe fruit corrugated packing trays" designed for packaging and shipping ripe fruit; U.S. Pat. No. 3,069,274, issued Dec. 18, 1962 to Concannon, describes a protector and ripener for fruit, including a polyethylene foam cushion or wrapper impregnated with ethylene dichloride; European Patent Application No. 85303471.8, published Nov. 27, 1985, assigned to Russo et al., describes an apparatus and process for removing carbon dioxide from ripening rooms and "an ethylene injector," including a "cylinder holder" for holding a pressurized ethylene gas cylinder suitable for discharging into ripening rooms (1,000 cu. Ft. to 20,000 cu. ft); Japanese reference, JP1094871, published Mar. 30, 1989 and assigned to Oishi Sangyo KK, describes ripe kiwi fruit "packaging trays" "consisting of a plurality of fruit receiving bowls." The "packaging trays" may be "stacked" upon insertion of kiwi fruit that is fully ripe; U.S. Pat. No. 4,886,372, issued December 1989 to Greengrass et al., and EPO Application 0 282 180 A2, also to Greengrass et al., describe plastic material "containers, bags and encasements" with "microperforations," used for produce; Japanese reference JP4210523, published Jul. 31, 1992, assigned to BOC Group PLC, describes a "foldable container" for storing or ripening agricultural products, and having a mechanism for "circulating specified atmosphere around the inside of the container"; U.S. Pat. No. 5,254,354, issued Oct. 19, 1993 to Stewart, describes food packages comprised of a polymer having thermally responsive permeability; U.S. Pat. No. 5,316,178, issued May 31, 1994 to Garber Jr., describes a fruit ripening system that comprises a fruit ripening ethylene gas storage and dispensing system and container; Perishables Handling Newletter, Issue No. 80, November 1994, discusses optimum procedures for ripening various types of fruit; U.S. Pat. No. 5,661,979, issued Sep. 7, 1997 to DeBoer, describes a domed, self-contained fruit storage apparatus and display device with refrigeration; Likewise, J/K Management Services has displayed an electric appliance comprising a bowl with a clear top. The appliance, marketed as the "Fruit Saver," uses a microchip processor to circulate cool air around the fruit, reportedly to "extend the life of fresh fruit."; U.S. Pat. No. 5,667,827, issued Sep. 16, 1997, and U.S. Pat. No. 5,711,978, issued Jan. 27, 1998, both to Breen et al., describe methods of packaging using an overwrapped "packing tray" with side holes; Japanese reference, JP11046677, published Feb. 23, 1999, assigned to T K Supply KK; Tatsuno Cork Kogyo KK, describes a "packaging container for vegetables and fruits, that is suitable for containing and transporting vegetables and fruits, particularly full-ripe vegetables and fruits." It comprises "a container made of a synthetic resin foam," a "lid" having an opening closed with "an oxygen permeable sheet material," and an ethylene absorber; U.S. Pat. No. 5,916,614, issued Jun. 29, 1999 to Gorlich, describes "dual state" food packaging with a "tray having a peripheral flange adapted to receive a pair of membranes to enclose the tray"; U.S. Pat. No. 6,013,293, issued Jan. 11, 2000 to De Moor, describes "packaging of fruit and vegetables" using "an atmosphere-control member comprising a gas-permeable membrane and an apertured cover member over the membrane; Chinese reference CN1306748 A, published Aug. 8, 2001 and assigned to Yang Lan, describes a gaseous fruit and vegetable ripener that compresses ethylene gas into a seamless bottle having a depression-releasing mouth and a regulator; U.S. Pat. No. 6,548,132 B1, issued Apr. 15, 2003 to Clarke et al., describes "gas permeable membranes used in packaging fresh cut fruit and vegetables" and various ripening agents; and U.S. Pat. No. 6,376,032 B1, issued Apr. 23, 2003 to Clarke et al., describes "gas permeable membranes used in packaging fresh cut fruit and vegetables." Finally, various publications of the University of California, Davis provide information on fruit ripening for particular types of fruits: Storing Fresh Fruits and Vegetables for Better Taste, Post Harvest Research and Information Center, Department of Pomology at UC Davis, published Jan. 10, 2000; Management of Fruit Ripening, published April 2003 by University of California Davis Post Harvest Research and Information Center; other publications include various Web site printouts: Ethylene Gas, from www.aboutproduce.com, printed Aug. 13, 2004; Mrs. Green's Produce Tips, from www.dennisgreenltd.com, printed Aug. 13, 2004; The Secrets of Fruit Ripening, from www.inra.fr, published June 2002, and printed Nov. 27, 2003; Fresh Tips by Michael Marks, from www.lamasbeauty.com, printed Aug. 13, 2004 and published July 2000; and Fruit Ripening, from www.planthpys.info, printed Nov. 27, 2003.

Like the other references and fruit holders described above, these references do not solve the need for improved fruit ripening displays.

Therefore, for all the foregoing reasons, there is a need for an apparatus and method for ripening and displaying fruit that can separately accommodate fruits with different ripening rates or levels of ripeness, permit the user to readily change the ripening rates for select pieces of fruit, and reduce bruising of the fruit. And there is a need to do all of this while accelerating fruit ripening and greatly improving fruit flavor and hydration.

SUMMARY

Applicants provide a simple solution to the problem of ripening hard, unripe fruit. In a first aspect, applicants solve each of the foregoing problems through the use of multiple support surfaces for ripening fruit. This aspect allows fruit purchasers to easily control the ripening process. Moreover, in contrast to prior teachings, such ripening displays may comprise a chamber for retaining ripening gas that is substantially hemispherical, or another non-domed shape, to improve fruit flavor and hydration. After ripening, each support surface may be separately used as part of a traditional fruit bowl. Thus, the applicants provide, in one aspect, multi-support surface apparatuses and methods for ripening and displaying fruit.

According to this aspect, an apparatus for fruit ripening and display may comprise two or more display parts that, when combined, form at least one chamber for retaining ripening gas. The apparatus also has two or more support surfaces for ripening fruit. At least one of these is located inside a chamber for retaining ripening gas. At least one other support surface for ripening fruit is located outside of the chamber for retaining ripening gas. The support surface located outside the chamber is at least in part concave and at least in part inwardly sloping to reduce fruit rolling and bruising and to increase fruit stability.

Surprisingly, the apparatus' chamber for retaining ripening gas may take a variety of non-domed shapes and still improve fruit flavor and hydration and accelerate ripening. In a preferred embodiment, at least one chamber for retaining ripening gas is substantially hemispherical.

This first aspect also teaches several methods or ripening and displaying fruit to help fruit buyers to solve their ripening problems. One method for ripening fruit according to this aspect comprises the steps of: a) placing fruit on a display part's fruit support surface for ripening; b) combining that display part with another display part thereby substantially enclosing the fruit support surface within a chamber for retaining ripening gas; c) at least partly separating the two display parts after a period of time; d) removing at least one piece of fruit from the fruit support surface; e) recombining the display parts thereby substantially enclosing the fruit support surface in the chamber for retaining ripening gas f) placing the removed fruit on a display part's support surface that is located outside the chamber.

Another method for ripening fruit according to this aspect comprises the steps of: a) placing unripe fruit on a support surface located inside a bottom display part; b) placing a top display part over the bottom display part thereby enclosing the unripe fruit in a ventilated chamber; c) arranging fruit that cannot be ripened or ripe fruit on the top part's fruit support surface; d) visually inspecting the fruit located inside the bottom display part through a transparent surface of a display part; e) removing the top display part from the bottom display part; e) inspecting the fruit by touch or smell to confirm ripeness; f) removing ripe fruits from the bottom part's fruit support surface and leaving unripe fruit on the same fruit support surface; g) placing a top display part over the bottom display part; and h) placing the removed fruit on the top display part's fruit support surface located outside the bowl. Optionally, the method may include the step of separating the top display part and bottom display part and using them separately like traditional fruit bowls once all the fruit is ripe. In a preferred method, in another step unripe fruit is added to the bottom display part's fruit support surface while it still supports fruit that has ripened for a time in the ventilated chamber. This helps accelerate ripening and promotes flavor development of the newly introduced fruit in the chamber as compared to wholesale replacement of ripe fruit with the new fruit. The apparatuses and methods herein may thus help fruit purchaser to readily organize their fruit and execute a ripening schedule.

The steps of the foregoing methods may be performed sequentially or in some other order. They may be performed on fruit display comprising a non-domed chamber for retaining ripening gas.

The first aspect also contemplates specific methods of making an apparatus for ripening and displaying fruit: A method for making the apparatus for fruit ripening and display comprising the steps of blowing glass in the shape of a first and second display parts; forming a hole in the first display part with a core-drill; burning or drilling holes in the second display part. Alternately, the invention contemplates a method for making the apparatus for fruit ripening and display comprising the steps of injection molding first and second display parts and their support surfaces.

Other aspects also improve the apparatuses and methods for ripening and displaying fruit. In a second separate aspect, the applicant provides materials for concentrating a ripening gas in a vessel chamber, while preserving moisture and permitting oxygen and carbon dioxide transfer.

In a third separate aspect, the applicant provides a holder for holding a ripening agent or ripening agent unit.

In a fourth separate aspect, the applicant provides structural skeleton and skin apparatuses and related methods for ripening, displaying or containing fruit.

In a fifth separate aspect, the applicant provides a ripener comprising one or more fruit support surfaces having fruit guides.

In a sixth separate aspect, the applicant provides a multi-walled apparatus and related methods for ripening, displaying and/or containing fruit.

Each of these aspects may be used in permutation and combination with one another. Further embodiments as well as modifications, variations and enhancements are also described herein.

BRIEF DESCRIPTION OF THE DRAWINGS

FIGS. 42a-b shows a perspective view of an apparatus for fruit display comprising a first display part and a second display part in closed and open configurations.

FIG. 48 is a perspective view of an apparatus for fruit display second display part.

FIG. 49 is a side elevation view of an apparatus for fruit display second display part.

FIG. 50 is a side elevation view of an apparatus for fruit display

FIG. 51 is a side elevation view of an apparatus for fruit display.

FIG. 52 is a side elevation view of the apparatus for fruit display of FIG. 51, rotated ninety degrees about its vertical axis.

FIG. 53 is a side elevation view of an apparatus for fruit display.

FIG. 54 is a side elevation view of the apparatus for fruit display with the first and second display parts separated.

FIG. 55 is a side elevation view of an apparatus for fruit display.

FIG. 56 is a side elevation view of the apparatus for fruit display of FIG. 55, rotated ninety degrees about its vertical axis.

FIG. 57 is a side elevation view of an apparatus for fruit display.

DETAILED DESCRIPTION

Definitions

"Balancing surface" is defined as any surface area that supports the first display part when it is separately balanced.

"Base part" is defined as an apparatus member that rests on a tabletop or other resting surface while supporting another display part.

"Chamber wall" is defined as any surface that partly or fully defines the shape of a chamber.

"Display" means viewing fruit within a chamber for retaining ripening gas or while the fruit is supported on a support surface at room atmosphere.

"Display part" is defined as an apparatus member. Some "display parts" are "base parts."

"Elliposidal" describes any geometric shape whose plane sections are all either ellipses or circles.

"Ellipsoidal" describes any geometric shape whose plane sections are all ellipses. A circle is a type of ellipse.

Platform top means a first display part that does not have walls extending down past the lowest point on the underside of a fruit support surface for ripening fruit.

Non-domed is defined as not spherical.

"Ripening gas" is defined as ethylene or any other gas that causes fruit to ripen.

"Support surface for fruit" is defined as any surface that supports fruit. It may support the fruit laterally, from above, from below, or any combination thereof.

"Ripening" may occur within a chamber for retaining ripening gas or in room atmosphere.

"Spheroidal" describes an ellipsoid that is generated by revolving an ellipse around of its axes.

First Aspect

Figure 1:
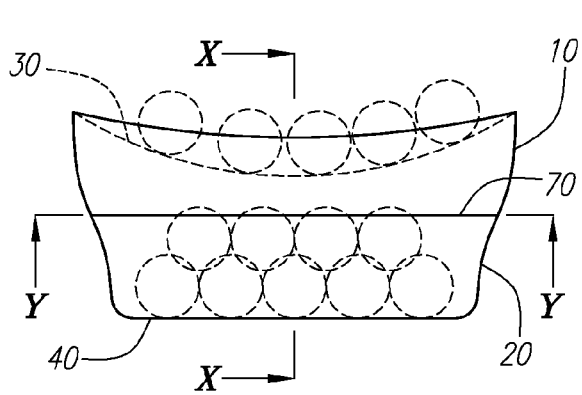
FIG. 1 is a side elevation view of an apparatus for fruit display.

According to the first aspect, an apparatus for fruit display's fruit platform area is uniquely increased thereby reducing risk of bruising and over ripening of select fruit while maintaining close fruit proximity for ripening other select fruit. This aspect provides a ripening display that has at least two support surfaces for ripening fruit. A preferred embodiment of a ripening display and a method for displaying and ripening fruit according to this aspect is illustrated, by way of example, in FIGS. 1-2. As shown in FIG. 1, the embodiment comprises a first display part 10 and a second display part 20. Together the first display part 10 and the second display part 20 create a fruit ripening chamber with the first display part 10 providing a first support surface for ripening fruit 30 and the second display part 20 providing a second support surface for ripening fruit 40.

Figure 2:
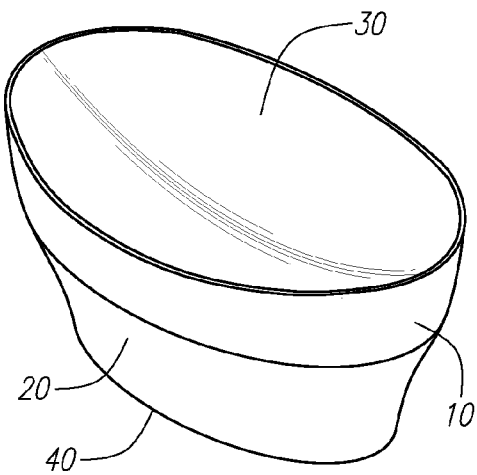
FIG. 2 is a perspective view of the apparatus for fruit display of FIG. 1
Figure 3:
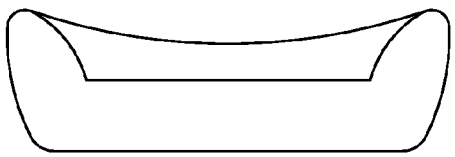
FIG. 3 is a cross-section view of an apparatus for fruit display, taken through a y-y plane.
Figure 4:
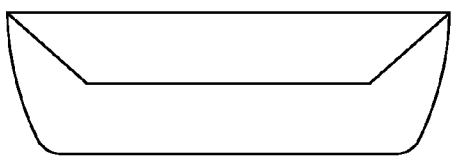
FIG. 4 is a cross-section view of an apparatus for fruit display, taken through a y-y plane.
Figure 5:
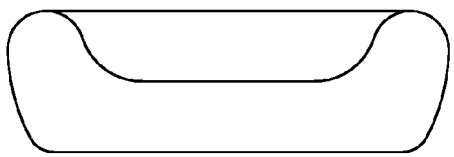
FIG. 5 is a cross-section view of an apparatus for fruit display, taken through a y-y plane.

Although the first and second display parts shown herein are top and bottom parts, in each embodiment disclosed in this application they may be side parts (such as parts that combine laterally thereby splitting the chamber in a vertical rather than horizontal plane), a combination of side part, top part and/or bottom part, or some other variation. Unlike prior fruit holders, which employ a dome-shaped top (reportedly for purposes of moisture retention and air circulation) this aspect teaches a first display part having a concave support surface for ripening fruit 30. According to this aspect, ripe fruit, fruit that ripens quickly or fruit that is being kept (such as fruit kept for accelerated ripening in the future) can be stored on the first display part's fruit support surface 30 to selectively regulate fruit ripening rates. FIG. 2 provides a perspective view of the embodiment shown in FIG. 1.

Figure 6:
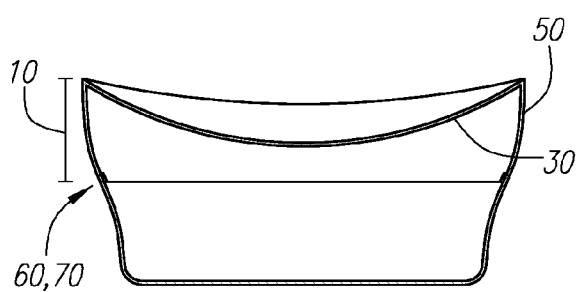
FIG. 6 is a cross-section view of the apparatus for fruit display of FIG. 1, taken through the y-y plane.
Figure 7A:
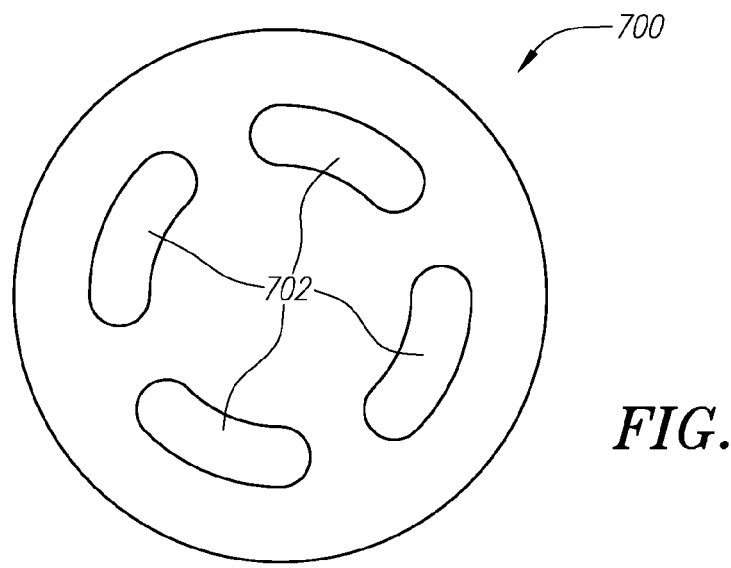
FIGS. 7a-d shows a top plan, perspective view, front elevation, and side elevation of a vent insert.
Figure 7B:
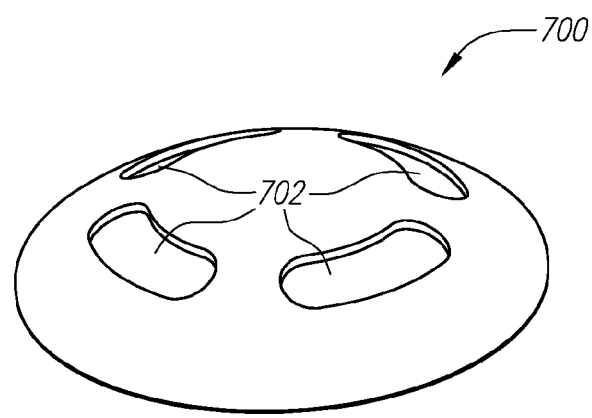
Figure 7C:
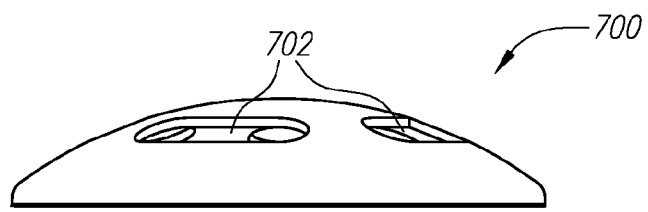
Figure 7D:
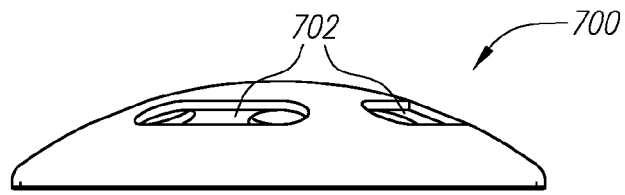
Figure 8A:
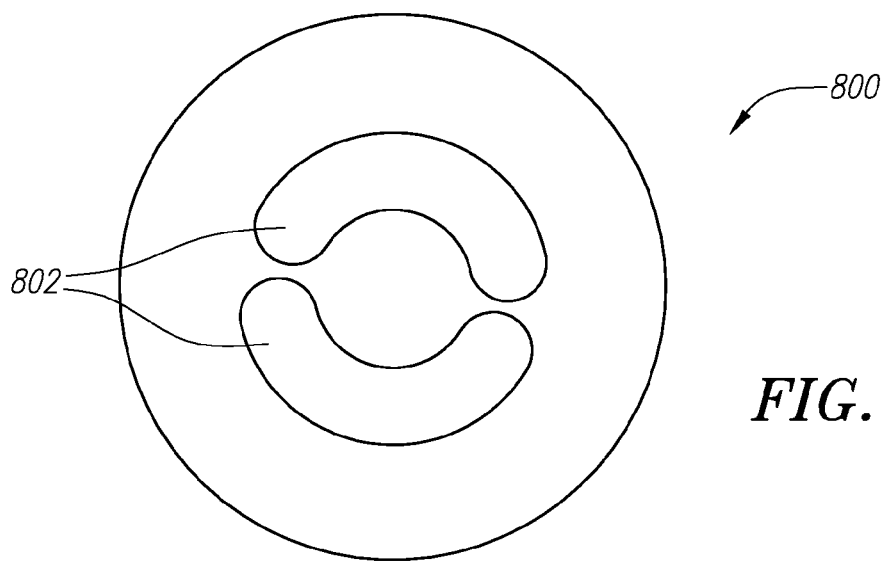
FIGS. 8a-d shows a top plan, perspective view, front elevation, and side elevation of a vent insert.
Figure 8B:
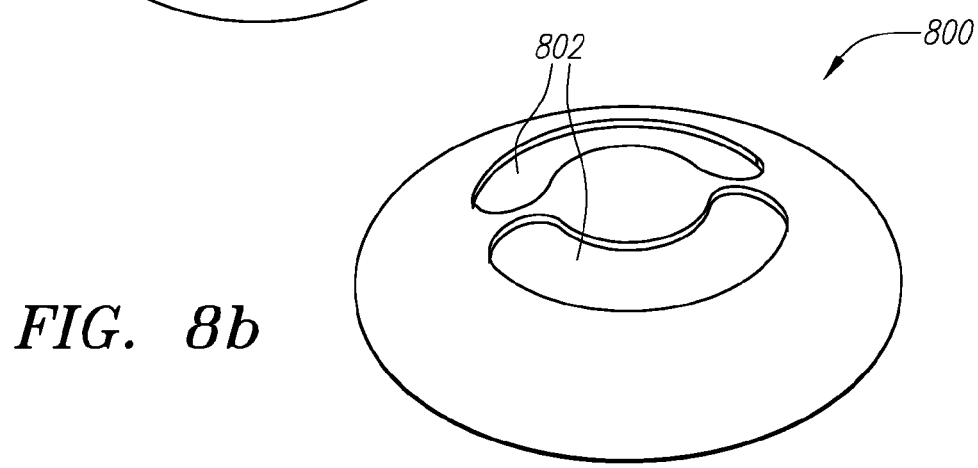
Figure 8C:
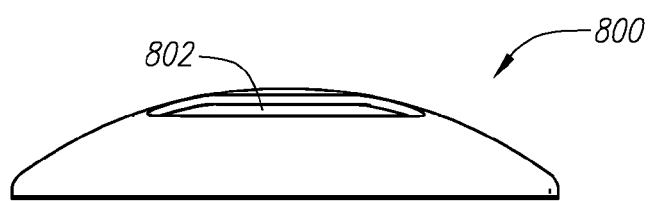
Figure 8D:
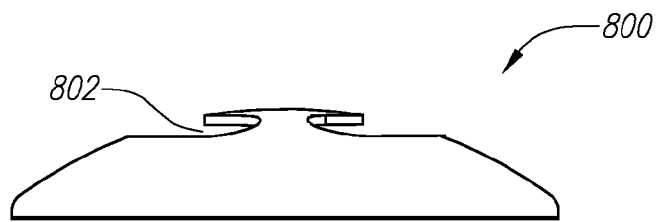
Figure 9A:
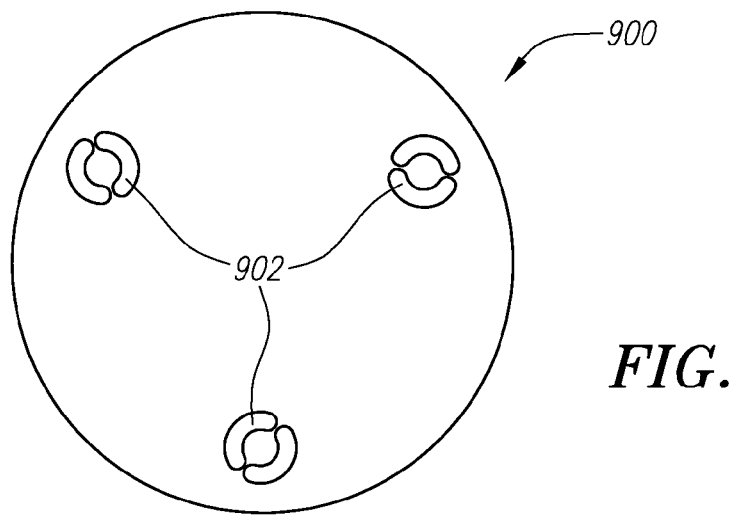
FIGS. 9a-d shows a top plan, perspective view, front elevation, and side elevation of a vent insert.
Figure 9B:
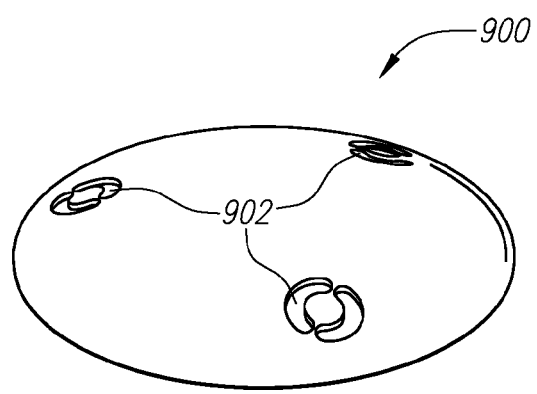
Figure 9C:
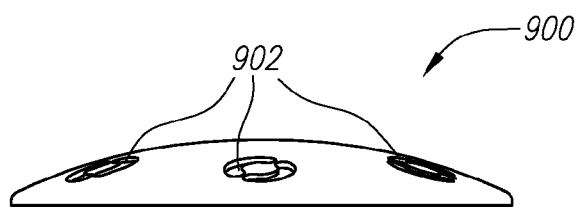
Figure 9D:
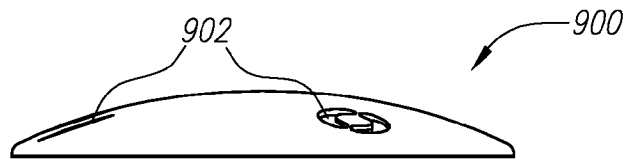
Figure 10A:
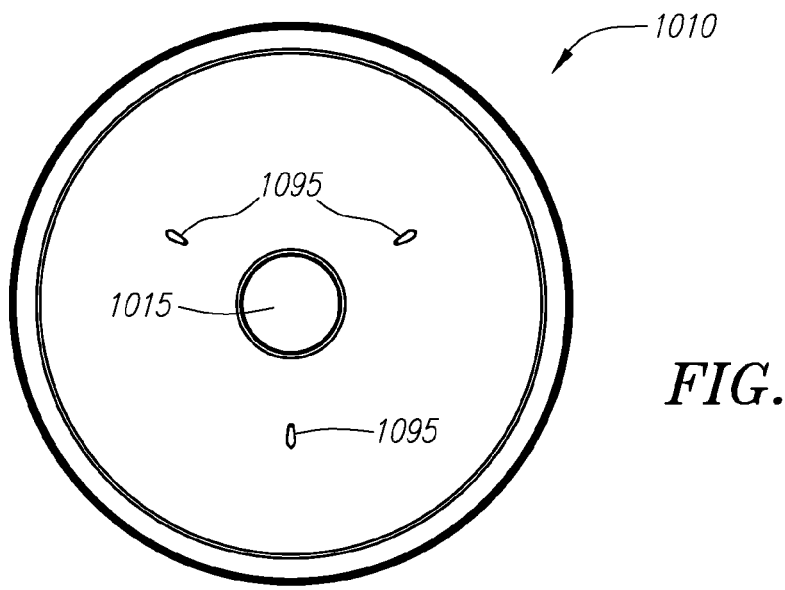
FIGS. 10a-d shows a top plan, perspective view, front elevation, and side elevation of a platform top.
Figure 10B:
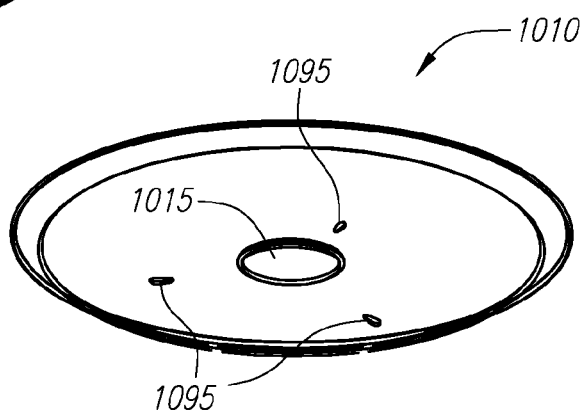
Figure 10C:
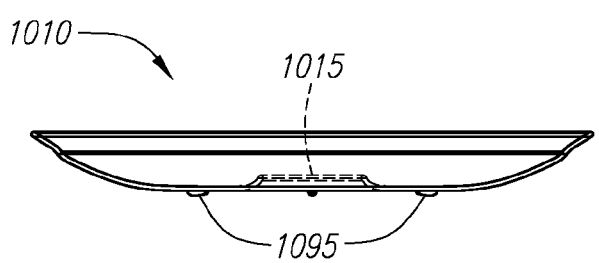
Figure 10D:
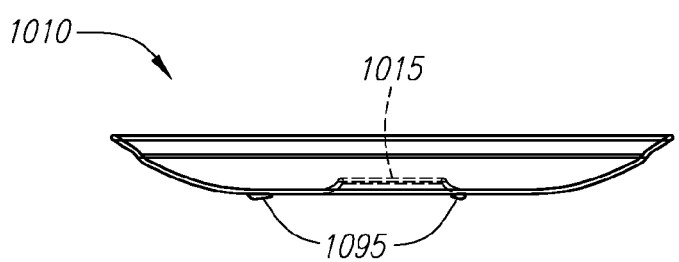
Figure 11A:
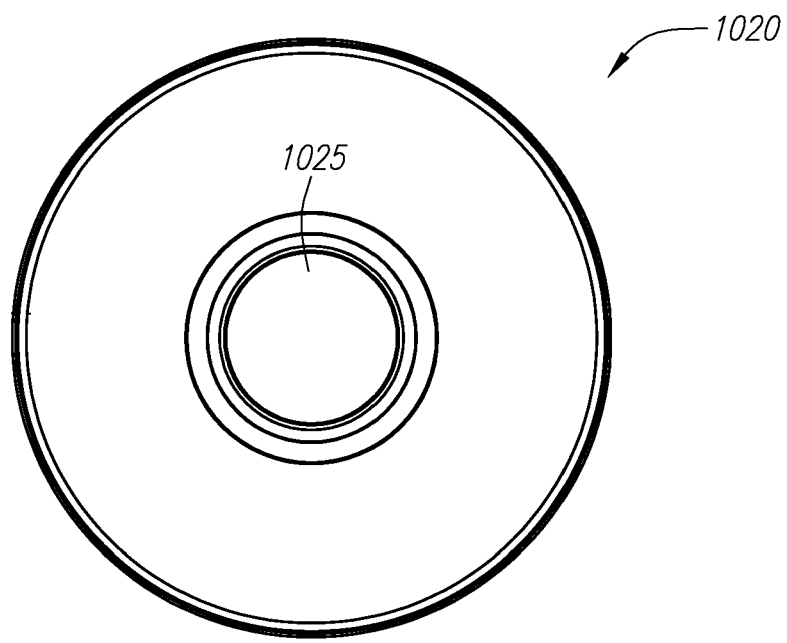
FIG. 11a-d shows a top plan, perspective view, front elevation, and side elevation of a second display part.
Figure 11B:
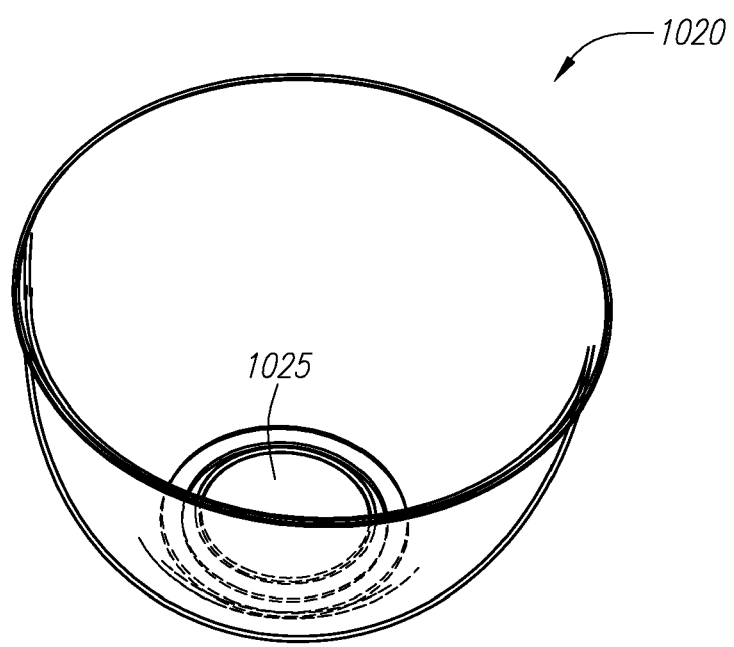
Figure 11C:
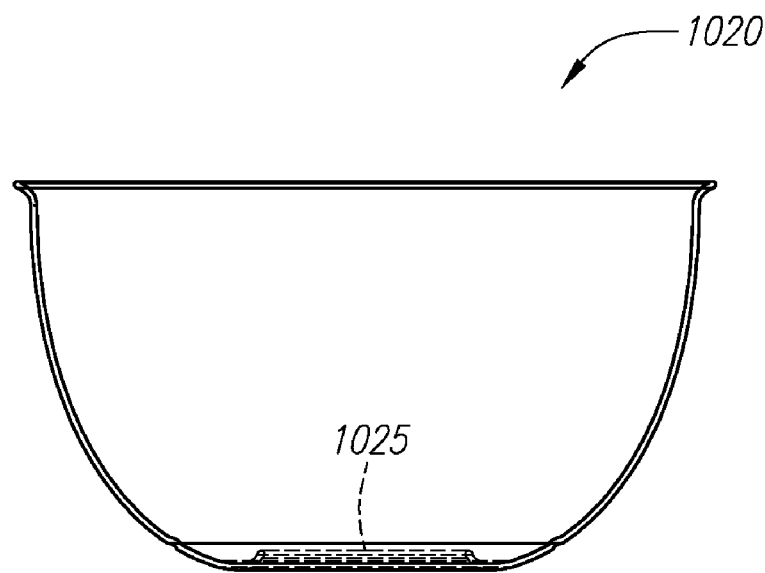
Figure 11D:
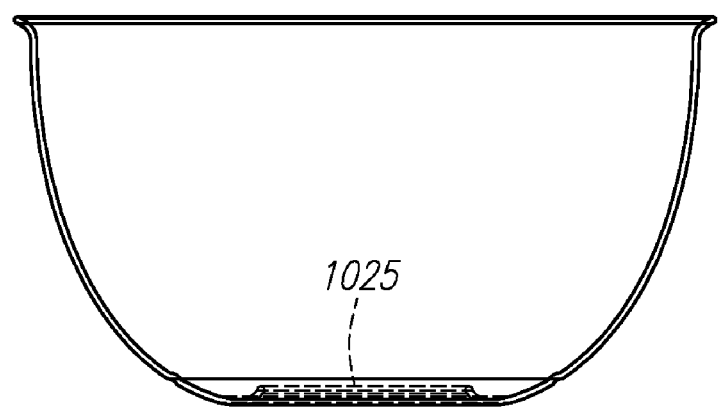

The support surface for ripening fruit 30 is preferably at least partly concave, more preferably at least partly concave and at least partly inward sloping (see for example FIGS. 1-6), still more preferably at least partly concave, at least partly inward sloping and at least partly curvilinear (for example FIGS. 1-3, 5-6), still more preferably at least partly concave, at least partly inward sloping, and at least partly upwardly curvilinear (for example FIGS. 1-2,5-6), or at least partly concave, at least partly inward sloping and predominantly upwardly curvilinear (for example FIGS. 1-2, 5-6) or at least partly concave, at least partly inward sloping, and substantially entirely upwardly curvilinear (FIGS. 1-2, 6). This improves fruit stability, reduces rolling, and reduces bruising on the outside fruit support surface. The support surfaces may also be entirely concave. The surfaces and the parts are preferably all or in part rigid, at least when in use.

As shown in FIGS. 1-2, the first display part 10 and the second display part 20 are preferably entirely or partially transparent for assessing the fruit in the ripening chamber. The display parts and their support surfaces for ripening fruit may, however, be entirely or partly opaque, may be colored and may contain swirls, stripes, or other types of decorative design. The various shapes, positions and/or markings on the display parts, display part vents and/or vent inserts may serve a source identification function. The display parts and the fruit support surface for ripening fruits may also be textured, including coated or stippled, so as to increase surface area and/or surface friction.

The support surfaces may also comprise fruit guides (such as elevated portions, or recessed portions), vent inserts, or other surface features. The display parts may be separated by hand using a separation surface, such as an extended portion of a display part, a gripping portion, a lifting portion, or even a button to mechanically separate the display parts. The display parts may be partial or completely separated in order to access the chambers for retaining ripening gas.

The parts and surfaces of the first aspect may further comprise gas impermeable material (such as glass or polymethyl methacrylate), oxygen permeable material, carbon dioxide permeable material, or a combination of the group; they may be additionally or alternatively ventilated. Fruit support surface for ripening fruit 40 and second display part 20 may be made all or in part of a carbon dioxide permeable material; they may be additionally or alternatively ventilated. And fruit support surface for ripening fruit 30 and first display part 10 may be made all or in part of oxygen permeable material; they may be additionally or alternatively ventilated. The vents may be integral to the display parts. Alternately or additionally, the vents may be formed by a gap in the display parts when they are joined or by a vent insert that permits gas exchange between the chamber and the exterior of the ripening display.

A preferred example of a vent insert for a display part is shown in FIGS. 7a-d. In this preferred embodiment, the vent insert 700 may be metal, such as steel or aluminum. But polymer materials and other solids, including wood, may be used. Further, the vents of the vent insert may be higher than the surrounding fruit support surface so that fruit will tend to roll off of them, rather than cover them. Thus, in a preferred embodiment, the support surface for ripening fruit is concave and at least partly inward sloping, but comprises a raised area. The raised area may act as a fruit guide to improve fruit stability and reduce rolling on the support surface, and may alternately or additionally comprise a vent insert as shown. It may also comprise integral vents, such that the fruit tends not to cover the vents. The size of each vent is preferably 18 mm by 8 mm for a substantially hemispherical ripening chamber approximately 260 mm in diameter at its widest point by 156 mm high. Another vent insert 800 is shown in FIGS. 8a-d. In FIGS. 8a-d, the outer radius of each vent 802 is approximately 17 mm from the center of the vent insert, 32 mm wide and 8 mm high. Both are preferably made of stamped sheet metal, such as stainless steel, but also may be made of aluminum or other materials.

The support surface for ripening fruit may also comprise a lowered area, which may optionally act as fruit guide to improve stability and reduce rolling on the fruit support surface. The lowered area may additionally or alternatively further comprise integral vents, such that the fruit tends not to cover the vents.

Like the first display part, the second display part may also comprise a vent insert. FIGS. 9a-d shows a vent insert 900 for a second display part comprising vents 902. Although one vent may be used, at least two vents are preferred, and at least three are more preferred, for reasons of gas exchange. The vents (here about 8 mm in diameter) are preferably spaced apart uniformly, and may be equidistant from the center of the second display part (here about 53 mm away). The vent inserts for any display part described herein may be secured by a securing agent, such as glue, sealer, grommet, display part feature, (such as a tab, indent, lock or latch on the display part itself), or one or more securing pieces, such as a securing piece that attaches to the vent insert from the other side of the display part thereby securing the vent insert in place.

FIGS. 10a-d shows a first display part, 1010, with a vent insert receiving area, 1015, for receiving a vent insert. The vent insert may be the vent insert shown in FIGS. 7a-d and FIGS. 8a-d, or some other kind of vent insert. The receiving area may be raised relative to the surrounding fruit surface as shown; alternately the receiving area may be lowered relative to the surrounding fruit support surface, or it may comprise an opening level with the surrounding fruit support surface. Preferably, the first display part 1010 has a balancing surface, such as a balancing surface comprising feet 1095 or some other balancing surface. As shown in the preferred embodiment of FIGS. 10c-d, the first display part comprises a balancing surface such that it can securely balance on a countertop so that the first display part and second display part may be separated and separately rested on the countertop while their support surfaces still support fruit. In this case, the balancing surfaces comprise feet 1095.

FIG. 11a-d shows a second display part, 1120, with a receiving area, 1125, for receiving a vent insert (such as for the vent insert of FIG. 9). The receiving area may be raised relative to the surrounding fruit support surface for ripening fruit, as shown; alternatively, the receiving area may be lowered relative to the surrounding fruit support surface for ripening fruit, or it may simply comprise an opening level with the surrounding fruit support surface for ripening fruit. The second display part as shown in FIG. 11a-d, can be elevated with feet (not shown) or by a base part (not shown).

Alternately or additionally, the first display part and/or second display part of the fruit displays disclosed herein may have vents integral to display part itself. These integral vents may be holes formed in the fruit support surface for ripening fruit. They may be formed in a raised area relative to the surrounding support surface for ripening fruit, a lowered area relative to the surrounding support surface for ripening fruit, or in an area level with the surrounding support surface for ripening fruit. The integral vents may be formed by the intersection of one display part with another surface, such as the surface of another display part, and may contain a partial or total conduit. See FIG. 16c.

Figure 12:
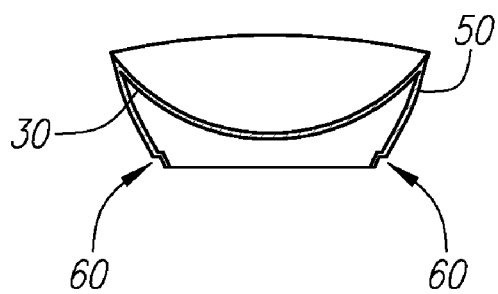
FIG. 12 is a cross-section view of the first display part of FIG. 1, taken through the x-x plane.
Figure 13:
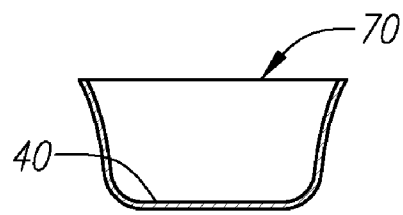
FIG. 13 is a cross-section view of the second display part of FIG. 1, taken through the x-x plane.

As shown above, ripened fruit may be separated onto two support-surface-up parts, the chamber exposed to air, and the ripening process retarded. FIG. 12 demonstrates this feature. FIG. 12 shows a cross-sectional perspective view of FIG. 1's first display part 10 taken through plane x-x. In this "dog food bowl" configuration, first display part 10 includes a first display part side wall 50 that, along with the underside of fruit support surface 30 forms a hollow space underneath fruit support surface 30. A top part support interface 60 (here formed by recessed portion of first display part wall 50) is designed to rest on and at least in part reciprocates the contour of the weight-bearing rim 70 (shown in FIG. 13). The top part support interface is defined as the first display part surface that supports the first display part while the first display part is combined with the second display part. In this example, the weight-bearing rim 70 is substantially level on parts of its surface. Since, as shown in FIG. 12, the first display part comprises a balancing surface (namely its flat underside) it can balance, fruit support-surface-up, on a flat surface, thereby providing additional fruit support surface area. A display part comprising a fruit support surface may also be reversible. That is, it may have an upward-facing fruit support surface for ripening fruit when in a face-up or face-down position.

Figure 14:
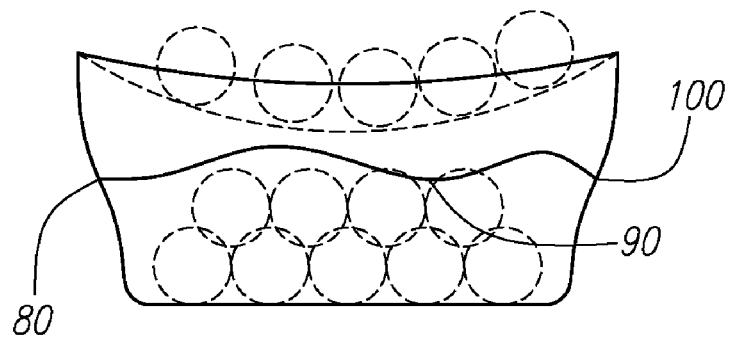
FIG. 14 is a side elevation view of an apparatus for fruit display.

In a preferred embodiment, shown in FIG. 14, the fruit support-surface-up balancing function can also be achieved by having at least one balancing point (shown here as balancing points 80, 90, and 100) on the support interface of the first display part walls. In this version, a balancing surface may comprise the support surface including a balancing point or points that permit the first display part to separately balance on a flat surface. Preferably, the weight-bearing rim of the second display part and the support interface of the first display part have, at least in part, a reciprocal contour.

Figure 15A:
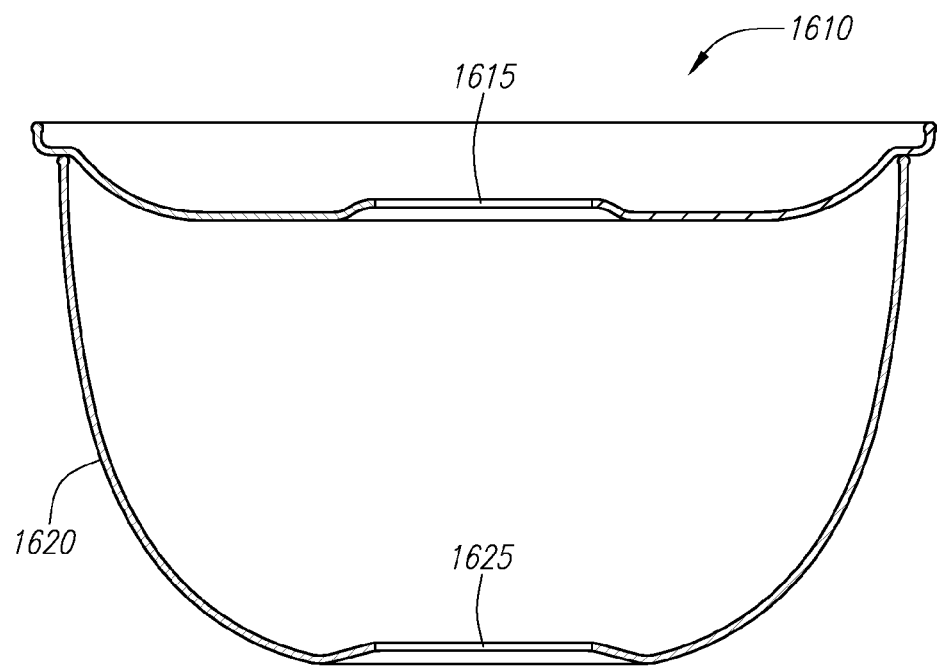
FIG. 15a is a cross-section view of an apparatus for fruit display comprising a first display part and second display part for a preferred embodiment.

A preferred embodiment of the first aspect is shown in FIG. 15a. FIG. 15a shows a cross-section of a first display part 1610 (a platform top) and a second display part, 1620. The fruit support surface of the first display part is concave and inwardly sloped, as is the fruit support surface of the second display part, 1620. The two fruit support surfaces comprise raised areas, 1615 and 1625, respectively. Raised area 1615 of the outside fruit support surface preferably comprises a vent insert receiving area for receiving a vent insert. Thus, as represented by the white portion of raised area 1615, the raised area may have a hole forming part of a vent insert receiving area. As shown in FIG. 15a, the raised area may also be shaped to receive a vent insert, such as, for example, the type of vent inserts shown in FIGS. 7a-d and 8a-d. In this preferred embodiment, the vent insert may also be level with the surrounding fruit support surface or contain a recessed portion relative to the surrounding fruit support surface. Alternately, or in addition, the raised area may also comprise integral vents above, level with, or below the surrounding fruit support surface.

Likewise, the raised area 1625 of the second display part's fruit support surface may also comprise a vent insert receiving area. It may also be shaped to receive a vent insert, such as, for example, the type of vent insert shown in FIG. 9. The vent insert may also be level with the surrounding fruit support surface, or contained in a recessed portion relative to the surrounding fruit support surface. As described in connection with the most preferred embodiment of the two display parts, the fruit support surface of the second display part may comprise integral vents.

Figure 15B:
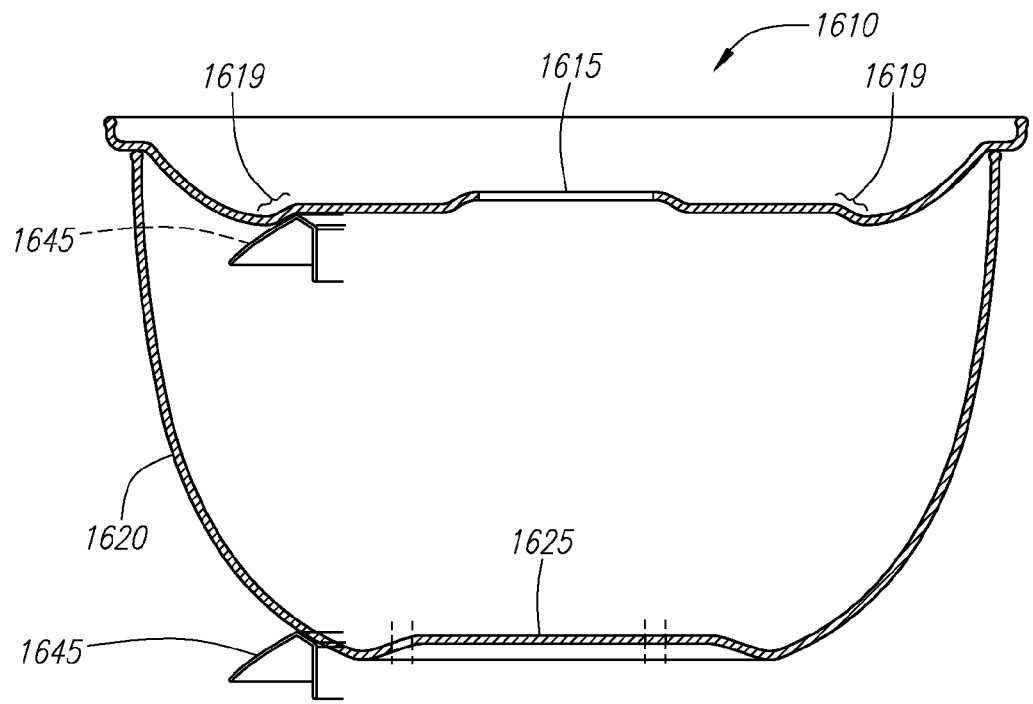
FIG. 15b is a cross-section view of a preferred variant of the apparatus of FIG. 15a wherein the first display part comprises a balancing surface that is an integral ring on the bottom of the part.
Figure 15C:
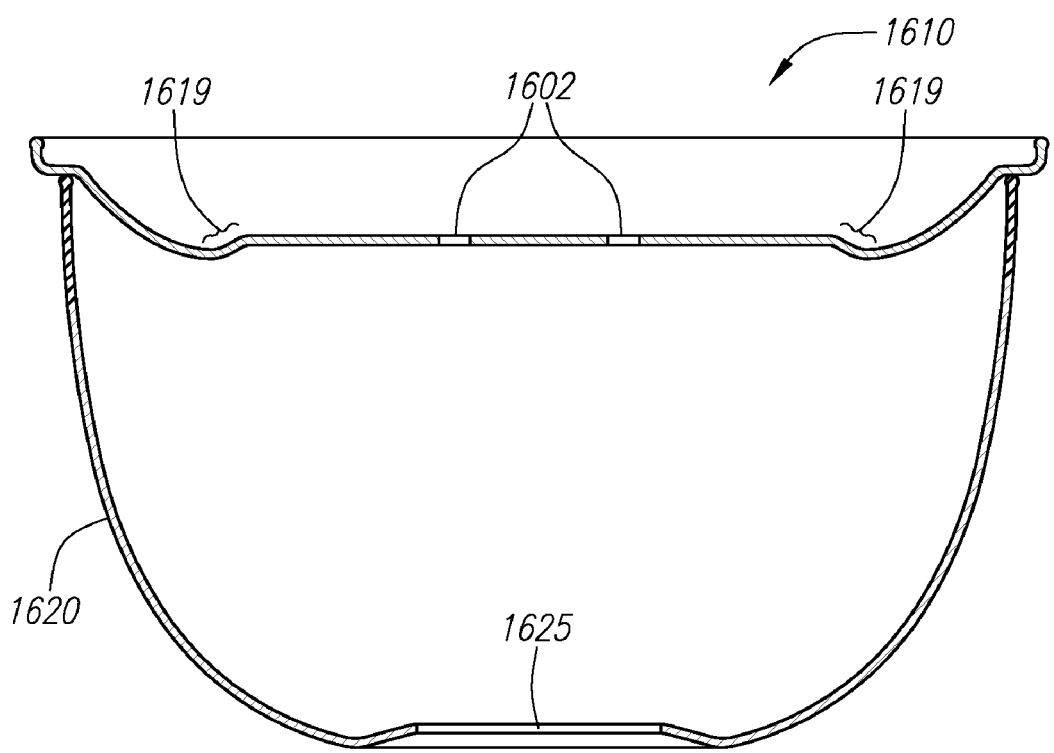
FIG. 15c is a cross-section view of an apparatus for fruit display comprising a first display part and second display part.

FIG. 15b shows a cross-section of the most preferred embodiment, wherein the first display part comprises a balancing surface (in this case an integral ring represented in cross-section by the two dips in the underside of the first display part). The balancing surface can balance the first display part on a tabletop when it is separated from the second display part, 1620. The balancing surface may be attached to the first display part, or be an integral part of the display part, as shown. It may lie within the rim of the second display part, 1620, when the parts are combined. Alternately, the first display part may have a balancing surface that rests outside the rim of the second display part when the parts are combined.

As shown in FIG. 15b, the fruit support surface of the second display part preferably comprises integral vents instead of a vent insert. These integral vents may be formed on the raised area itself (on its top surface or more preferably on its slopes as represented by the left-most pair of dotted lines on raised area 1625). They may also be formed along the outside perimeter of the raised area or in a lowered area relative to the surrounding support surface for ripening fruit. These characteristics inhibit fruit from covering the vents while resting on the fruit support surface.

Integral vents for the second display part preferably comprise at least three holes (most preferably precisely three) that are equidistant from the center of the fruit support surface. In the case of the most preferred embodiment, these holes are 8 mm in diameter, and spaced 53 mm from the center of the fruit surface platform.

Consistent with the best mode of practicing the first aspect, the first display part, 1610, is a platform top with a raised area for a vent insert in its center. The vent insert receiving area is located directly above the chamber for retaining ripening gas. Due to the effects of gravity on gas and circulation, vents that overlay the chamber are preferred to chamber side vents such as shown in FIG. 50. Likewise, consistent with the best mode, the chambers of FIGS. 15*a* and *b* are substantially hemispherical, although other chamber shapes, including other non-domed shapes, substantially ellipsoidal shapes, substantially spheroidal shapes, and other shapes with rounded inner surfaces (like over-inflated box shape or substantially cylindrical shape) are possible.

FIG. 15*b* also shows a cutaway of a preferred feature, base part 1645. The base part 1645 rests on a tabletop or other resting surface while supporting another display part. In this preferred embodiment, the base part 1645 is shaped to receive either display part 1620 or, with 1620 removed, display part 1610. This permits the base to be used in various types of ripening and display formats, and permits the user to separately display fruit on the first display part and base without carrying or using the larger second display part, or forming the chamber. Although the base part 1645 is shown (in dotted line) to receive the first display part 1610 on its outer rim, it may also receive the first display part 1610 on its inner rim, or some other way. A variety of materials may be used for base part 1645. But the preferred material is stainless steel stamped out of sheet using a tool and die process. This is also true of the vent inserts shown herein. The base part may also be made out of enameling steel using the same process, and coated with enamel for color. Alternately, the base may be made out of aluminum, such as anodized aluminum, glass, wood, or other supportive material. The preferred aperture size for the base part is simply the diameter of the vent area on the bottom of the chamber (here about 120 mm).

Importantly, the display parts of FIGS. 15*a* and *b* can be used with feet or some other balancing surface rather than base part 1645, as shown. In all cases, it is preferable to have about a half-inch of clearance between any vents and the ground to ensure adequate ventilation of the chamber. With or without feet, both the first display part and second display part may each balance, support surface up, on a flat tabletop.

FIGS. 16*a-g* show a variety of features of the preferred ripening display of FIGS. 15*a* and *b*. As shown, the second display part, 1620, may be elevated by a base part, 1645, to permit gas exchange between the ripening chamber and the room's atmosphere. Additionally, or alternately, the second display part 1620 may comprise a balancing surface, such as feet that elevate it from its resting surface. The base part, shown in detail in FIGS. 16*e-g*, may be hollow in its center. Additionally, it may be concave and nestle the second display part. It is preferably a ring shape, as shown. As shown, the outer perimeter of base part 1645 is elevated (preferably about a half inch) off the ground, and the inner perimeter has several cut away surfaces next to balancing surfaces 1647 that permit gas exchange between the ripening chamber and the surrounding atmosphere. Alternately, or in addition, base part 1645 may comprise vents, or vent inserts, to permit gas exchange from the ripening chamber to the outside atmosphere. Vent inserts may be secured by a securing agent, such as the securing piece 1616, which attach to the vent insert and fix it in place on the display part (here first display part 1610). Alternately or additionally the display part may comprise recessed area through which room air may be exchange with the chamber. The base part may also comprise decorative elements, such as the embossed figures, 1649, as shown. The decorative elements may double as vents or vent inserts. However, it is important to note that the preferred embodiment shown in FIG. 16 may be used without a base part, and instead use feet or recessed portions in the second display part to permit air exchange between the ripening chamber and the room's atmosphere.

According to this preferred embodiment, a base part 1645, such as the base part shown in FIGS. 16*a-g*, may securely receive the first display part after the second display part is removed. In this way, the ripening display may convert to an alternate configuration for fruit display and ripening with the first display part 1610 resting directly on base part 1645. Thus, in this most preferred embodiment, the base part 1645 may be a multi-purpose base part. As with the other embodiments, the first display part may also be reversible, having at least one fruit support surface for ripening fruits on both its sides. As a result, it may rest upside down or right side up on a table top and/or on base 1645. Further, both the first display part and the second display part may have locating features, such as notches, guides, circumferential indents, or a locating ring (such as a locating ring integral to the first display part as shown in FIG. 15*b* or attached to it) so that the display parts may be readily positioned on one another and/or on the base part. Alternately, or in addition, the base part may have a security surface, such as a rubberized contact surface, or other physical feature, which helps secure the first display part and or second display part to it. The surfaces and the parts described herein are preferably all or in part rigid, at least when in use.

In this preferred embodiment, the second display part, 1620, when combined with first display part, 1610, comprises a substantially hemispherical inner surface, such as shown in FIGS. 11*a-d*, 15 and 16*a-g* and other figures. Although combined parts comprising other types of inner surfaces are functional, it is believed that combined display parts comprising substantially hemispherical contours furthers ripening by forcing the fruit closer together, even when the ripening display is not full. A domed chamber is not needed. A non-domed chamber, such as the substantially hemispherical shaped chamber as shown in FIG. 16, may provide exceptional fruit flavor and hydration while substantially accelerating fruit ripening. See Experimental Results section below.

Figure 16A:
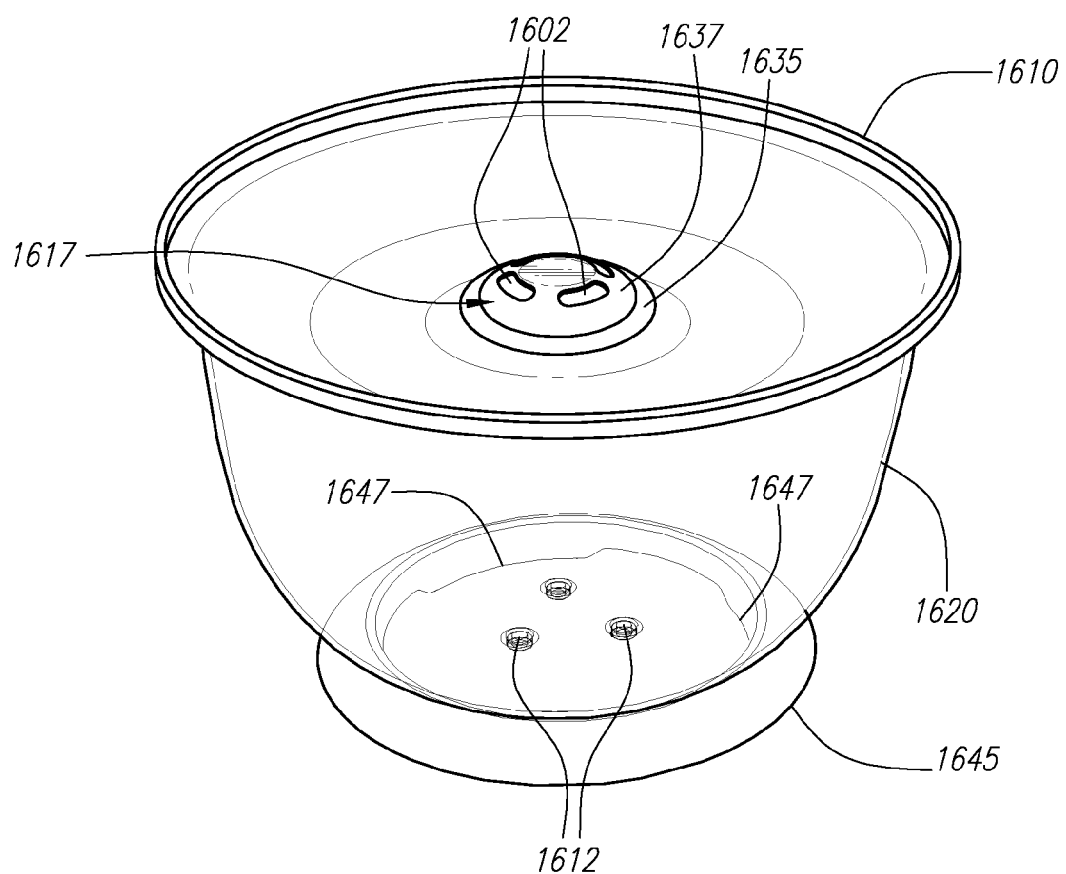
FIGS. 16a-c shows a perspective view, exploded perspective view, and exploded side elevation view of a ripening display employing a first display part and second display part of FIG. 15 along with a base part.
Figure 16B:
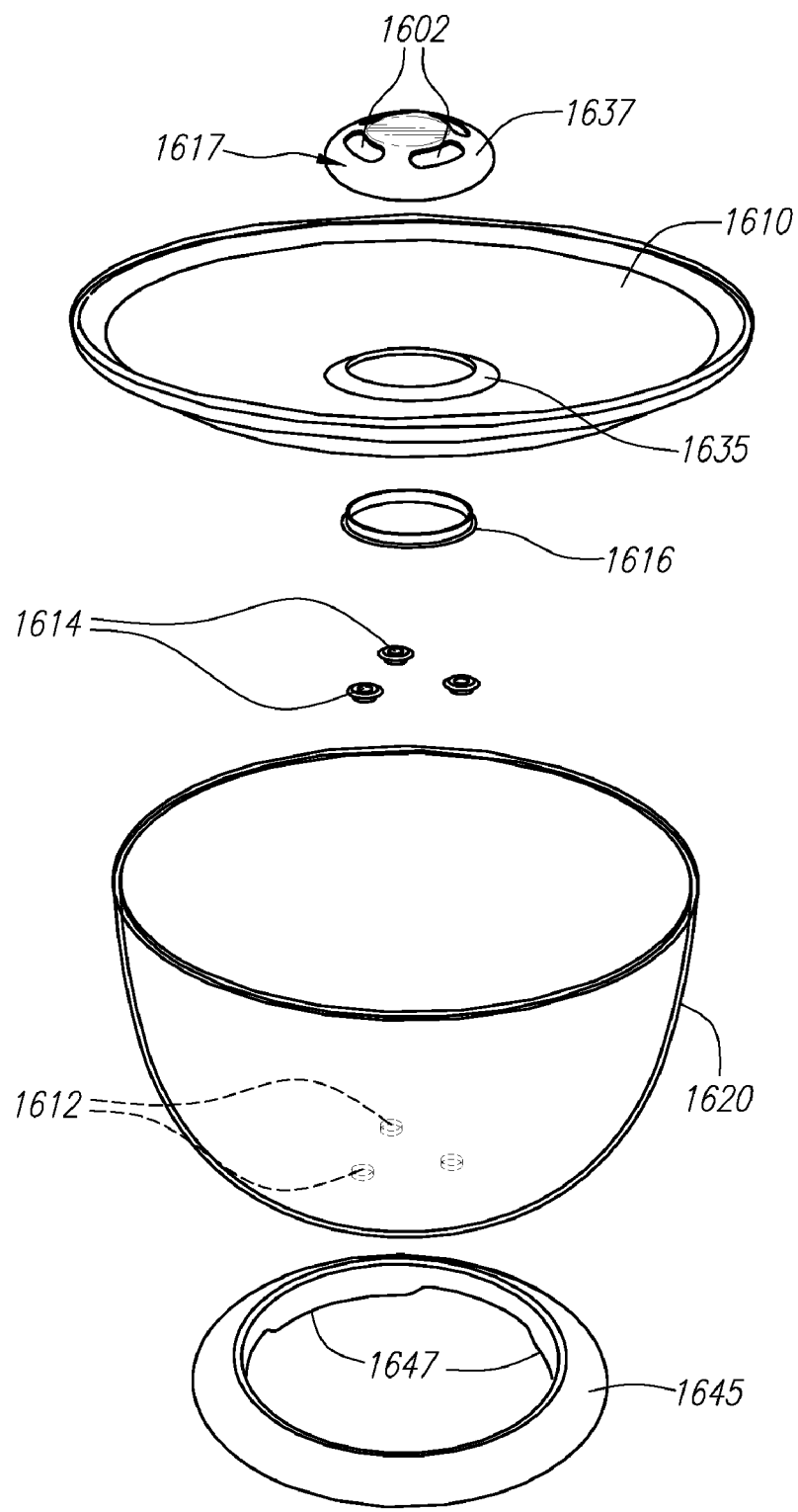
Figure 16C:
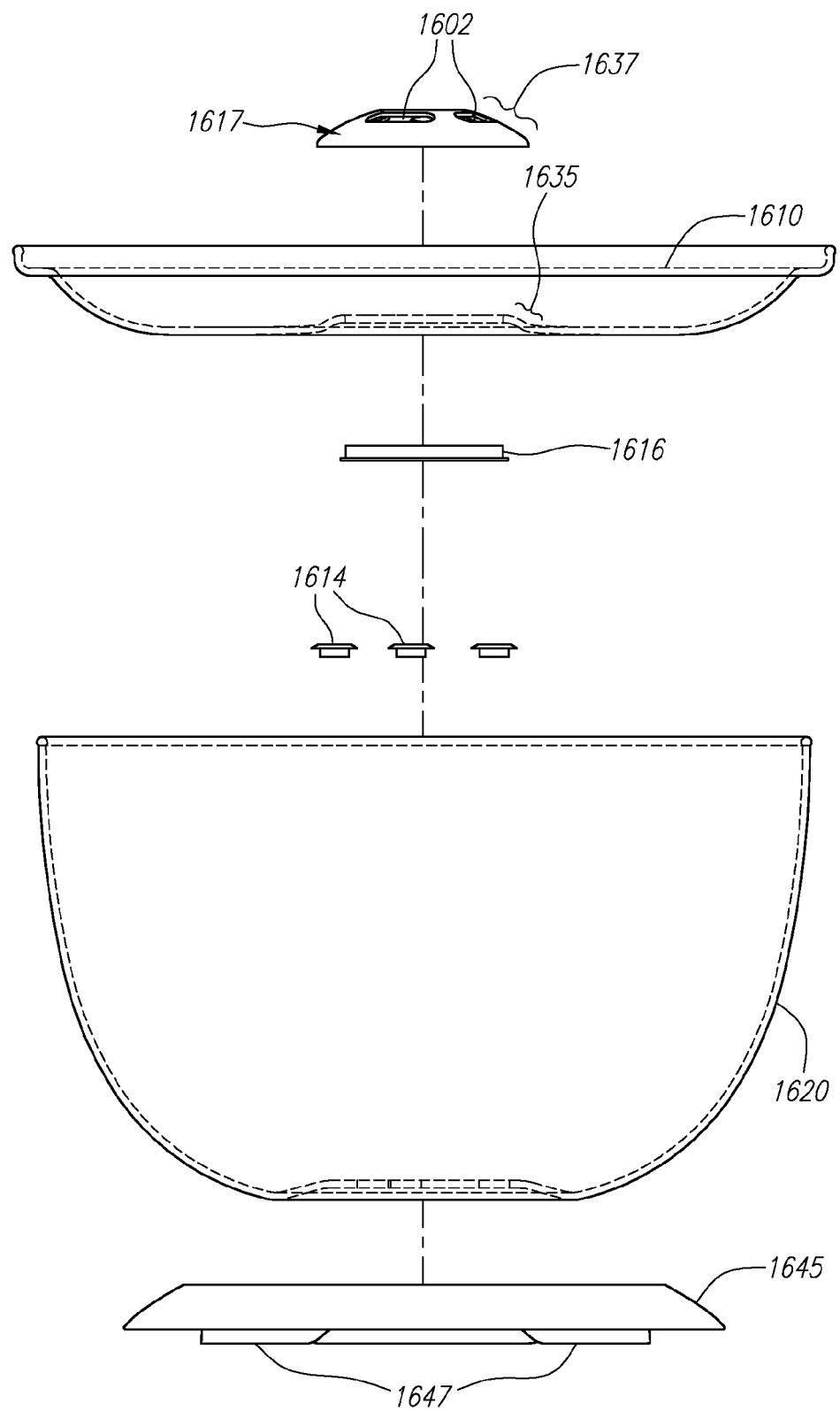
Figure 16D:
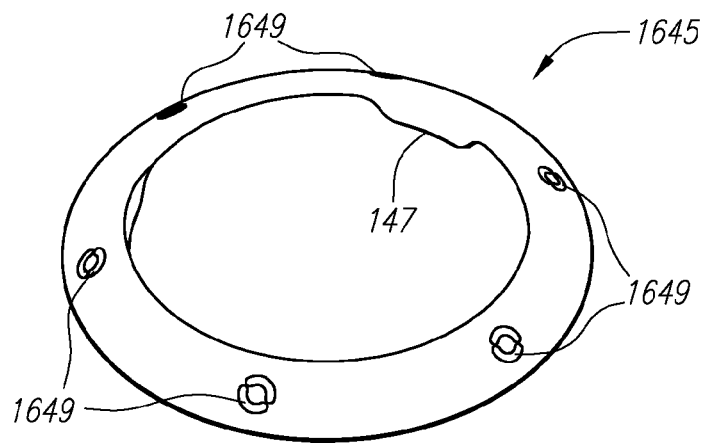
FIGS. 16d-h shows a perspective view, top plan view, cut away view, front elevation view, and side elevation view, of the base part of FIGS. 16a-c.
Figure 16E:
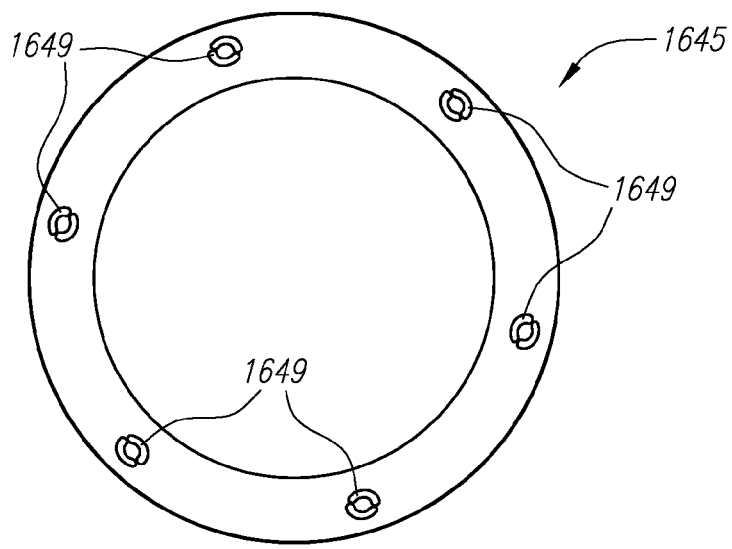
Figure 16F:
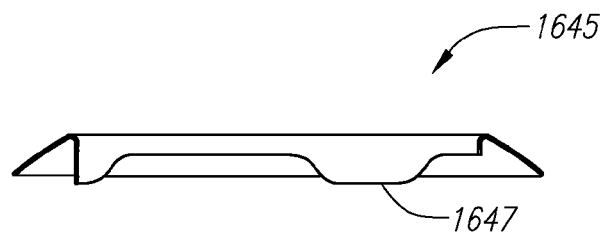
Figure 16G:
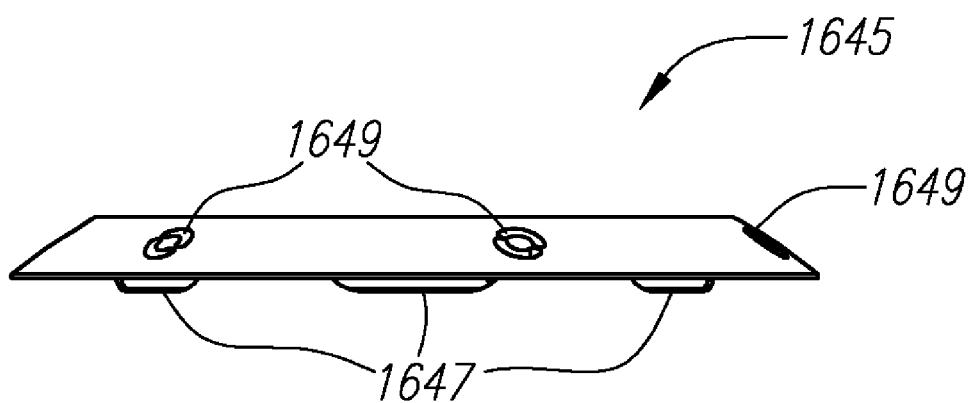
Figure 16H:
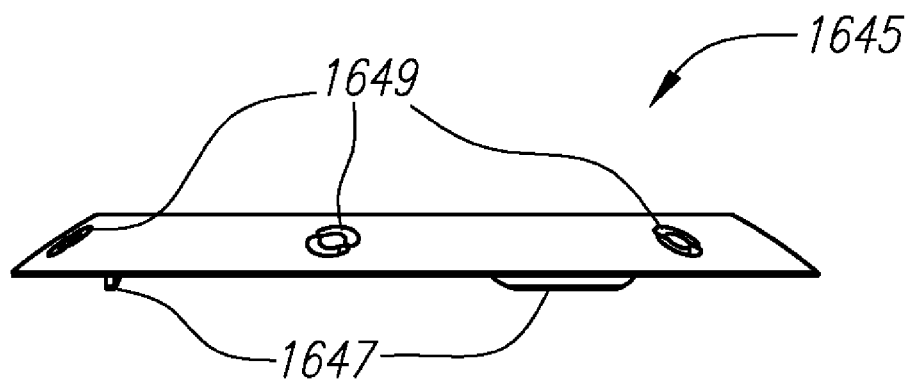
Figure 16I:
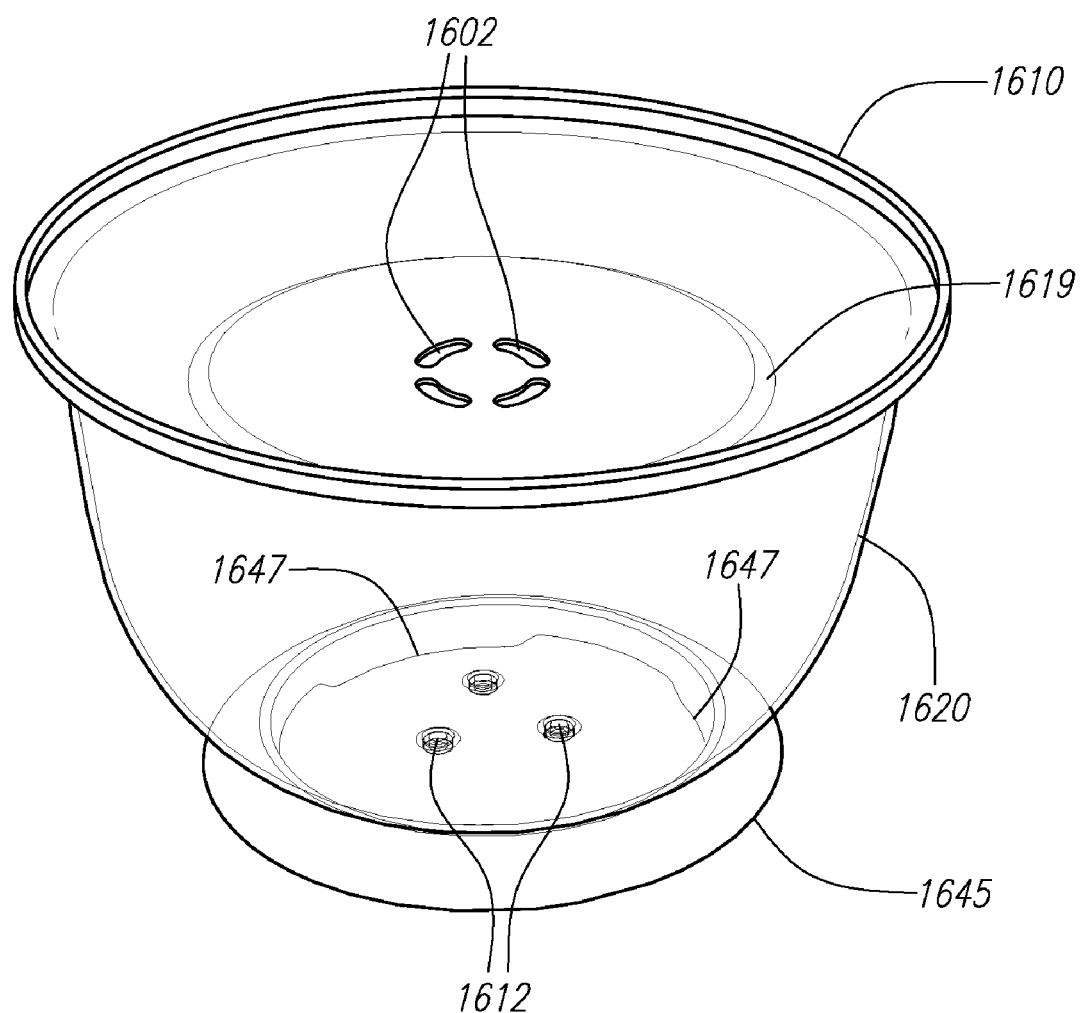
FIG. 16i shows a perspective view of a ripening display employing the first display part and second display part of FIG. 15c along with a base part.

In this preferred embodiment, the fruit support surface of the second display part is preferably at least in part concave, more preferably at least in part concave and at least partly inward sloping, still more preferably at least in part concave, at least partly inward sloping and at least partly curvilinear, or at least in part concave, at least partly inward sloping, and at least partly upwardly curvilinear, or at least in part concave, at least partly inward sloping and predominantly upwardly curvilinear. As in FIGS. 15 and 16*a*, the second display part fruit support surface for ripening fruit is at least in part concave and inwardly sloped. As shown in FIGS. 16*a* and *b*, it may contain integral vents level with the surrounding support surface, or off-level, such as elevated relative to the surrounding support surface recessed relative to the surrounding fruit support surface (such as shown with the recessed vents on the slopes of the elevated portion 1625 in FIG. 15*b*).

Likewise, although the first display part's vents and/or vent inserts may be located in various locations on the first display part, in the most preferred embodiment, shown in FIGS. 16*a-d*, it is preferred to have those vent inserts or integral vents located substantially in the center of the first display part. Further, as shown in FIGS. 16*a* and *b*, the vents (shown as part of vent insert 1625) may be elevated relative to the surrounding support surface, or level with the surrounding support surface or recessed relative to the surrounding fruit support surface (such as the integral vents shown in FIG. 15*b*). In all events, it is preferred that the walls of the first display part are at most only slightly higher than the vents in the first display part. Thus, although higher side walls may be functional, for center vented embodiments, it is believed that side walls at most only slightly higher than the first display part vents result in increased air circulation through the ripening chamber. Further, it is preferred that the first display part support surface be able to hold two full size apples, more preferably three full size apples, still more preferably four full size apples, more preferably five full size apples, and more preferably, six or more full size apples.

In this preferred embodiment, the fruit support surface of the second display part is preferably at least in part concave, more preferably at least in part concave and at least partly inward sloping, still more preferably at least in part concave, at least partly inward sloping and at least partly curvilinear, or at least in part concave, at least partly inward sloping, and at least partly upwardly curvilinear, or at least in part concave, at least partly inward sloping and predominantly upwardly curvilinear. As in FIGS. 15 and 16*a*, the second display part fruit support surface for ripening fruit is at least in part concave and inwardly sloped. As shown in FIGS. 16*a* and *b*, it may contain integral vents level with the surrounding support surface, or off-level, such as elevated relative to the surrounding fruit support surface or recessed relative to the surrounding fruit support surface (such as shown with the recessed vents on the slopes of the elevated portion 1625 in FIG. 15*b*.)

Likewise, although the first display part's vents and/or vent inserts may be located in various locations on the first display part, in the most preferred embodiment, shown in FIG. 16*a-d*, it is preferred to have those vent inserts or integral vents located substantially in the center of the first display part. Further, as shown in FIGS. 16*a* and *b*, the vents (shown as part of vent insert 1617) may be elevated relative to the surrounding support surface, or level with the surrounding support surface or recessed relative to the surrounding fruit support surface (like the integral vents shown in FIG. 15*b*). In all events, it is preferred that the walls of the first display part are at most only slightly higher than the vents in the first display part. Thus, although higher side walls may be functional, for center vented embodiments, it is believed that side walls at most only slightly higher than the first display part vents result in increased air circulation through the ripening chamber. Further, it is preferred that the first display part support surface be able to hold two full size apples, more preferably three full size apples, still more preferably four full size apples, more preferably five full size apples, and more preferably, six or more full size apples.

The preferred embodiments described and shown in FIGS. 15 and 16 may also be combined with various other features of the five aspects described herein. Thus, it may employ fruit guides in various forms (including in the form of a vent insert or surface feature) to improve fruit stability or bias fruit position. The surfaces of the display parts, support surfaces, and chambers may be textured or colored. The apparatus may employ a ripening agent unit, including a ripening solid, either with or without a casing. The display parts, chambers, and fruit support surfaces described herein may comprise an anti-fog agent either as a coating or integral to its surface material. The apparatus may comprise a holder for a ripening solid, such as shown in the platform of FIG. 42*b*, or an enclosed holder.

The best mode of practicing the first aspect may be found in several methods of ripening using the apparatuses described herein. In general, it is best to place the apparatus for ripening and display on a table or countertop away from direct sunlight. The user should separate unripe fruits that can be ripened from those that cannot be ripened. Do not wash the fruit before placing it in the chamber for retaining ripening gas. Fruit that cannot be ripened or that is ripe can be placed on the outside fruit support surface. It is further advisable to stagger ripening by placing some unripe fruit on the fruit support surface located outside the chamber for ripening later on. That way the user has a few ripe, ready-to-eat pieces available each day rather than a large batch of ripe fruit that needs to be consumed immediately.

Prior to placing fruit on the fruit support surface to be enclosed in the chamber, inspect the fruit for bruises. Do not ripen bruised fruit since it will rot in the apparatus and affect the taste of the other fruit. Then take the following steps: place unripe fruits on the fruit support surface to be enclosed in the chamber. Distribute fruit evenly around the fruit support surface. Preferably do not stack fruit more than two layers high to reduce bruising and instability. Bananas should be placed on top of other fruits since they are softer and bruise easiest. Remaining fruits should be stacked with larger pieces on the bottom and smaller ones on top so as not to bruise the bottom layer. Preferably place one or two ripe fruits, most preferably apples or bananas, on the fruit support surface to be enclosed in the chamber to stimulate the ripening process.

Then combine a first and second display parts to enclose a fruit support surface in a chamber for retaining an effective amount of ripening gas. Place fruits that cannot be ripened or ready to eat fruits on the fruit support surface located outside the chamber. Visually inspect the fruit in the chamber daily though a transparent portion of the chamber. Market-hard fruit may require anywhere from 1 to 4 days to ripen, although most fruit can be ripened within three day in the apparatus. If some fruit appears to be ripe, separate the display parts thereby opening the chamber and touch and/or smell the fruit for ripeness. Remove ripe fruits from the fruit support surface that becomes enclosed in the chamber when the parts are combined. Recombine first and second display parts to enclose the fruit support surface in a chamber. Place ripened on the fruit support surface located outside of the chamber. Add new fruit to the inside fruit support surface as needed. Its best to keep the chamber at least half full and to mix riper fruit with new, unripe fruit in the chamber. When all the fruit is ripe, the display parts may be separated and used as traditional, non-chambered fruit bowls.

For example, the embodiment of FIGS. 15 and 16 may further be used in accord with the methods taught herein. Thus, a user may ripen fruit by: a) placing fruit capable of ripening on one or more fruit support surfaces of an apparatus comprised by one or more display parts; b) combining two or more display parts to form one or more chambers for ripening fruit thereby enclosing at least some of the fruit in one or more chambers wherein the size of said two or more display parts permits them to fit entirely on a countertop two feet long by two feet wide when combined; and at least one of said one or more of the chambers at least is in part transparent and ventilated with at least two vents; c) separating two or more of said display parts; d) removing at least some of the fruit capable of ripening from one or more of the open chambers; e) combining two or more display parts to form one or more chambers for ripening fruit f) placing at least some of the removed fruit on one more fruit support surfaces that are located outside of the one or more chambers for retaining ripening gas when one or more of the chambers are formed. The steps may be done in the order recited or in some other order.

One method for ripening fruit according to this aspect comprises the steps of: a) placing fruit on a display part's fruit support surface for ripening; b) combining that display part with another display part thereby substantially enclosing the fruit support surface within a chamber for retaining ripening gas; c) at least partly separating the two display parts after a period of time; d) removing at least one piece of fruit from the fruit support surface; e) recombining the display parts thereby substantially enclosing the fruit support surface in the chamber for retaining ripening gas f) placing the removed fruit on a display part's support surface that is located outside the chamber.

Another method for ripening fruit according to this aspect comprises the steps of: a) placing unripe fruit on a support surface located inside a bottom display part; b) placing a top display part over the bottom display part thereby enclosing the unripe fruit in a ventilated chamber; c) arranging fruit that cannot be ripened or ripe fruit on the top part's fruit support surface; d) visually inspecting the fruit located inside the bottom display part through a transparent surface of a display part; e) removing the top display part from the bottom display part; e) inspecting the fruit by touch or smell to confirm ripeness; f) removing ripe fruits from the bottom part's fruit support surface and leaving unripe fruit on the same fruit support surface; g) placing a top display part over the bottom display part; and h) placing the removed fruit on the top display part's fruit support surface located outside the bowl. Optionally, the method may include the step of separating the top display part and bottom display part and using them separately like traditional fruit bowls once all the fruit is ripe. In a preferred method, in another step unripe fruit is added to the bottom display part's fruit support surface while it still supports fruit that has ripened for a time in the ventilated chamber. This helps accelerate ripening and promotes flavor development of the newly introduced fruit in the chamber as compared to wholesale replacement of ripe fruit with the new fruit. The apparatuses and methods herein may thus help fruit purchaser to readily organize their fruit and execute a ripening schedule.

As for the apparatus, in the best mode, borosilicate glass is preferred over plastic for the display because of its absolute clarity and lack of distortion. This is important for an apparatus that a user will look for to make subtle determination of ripeness. Further, borosilicate glass seems to retain its clarity after washing, unlike many clear plastics. As a result, in the preferred embodiment of FIGS. 15 and 16, the interface between the rim of the second display part and the support interface of the first display part is perpendicular. That is because for borosilicate glass parts, as the preferred material for this preferred embodiment, a perpendicular interface reduces the chance of breakage. The preferred materials for a glass apparatus further include Schott Duran 3.3 borosilicate glass of 2.5 mm thickness for the display parts (for its balance of clarity and strength), although soda lime or other glass types may be used. It is preferred to create a mold for machine blowing and machine blow the Duran 3.3 glass parts for consistency. But hand blown techniques may be used and may in fact be required when blowing parts larger than 280 mm in diameter due to manufacturing limitations. Further, when burning integral vents, care must be taken to have the vent area away from the balancing surfaces (usually 2 to 3 mm) to reduce uneven surfaces and ensure proper balancing surfaces of the parts. When creating larger holes in Duran 3.3 glass, its best to core drill them, followed by re-annealing the piece, so as to avoid weakening the display parts or creating cracks. The holes are preferably core-drilled, but may be flame jet cut, laser jet cut, or cut by some other method.

Particularly for plastic or heat strengthened glass versions of the display parts described in FIGS. 15 and 16, the display part interface preferably may be at other angles, such as shown in FIGS. 10 and 11. It may also take on irregular contours that do not readily permit the first display part to separately and stably balance. In this case, the support interface of the first display part still rests on the rim when the parts are combined. But when the first display part is removed and balanced, support-surface-up, on a flat surface, the first display part is preferably supported by distinct balancing surfaces rather than by the support interface. By way of illustration, FIG. 17 shows the fruit-support-surface-up balancing function may be achieved by deploying at least one balancing surface (here shown as balancing surfaces 180) that rest inside the perimeter of rim 170 of the second display part walls when the first display part and second display part are combined.

Figure 17:
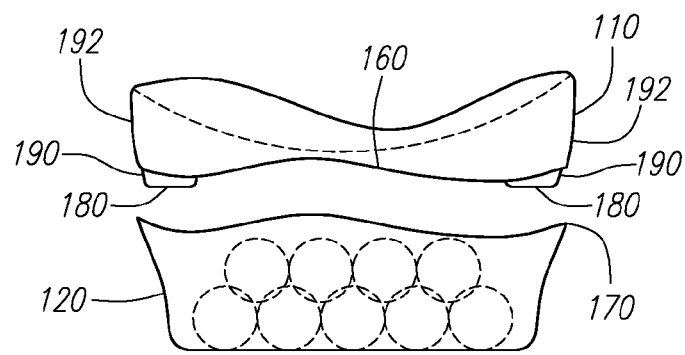
FIG. 17 is a side elevation view of a ripening display with first and second display parts separated.

FIG. 17 shows that support interface 160 will rest on the reciprocally contoured weight-bearing rim 170 of the second display part wall when the parts are combined. Yet the second display part and its rim can take on any shape since the balancing surface or surfaces 180 support first display part 110 once the first display part is separated and placed on a flat surface. In FIG. 17, the first display part wall has an inner level 190 and an outer level 192 whose juncture forms at least part of support interface 160. The balancing surfaces are the bottom of the inner level 190 of the first display part. The inner level 190 lies inside the perimeter of the second display part's rim when the parts are joined. (The inner level may be an extended version of the recessed portion of FIG. 1). Alternatively, in the preferred embodiment, the balancing surfaces may be part of an inner sleeve that attaches to the first display part and lies inside the perimeter of the second display part's rim when the parts are joined. The inner level or inner sleeve rests within the rim, efficiently reducing the height of the display, yet having expanded fruit stacking space when the parts are separated.

Alternatively, in the preferred embodiment of FIGS. 15 and 16, the inner and outer level junction may be on the first display part's interior surface. In this case, the support interface formed at their junction is inside the first display part (causing the second display part's rim to lie within the perimeter of the first display part's bottom when the second display parts are joined).

Figure 18:
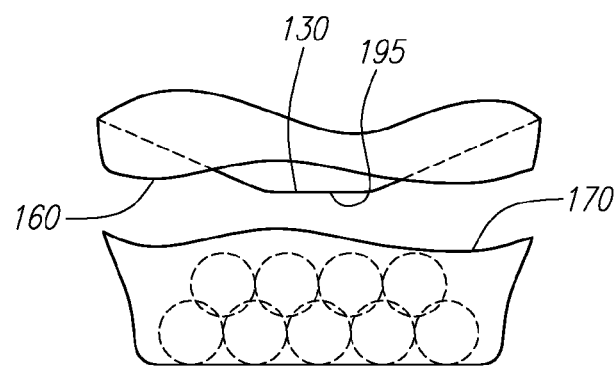
FIG. 18 is a side elevation view of an apparatus for fruit display with first and second display parts separated.

FIG. 18 shows an alternative preferred embodiment in which the balancing surface may also be one or more feet (here shown as foot 195). The one or more feet are preferably suspended from the underside of fruit support surface for ripening fruit 130. This is also shown in FIG. 10. Alternately, as shown, the fruit support surface for ripening fruit comprises one or more feet that are integral to the underside of fruit support surface for ripening fruit 130 so that they extend to or below the lowest point of the first display part wall. Both configurations may be used in the preferred embodiment of FIGS. 15 and 16.

Figure 19:
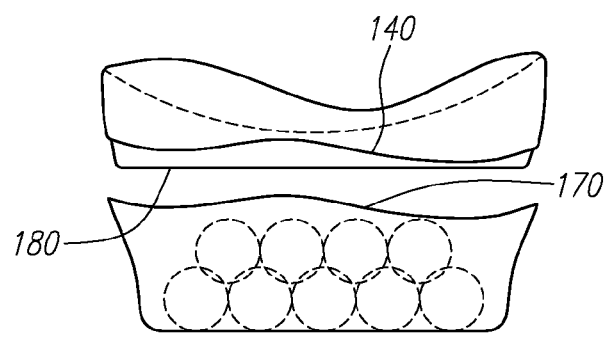
FIG. 19 is a side elevation view of an apparatus for fruit display with first and second display parts separated.

As shown in FIG. 19, the balancing surface 180 of the preferred embodiment may also be substantially flat portions of the first display part's bottom, wherein the support surface of the first display part is a lip 140, that, at least in part, reciprocates the contour of and rests on the weight-bearing rim 170 of the second display part walls. This may be done (as with the preferred embodiment of FIGS. 15 and 16 by having the bottom of the first display part comprise an underside ring (not shown) as a balancing surface. The balancing surface comprising the underside ring may double as a locating feature to help position the platform top in the base part. The lip may be outside the first display part side wall, as shown, or alternately inside of the first display part, in which case when the parts are combined the rim of the second display part rests within the perimeter of the first display part's bottom.

Figure 20:
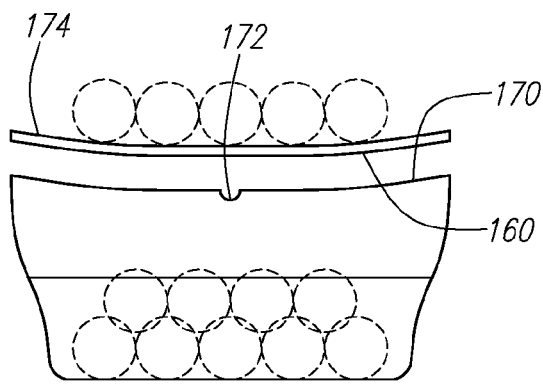
FIG. 20 is a side elevation view of an apparatus for fruit display with first and second display parts separated.
Figure 21:
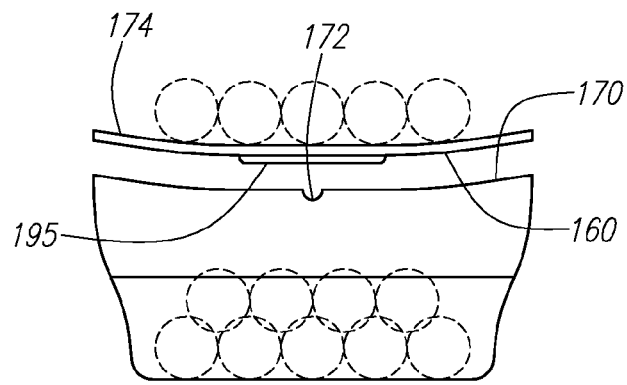
FIG. 21 is a side elevation view of an apparatus for fruit display with first and second display parts separated.
Figure 22:
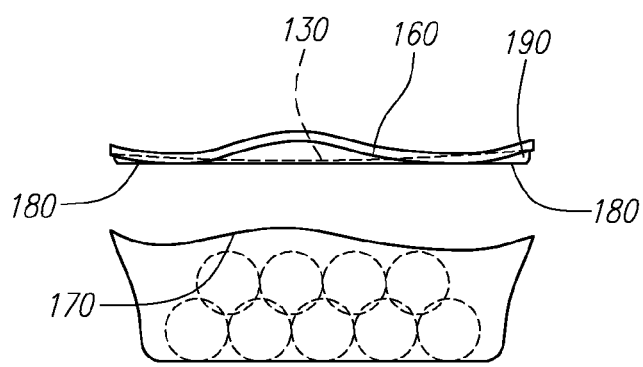
FIG. 22 is a side elevation view of an apparatus for fruit display with first and second display parts separated.
Figure 23:
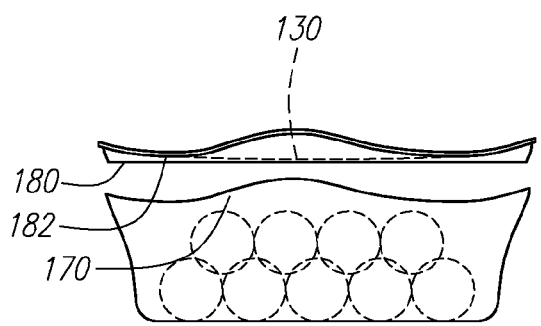
FIG. 23 is a side elevation view of an apparatus for fruit display with first and second display parts separated.

In a preferred embodiment, as shown in FIGS. 10, 15, 16 and 18, and further shown in FIG. 20, the first display part may be a platform top—defined as a first display part that does not have walls extending down past the lowest point on the underside of fruit support surface for ripening fruit. Preferably these platform tops comprise a fruit support surface for ripening fruit that is at least in part concave, more preferably at least in part concave and at least partly inward sloping, and still more preferably at least in part concave, at least partly inward sloping and at least partly curvilinear, or at least in part concave, at least partly inward sloping, and at least partly upwardly curvilinear, or concave, at least partly inward sloping, and predominantly upwardly curvilinear, or concave, at least partly inward sloping, and substantially entirely upwardly curvilinear. These platform tops may also be substantially or entirely concave. These configurations improve fruit stability, reduce fruit rolling, and reduce fruit bruising on the platform top.

In a preferred embodiment as shown in FIGS. 10, 15, and 16, the support surface for ripening fruit of the platform top is concave and at least partly inward sloping, but comprises a raised area. The raised area may comprise a fruit guide to improve stability and reduce rolling on the support surface for ripening fruit. Further, the fruit guide may comprise a first display part vent insert, such as shown in FIGS. 7*a-d*, or comprise integral vents, such that the fruit tends not to cover the vents. In a preferred embodiment, the size of each vent is preferably 18×8 mm for a ripening chamber approximately 260 mm in top diameter by 156 mm high. Alternately, the platform top's support surface may comprise a lowered area, which may further comprise a fruit guide to improve stability and reduce rolling on the fruit support surface. The lowered area may additionally or alternatively further comprise integral vents, so that the fruit tends not to cover the vents. See Aspect 5 below.

The platform top of the preferred embodiment shown in FIGS. 15 and 16 is preferably substantially rigid, may vary in its thickness and may be any thickness. More preferably, if in glass, the platform top is substantially rigid and between a sixteenth of an inch (2 mm) and three inches thick (approximately 76 mm), more preferably between a sixteenth of an inch (2 mm) and two inches (51 mm) thick, and most preferably 2.5 mm thick. If made in plastic, tempered glass, or some other less breakable material, the platform top may easily be thinner. As with the first display parts shown in FIGS. 15 and 16, the first display part may be multi-level, thereby permitting the first display part to drop into the second display part. Second display part rim 170 may alternately or additionally have at least one recessed portion 172 that permits the user to access and lift the platform top out of the second display part. Alternately, the platform top may have a recessed portion (like that shown in FIGS. 12, 15 and 16) that forms a support surface thereby leaving a liftable side surface exposed when the parts are joined. As shown in FIGS. 15 and 16, when the parts are combined, this liftable exposed side surface permits the user to readily remove the first display part with fruit on it. In an alternate embodiment of FIGS. 15 and 16, the first display part may include a gripping portion, such as a hook or handle, so that the user may lift and separate the first display part from the second display part. In another alternate version of FIGS. 15 and 16's embodiment, the first display part may comprise a vent insert that further comprises a gripping portion, so that the first display part may be lifted from the vent insert. For all embodiments herein, the gripping portion may be integral to the first display part or attached to it. The gripping portion may further comprise a hook for suspending a banana.

In a preferred embodiment as shown in FIGS. 10, 15*a-b*, and 16*a-c*, the support surface for ripening fruit of the platform top is concave and at least partly inward sloping, but comprises a raised area. The raised area may comprise a fruit guide (e.g., slope 1635 and/or 1637) to improve stability and reduce rolling on the support surface for ripening fruit. Further, the raised area may comprise a first display part vent insert, such as shown in FIGS. 7*a-d*, or comprise integral vents, such that the fruit tends not to cover the vents. In a preferred embodiment, the size of each vent is preferably 18×8 mm for a ripening chamber approximately 260 mm in top diameter by 156 mm high. Alternately (e.g., FIGS. 15*c* and 16*i*), or additionally (e.g., FIG. 15*b*), the platform top's support surface may comprise a lowered area, which may further comprise a fruit guide (e.g., slope 1619) to improve stability and reduce rolling on the fruit support surface. The lowered area may additionally or alternatively further comprise integral vents, so that the fruit tends not to cover the vents. See Aspect 5 below.

Figure 24:
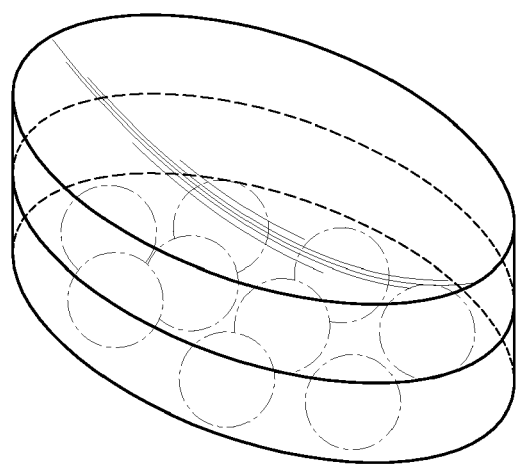
FIG. 24 is a perspective view of an apparatus for fruit display.
Figure 25:
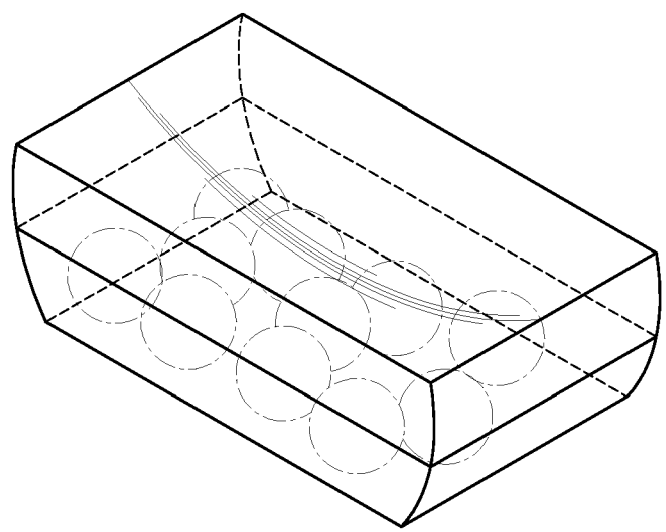
FIG. 25 is a perspective view of an apparatus for fruit display.
Figure 26:
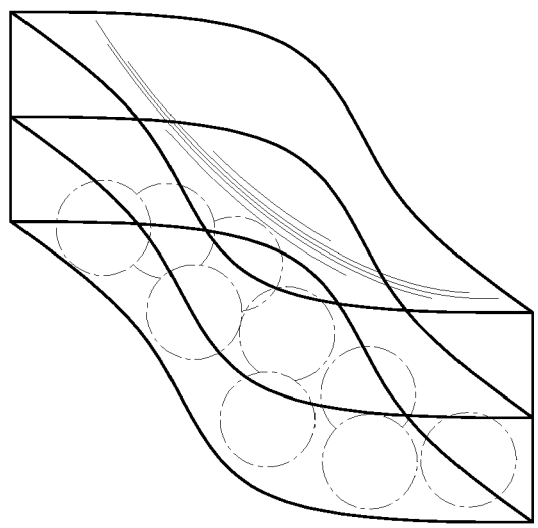
FIG. 26 is a perspective view of an apparatus for fruit display.

In separate, alternative embodiments, a ripener may be a variety of overall structures, including in the form of an oval "collapsed cake" FIG. 24, a "curved rectangle" FIG. 25, and a "leaf" FIG. 26.

Figure 27A:
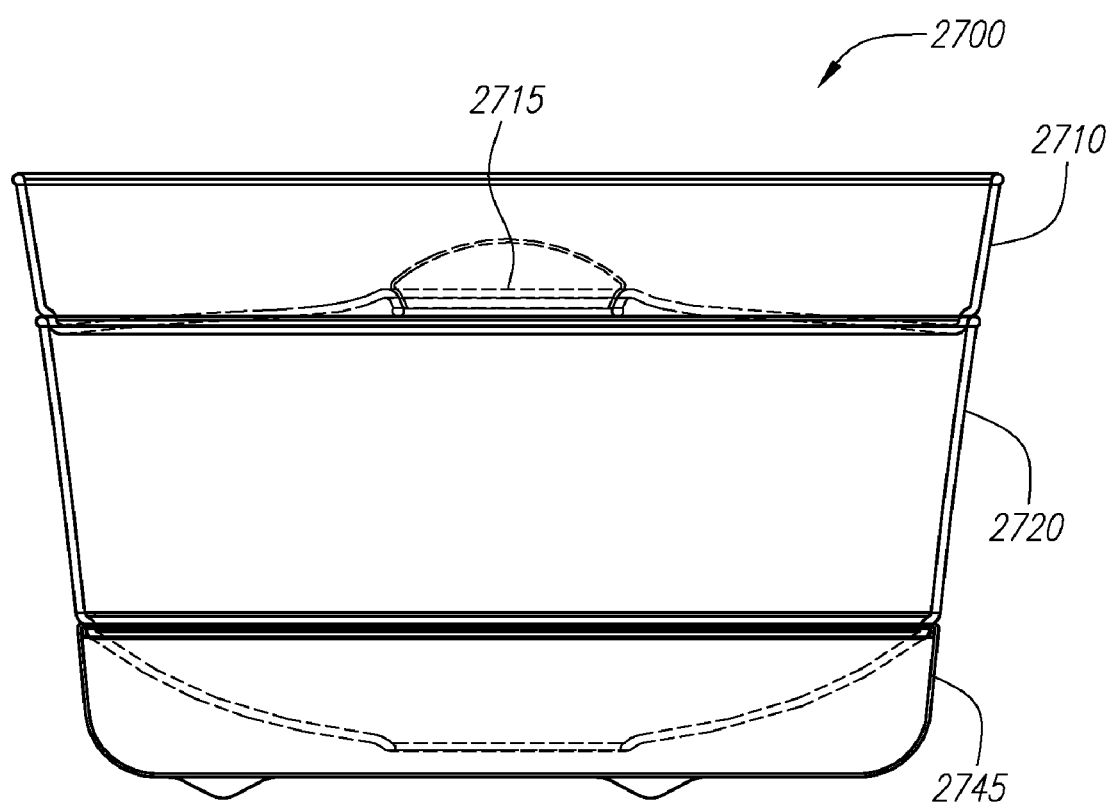
FIGS. 27a-b shows a side elevation view and an exploded side elevation view of an apparatus for fruit display comprising a first display part, a second display part, and a base part.
Figure 27B:
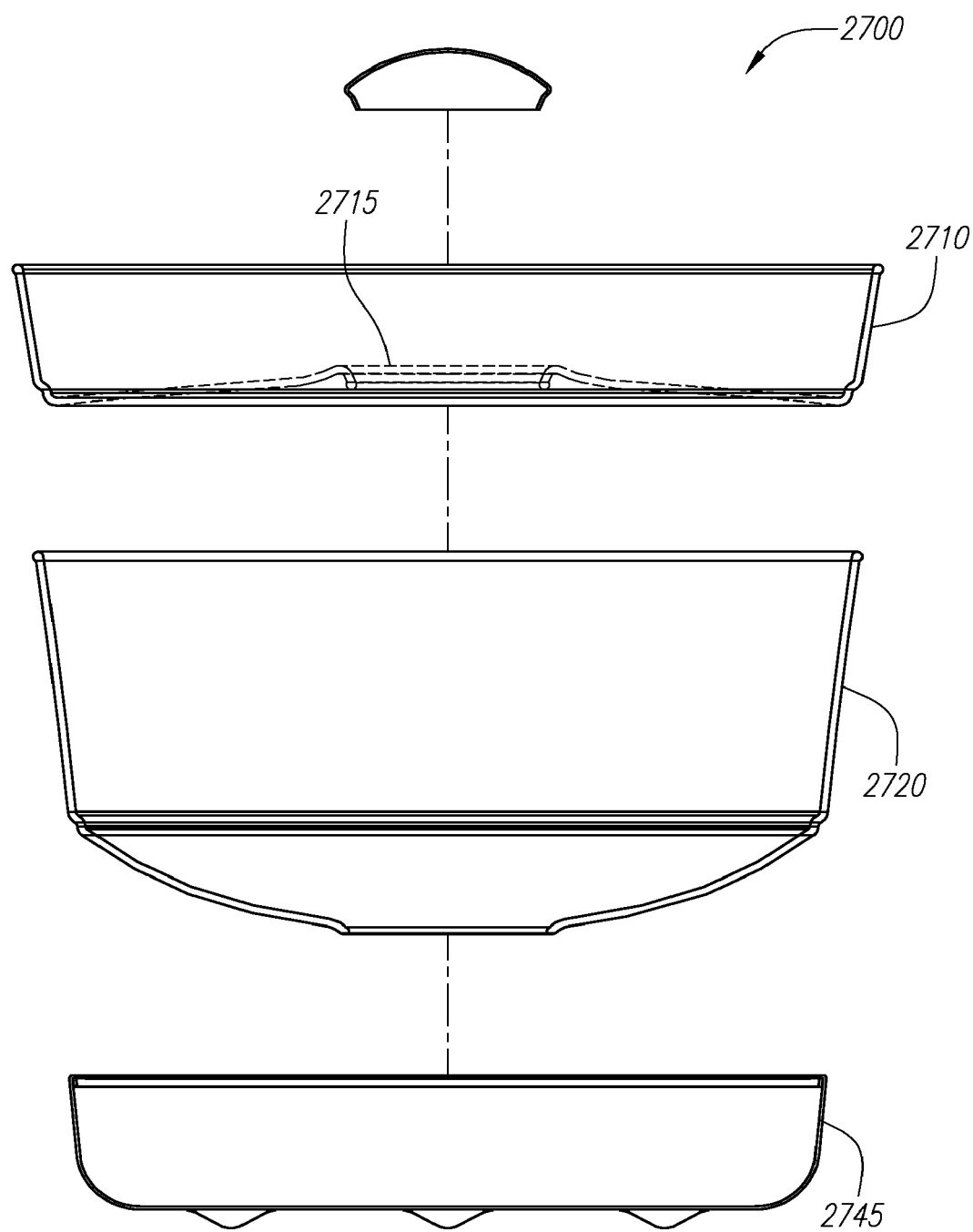
Figure 28A:
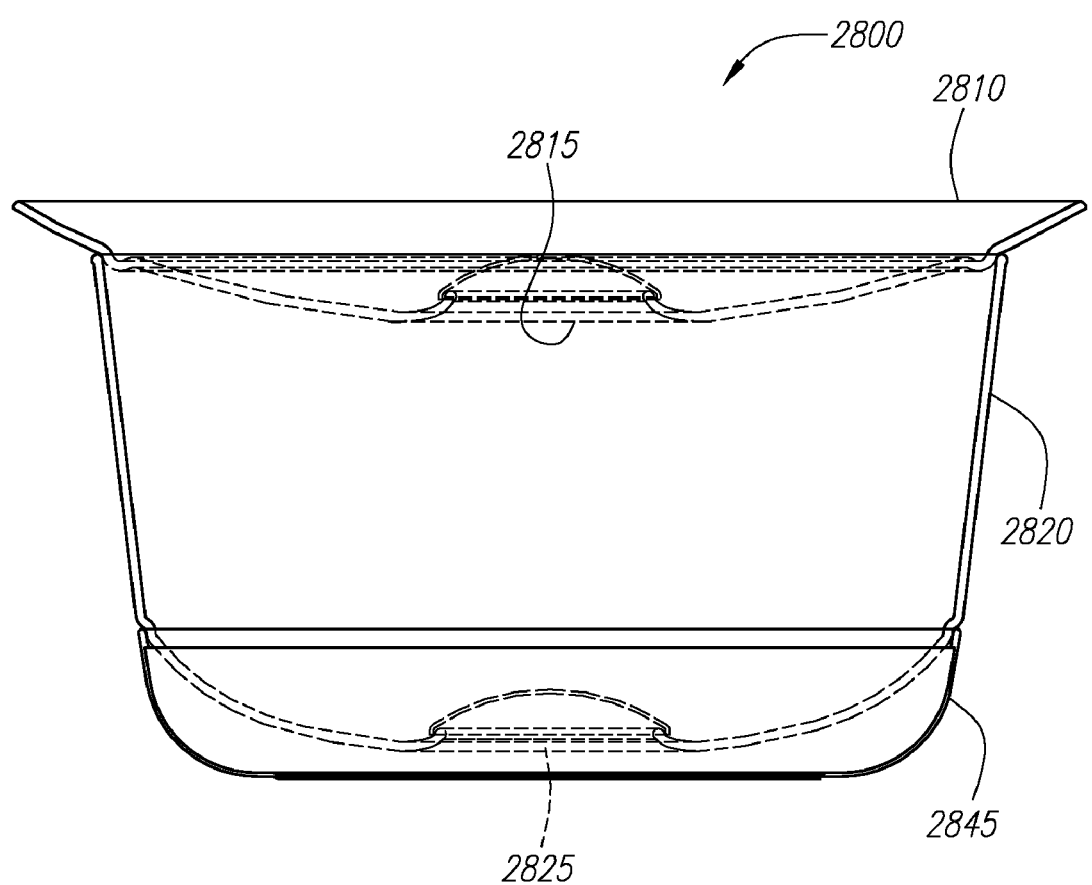
FIGS. 28a-b shows a side elevation view and an exploded side elevation view of an apparatus for fruit display comprising a first display part, a second display part, and a base part.
Figure 28B:
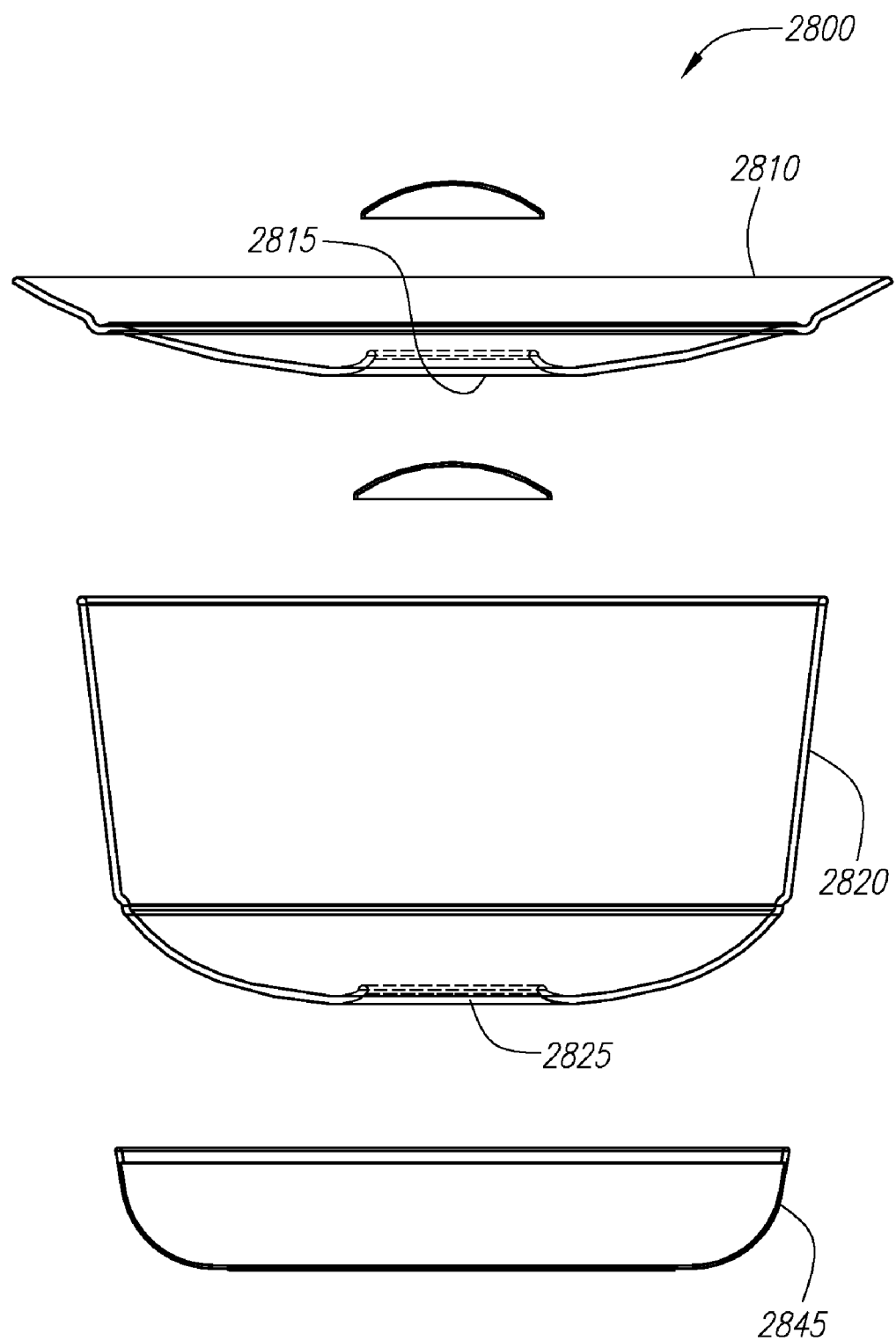

Certain variations on the preferred embodiment of FIGS. 15 and 16 are possible. FIGS. 27*a-b* shows one ripening display embodiment, 2700, with first display part 2710, second display part 2720, base part 2745 and vent insert receiving area 2715. FIGS. 27*a-b* also shows a vent insert, such as described in FIGS. 7 and 8. For the second display part, integral vents are used. Alternately, or in addition, second display part 2720 may have a vent insert receiving area and a vent insert as shown in FIG. 9. FIGS. 28*a-b* shows another variation, 2800, with a convex base part, 2845, that nestles the second display part 2820. The base part, 2845, comprises feet (not shown) or other balancing surfaces such that gas may be exchanged between the ripening chamber and the outside atmosphere. This embodiment has vent insert receiving areas, 2815 and 2825, that receive vent inserts, such as described in FIGS. 7-9. Alternately, or in addition, integral vents may be used in both a first display part and second display part. The base part may alternately or additionally have integral vents.

Figure 29:
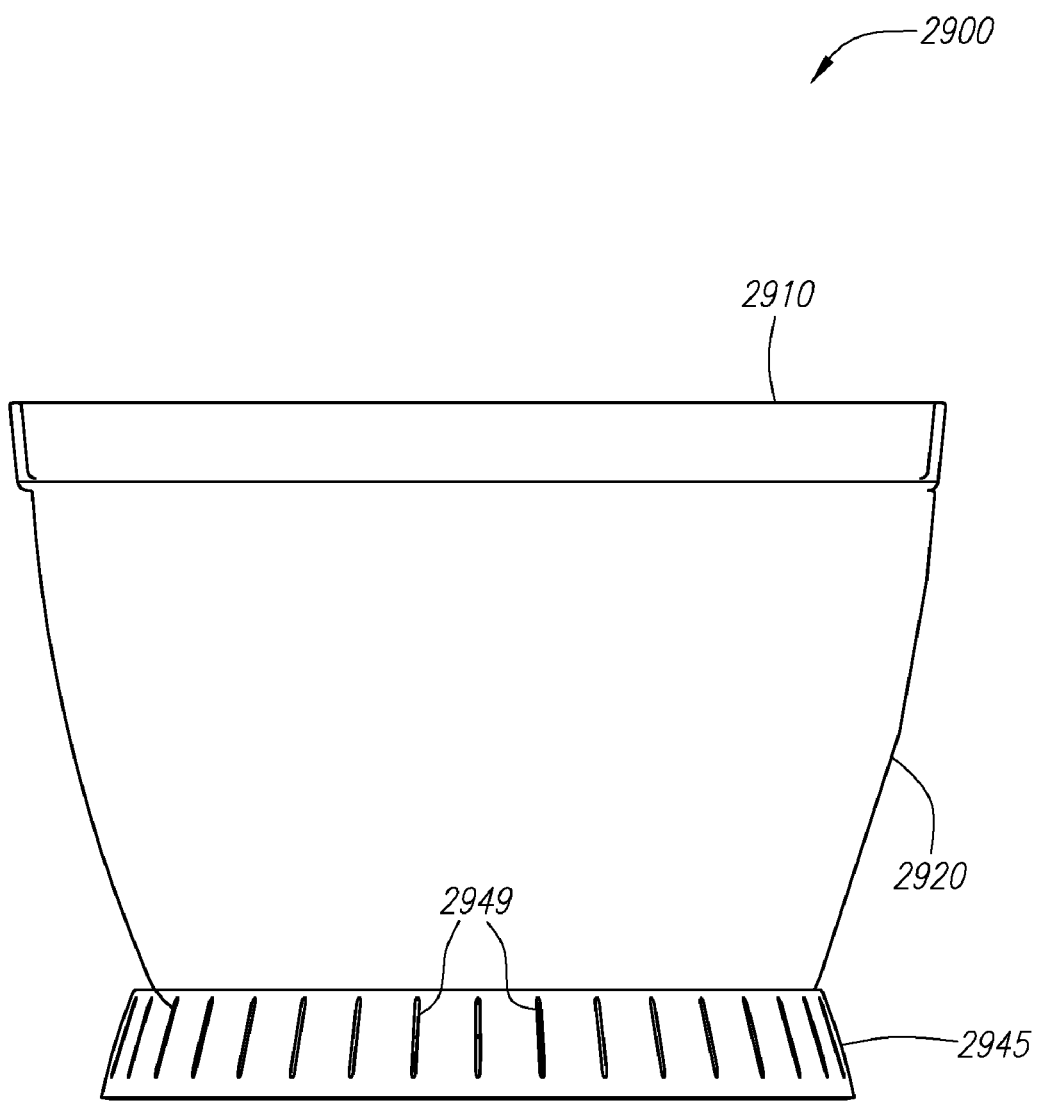
FIG. 29 is a side elevation view of an apparatus for fruit display comprising a first display part, a second display part, and a base part.

Features from less preferred variations may be used in the preferred embodiments described herein, including those shown in connection with FIGS. 15 and 16. FIG. 29 shows a fruit ripening display, 2900, comprising a first display part, 2910, second display part, 2920, and base part 2945. Base part 2945, like all base parts disclosed herein, may have integral vents, such as 2949. The vent size need not vary, but their number may vary with the size of the ripening display to gain an evenly distributed gas exchange.

Figure 30:
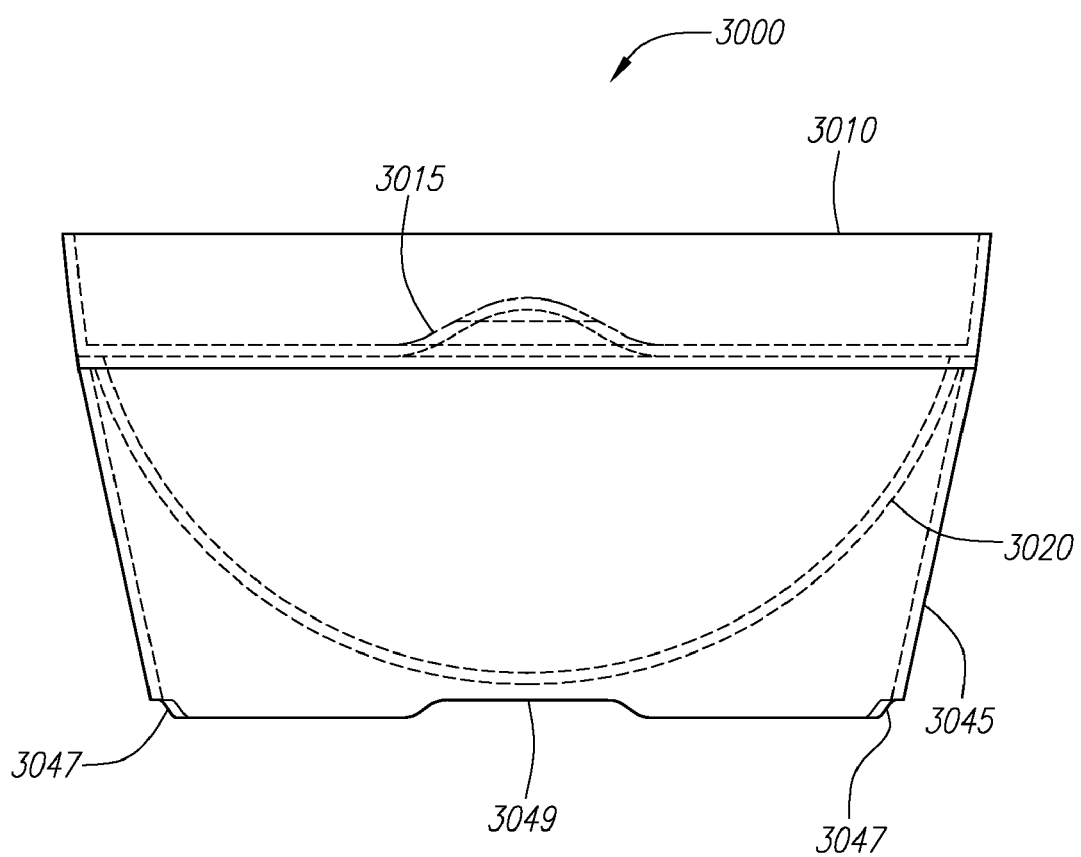
FIG. 30 is a side elevation view of an apparatus for fruit display comprising a first display part, a second display part, and a base part.

FIG. 30 shows a fruit ripening display, 3000, comprising a first display part, 3010, a second display part, 3020, and a base part, 3045. As shown, base part 3045 has recessed areas, 3049, through which gas from the ripening chamber may pass to the outside atmosphere. In this embodiment, the base, 3045, is taller and wider than the second display part, 3020, and thus can substantially contain the entire second display part. In this embodiment, first display part, 3010, comprises a vent insert receiving area, 3015. The vent insert receiving area may receive a vent insert, such as shown in FIGS. 7-9, or some other kind of vent insert. In this embodiment, the second display part comprises integral vents, though vent inserts and a vent insert receiving area may be used.

Figure 31:
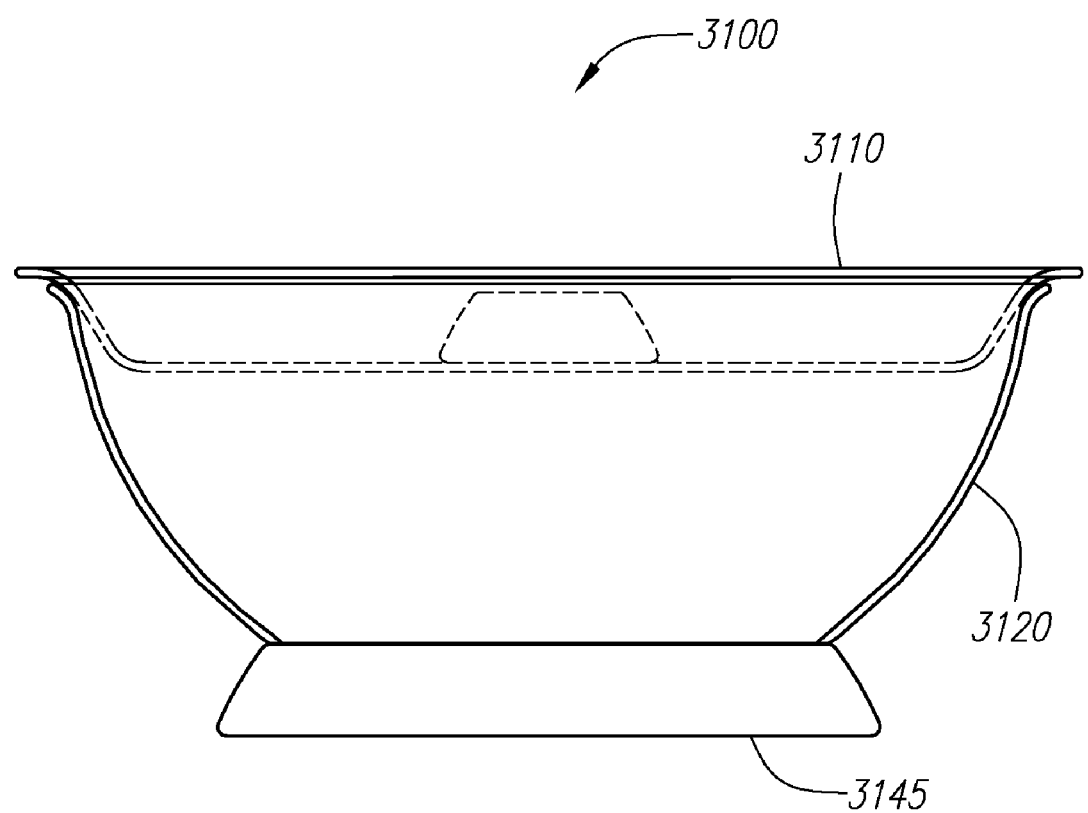
FIG. 31 is a side elevation view of an apparatus for fruit display comprising a first display part, a second display part, and a base part.

FIG. 31 shows a fruit ripening display, 3100, comprising a first display part, 3110, second display part, 3120, and base part 3145. Base part 3145, like all base parts disclosed herein, may have integral vents, it may have recessed areas, and may be additionally, or alternately, elevated by balancing surfaces, such as feet, to promote gas exchange from the ripening chamber to the outside atmosphere. In this embodiment, first display part, 3210, comprises a vent insert (shown in dotted lines) and a vent insert receiving area that is level with the surrounding support surface for ripening fruit. In this variation, the second display part comprises integral vents, although vent inserts and a vent insert receiving area may be used.

Figure 32:
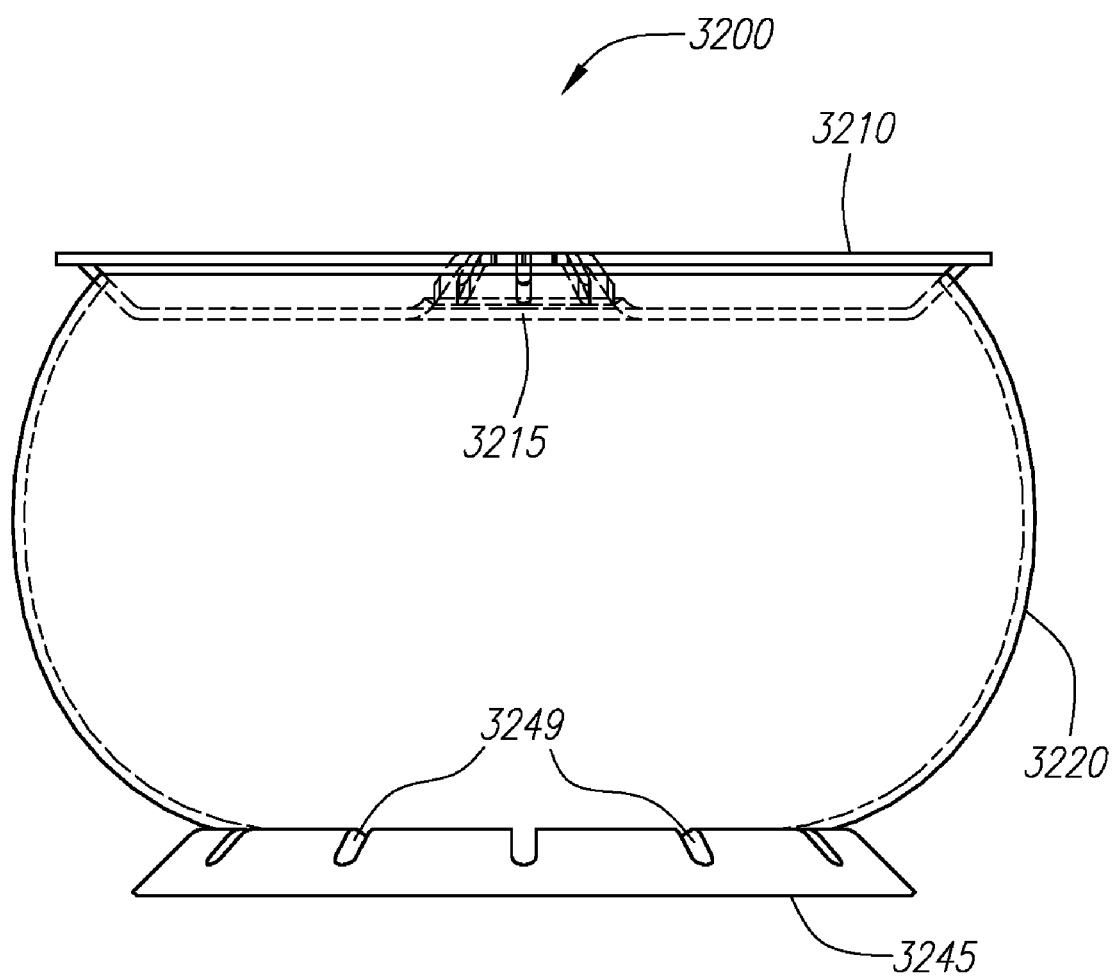
FIG. 32 is a side elevation view of an apparatus for fruit display comprising a first display part, a second display part, and a base part.

FIG. 32 shows a fruit ripening display, 3200, comprising a first display part, 3210, second display part, 3220, and base part 3245. Base part 3245, like all base parts disclosed herein, may have integral vents, such as shown 3249. The base part vent size is proportional to the size of the ripening display. Generally, the smaller the vents are, the more that are needed. The base part may be additionally, or alternately, elevated by balancing surfaces, such as feet, to promote gas exchange from the ripening chamber to the outside. In this embodiment, first display part, 3210, comprises a vent insert receiving area, 3215. The vent insert receiving area may receive a vent insert, such as shown in FIGS. 7-9, or some other kind of vent insert. In this embodiment, the second display part comprises integral vents, though vent inserts and a vent insert receiving area may be used.

Figure 33:
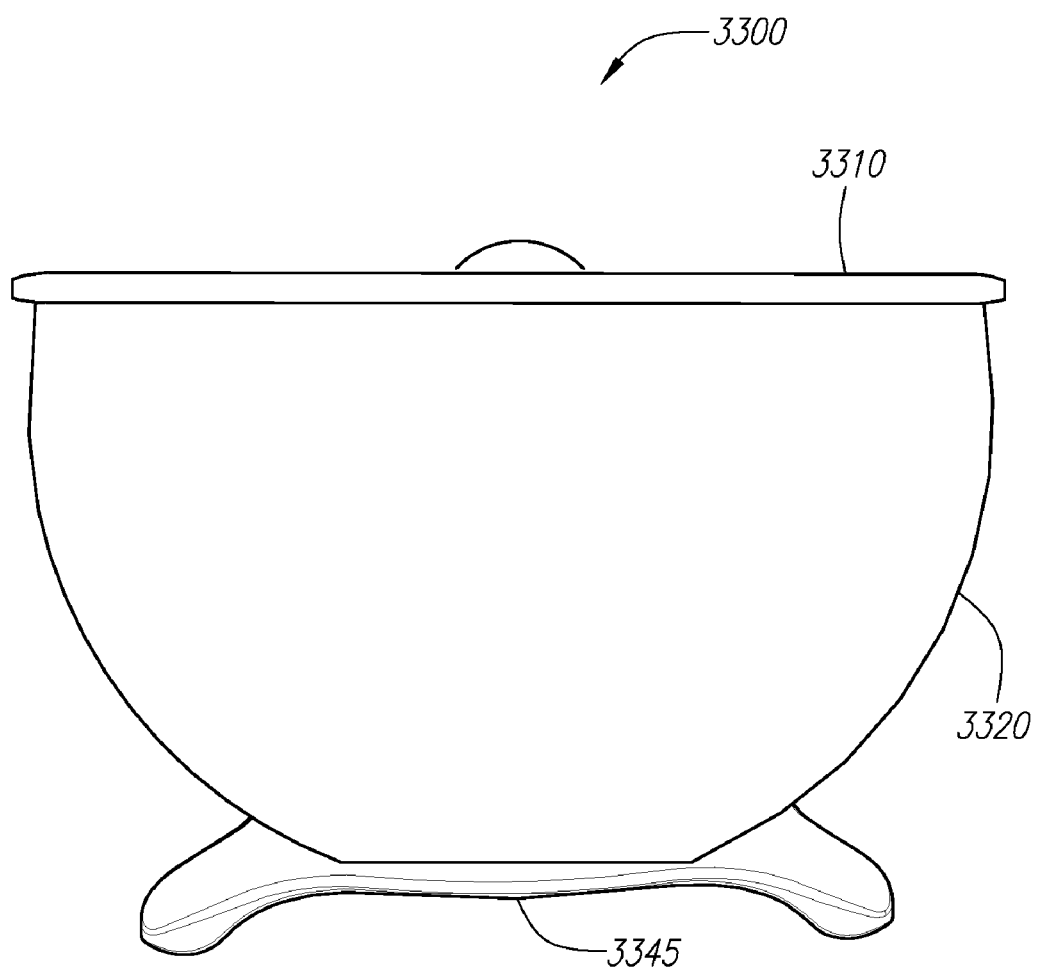
FIG. 33 is a side elevation view of an apparatus for fruit display comprising a first display part, a second display part, and a base part.

FIG. 33 shows a fruit ripening display, 3300, comprising a first display part, 3310, a second display part, 3320, and a base part, 3345. As shown, base part 3345 has substantially recessed areas through which gas from the ripening chamber may pass to the outside atmosphere. In this embodiment, first display part, 3310, comprises a vent insert receiving area. The vent insert receiving area may receive a vent insert, such as shown in FIGS. 7-9, or some other kind of vent insert. In this embodiment, the second display part comprises integral vents, although vent inserts and a vent insert receiving area may be used.

Figure 34:
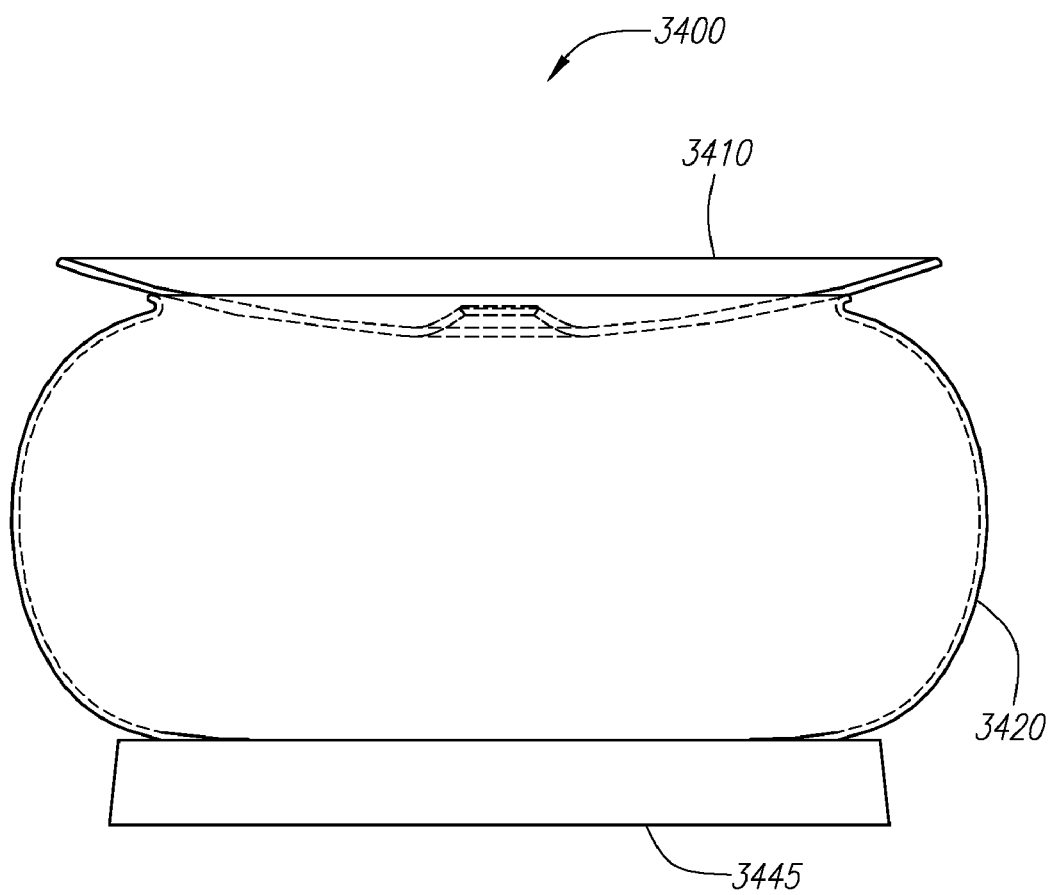
FIG. 34 is a side elevation view of an apparatus for fruit display comprising a first display part, a second display part, and a base part.

FIG. 34 shows a fruit ripening display, 3400, comprising a first display part, 3410, second display part, 3420, and base part 3445. Base part 3445, like all base parts disclosed herein, may have integral vents, it may have recessed areas, and may be additionally, or alternately, elevated by balancing surfaces, such as feet, to promote gas exchange from the ripening chamber to the outside. In this embodiment, first display part, 3410, comprises a vent insert receiving area that is elevated relative to the surrounding support surface for ripening fruit, and a flat vent insert, both shown in dotted lines. In this embodiment, the second display part comprises integral vents, although vent inserts and a vent insert receiving area may be used.

Figure 35:
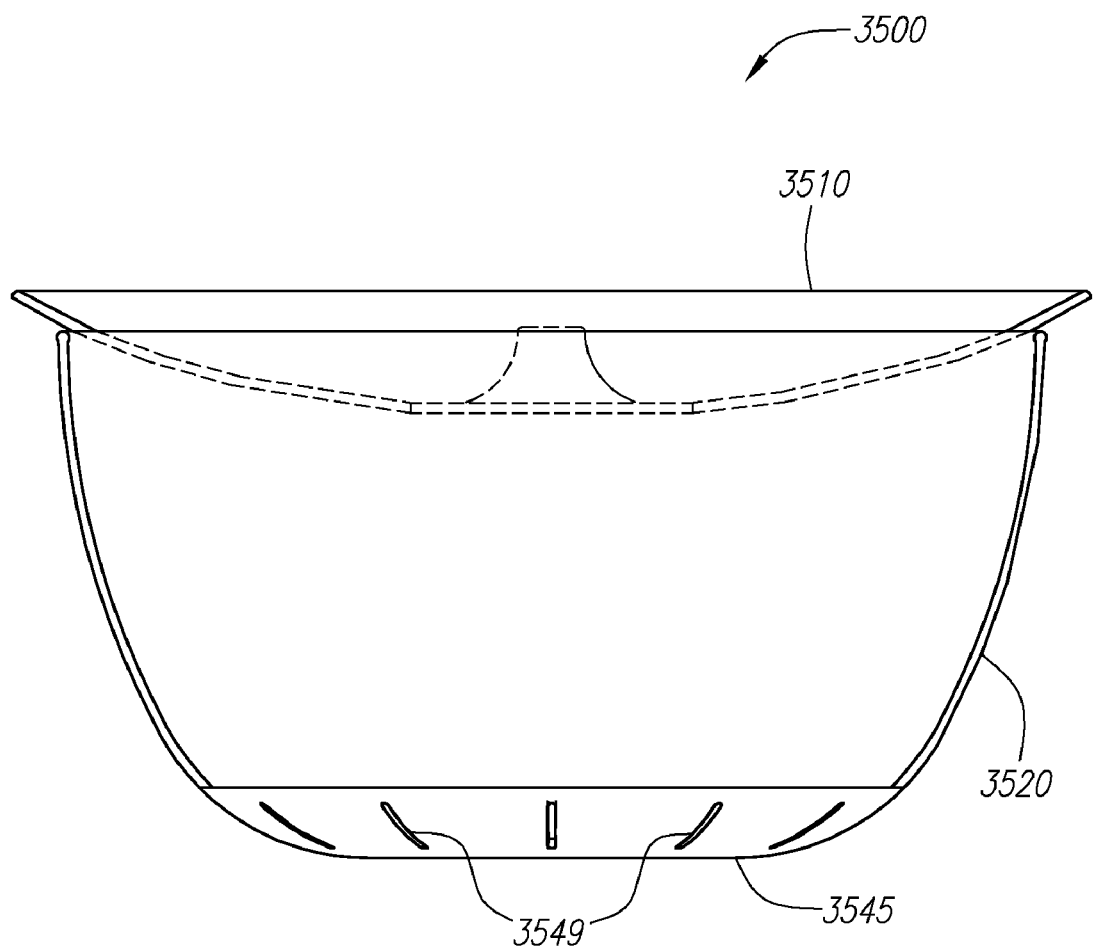
FIG. 35 is a side elevation view of an apparatus for fruit display comprising a first display part, a second display part, and a base part.

FIG. 35 shows a fruit ripening display, 3500, comprising a first display part, 3510, second display part, 3520, and base part 3545. Base part 3545 is concave and nestles the second display part 3520. Base part 3545 also has integral vents, 3549. Like the other base parts disclosed herein, it may have recessed areas, and may be additionally, or alternately, elevated by balancing surfaces, such as feet, to promote gas exchange from the ripening chamber to the outside. In this embodiment, first display part, 3510, comprises a vent insert receiving area that is level with the elevated relative to the surrounding support surface for ripening fruit, and a flat vent insert, both shown in dotted lines. In this embodiment, the second display part comprises integral vents, although vent inserts and a vent insert receiving area may be used.

Figure 36:
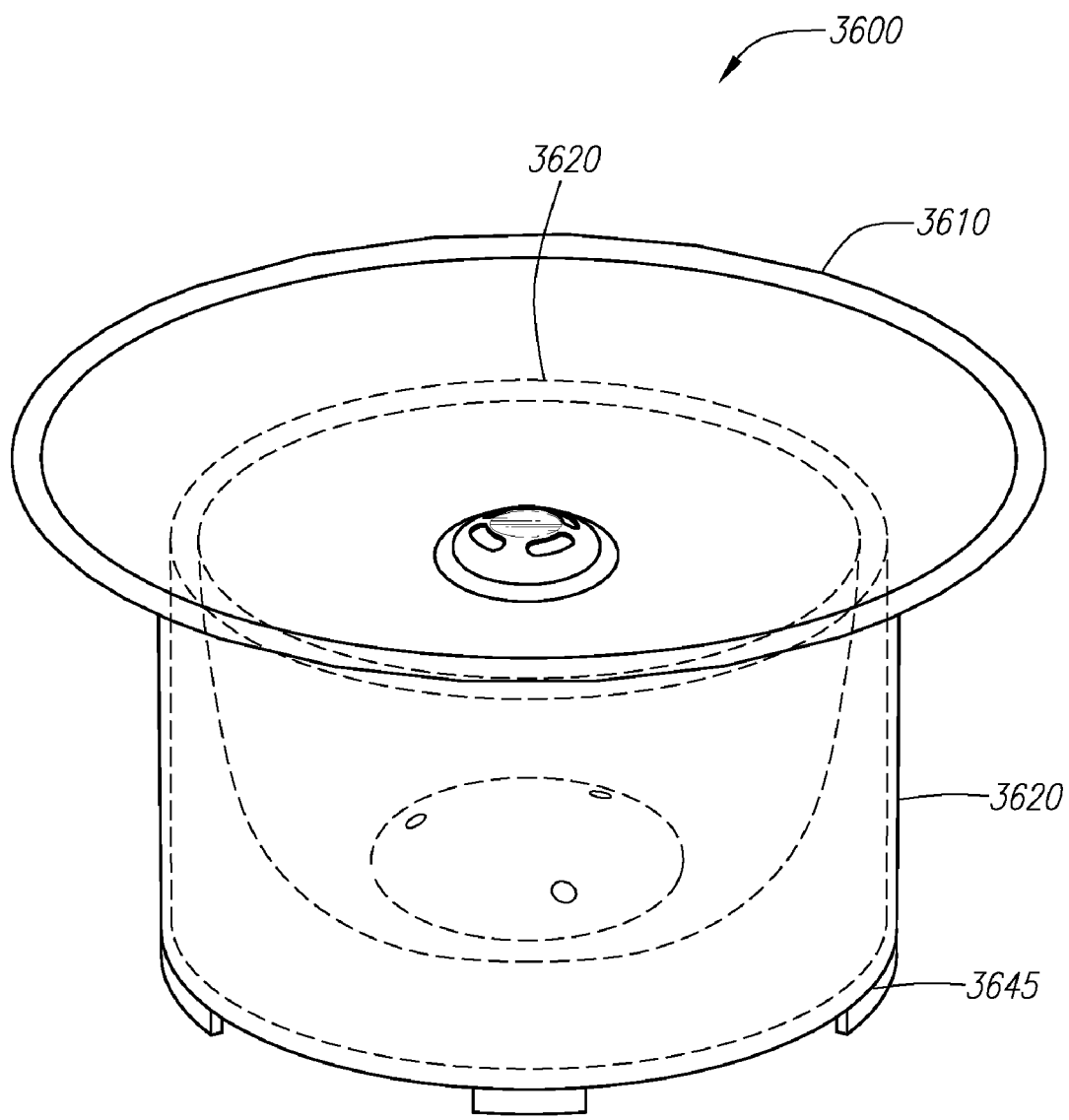
FIG. 36 is a side elevation view of an apparatus for fruit display comprising a first display part and a second display part having a double wall.

FIG. 36 shows an embodiment, 3600, tested as Unit 3 as described in the Experimental Results section, comprising a first display part that is a platform top 3610 and a second display part 3620. Second display part 3620 comprises a double wall, that is preferably transparent to permit examination of the fruit. When combined, the first display part and the second display part form a substantially hemispherical fruit ripening chamber. As tested, the platform top 3620 comprises a central vent insert receiving area, and a vent insert like the one in FIGS. 7a-c, but with a flattened top, rather than a domed top. Likewise, the second display part 3620 comprises a central vent insert receiving area and a vent insert, similar to the one in FIG. 9a-c. In this embodiment, the second display part is elevated by a thin base part 3645 (not shown) that is open through its middle and comprises balancing surfaces in the form of feet (three of which are visible in the drawing). In this embodiment, the chamber is substantially hemispherical. As tested, the vent insert vents at the bottom of the chamber were about 6 mm in diameter and located about 53 mm from the center of the vent; the four vent insert vents at the top of the chamber were about 32 mm from the center, and, when half covered with tape (as was done with the working examples), measured about 18 mm by 8 mm. The substantially hemispherical chamber had an internal height of about 155 mm, a diameter of about 270 mm at its top and the internal fruit support surface, which comprises the vent insert, had a diameter of about 140 mm. The first display part, a platter top, had an outer diameter of about 370 mm. As shown, for both vent inserts the vents were raised relative to the surrounding fruit support surface in order to inhibit fruit from blocking the vents. The vent insert of the second display part creates a convex area at the bottom of the substantially hemispherical chamber.

Figure 37:
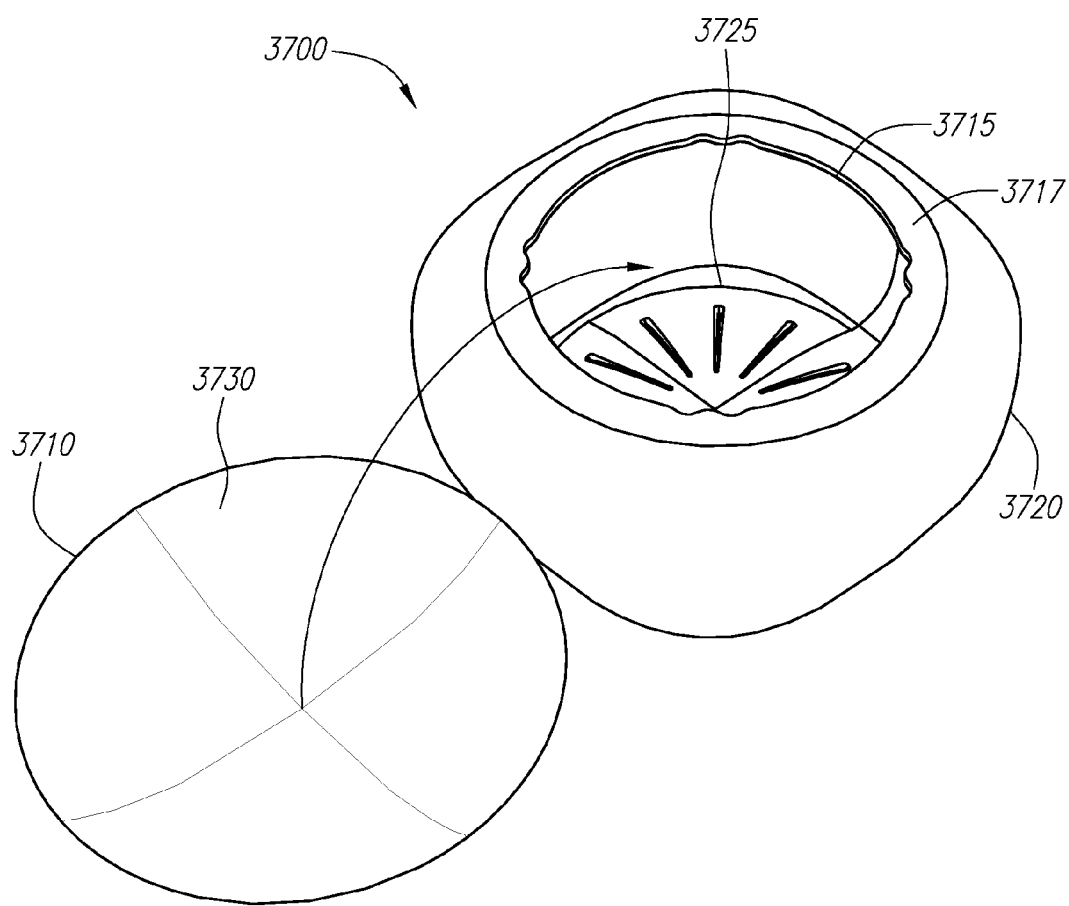
FIG. 37 is a side elevation view of an apparatus for fruit display comprising a first display part and a second display part.

FIG. 37 shows an embodiment 3700 that was tested as Unit 8 as described in the Experimental Results section. It comprises a platform top 3710, having a support surface for ripening fruit 3730, and second display part, 3720, with a second display part vent insert receiving area, 3725, and a vent insert as shown. As shown, vent insert's vents were raised relative to the surrounding surface for ripening fruit to inhibit fruit from blocking the holes. The vent insert of the second display part creates a convex area at the bottom of the over-inflated box shaped chamber. On the inside, the over-inflated box formed a chamber about 260 mm wide, 260 mm long, and 110 mm high. During testing half of every third slot-shaped vent was left open, and the rest were taped over. The slots were about 2.5 mm wide and 35 mm long before being covered with tape. For this embodiment, the second display part comprises a first display part receiving area, 3715, which in turn comprises a notched bezel, 3717, which receives first display part 3710. The notches of the bezel approximated half circles with radii of about 8 mm. Gas is exchanged between the chamber and room atmosphere through the gap between the notched bezel and the underside of the platform top 3710, rather than through a vent insert. Alternately, instead of a notched bezel this gas exchange may occur directly through a gap existing between the first display part and the second display part when they are combined. First display part fruit platform 3730 may be ridged or have other fruit guides to prevent fruit rolling and bruising and promote fruit stability. In this embodiment, the chamber is the shape of an over-inflated box, which is defined as a box-like chamber whose internal edges have been rounded.

Figure 38A:
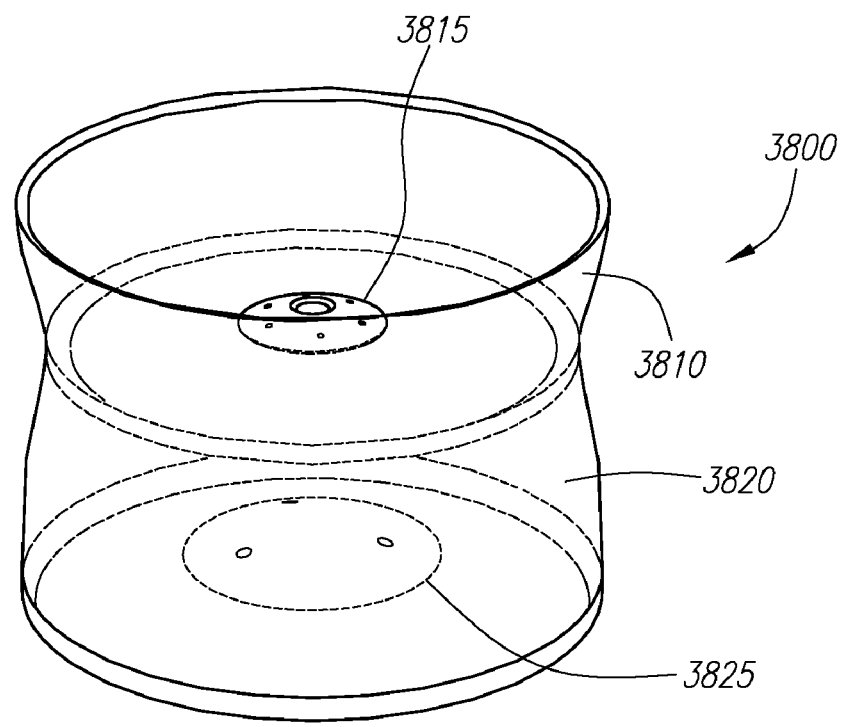
FIGS. 38a-b shows a perspective view and a side elevation view of an apparatus for fruit display comprising a first display part and a second display part.
Figure 38B:
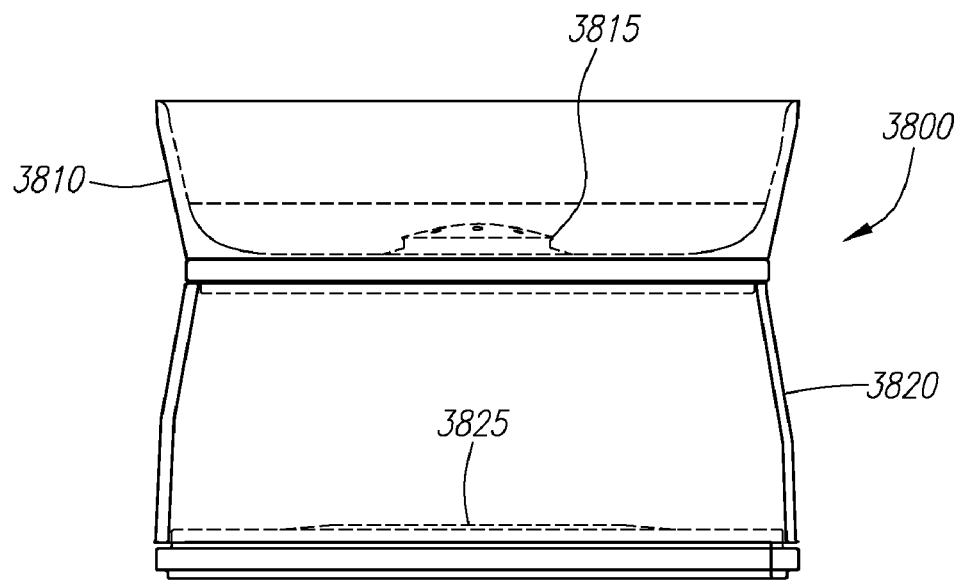
Figure 39A:
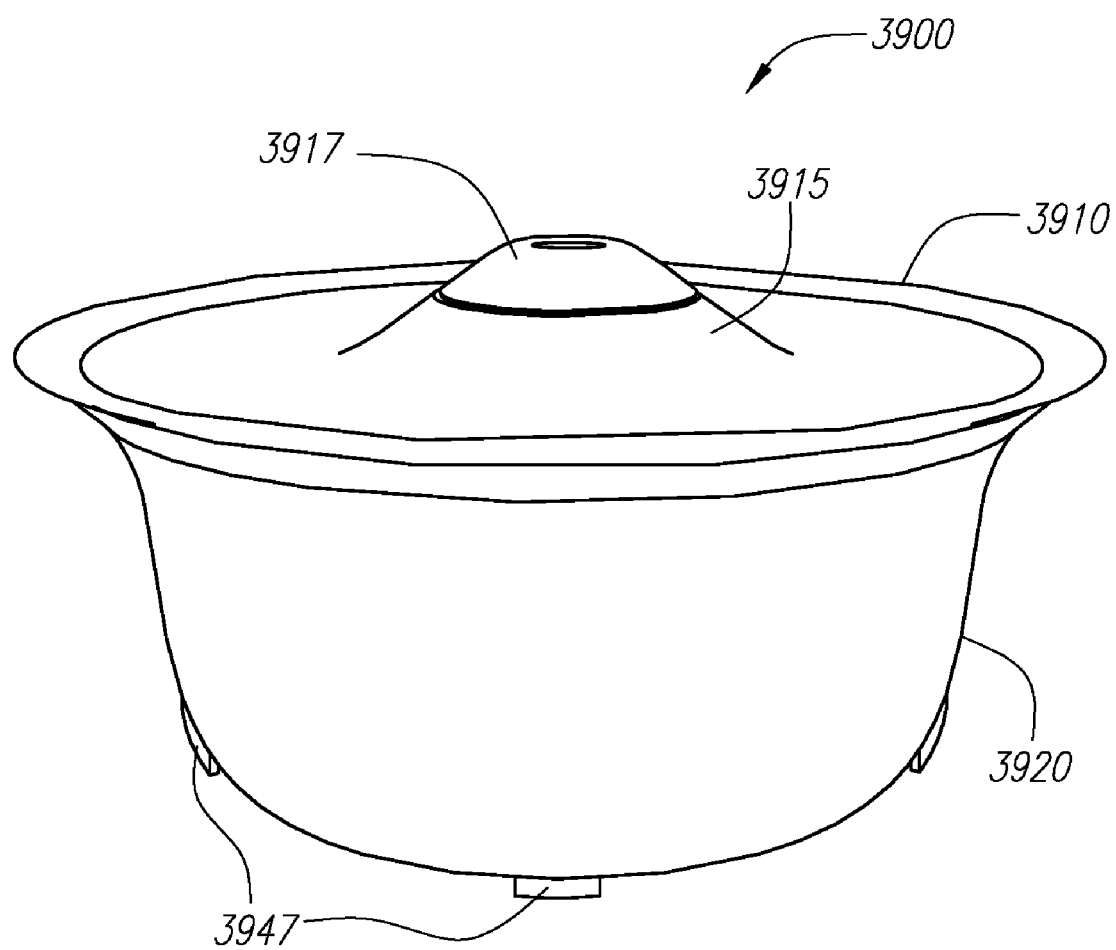
FIGS. 39a-b shows a perspective view of an apparatus for fruit display comprising a first display part and a second display part in closed and open configurations.
Figure 39B:
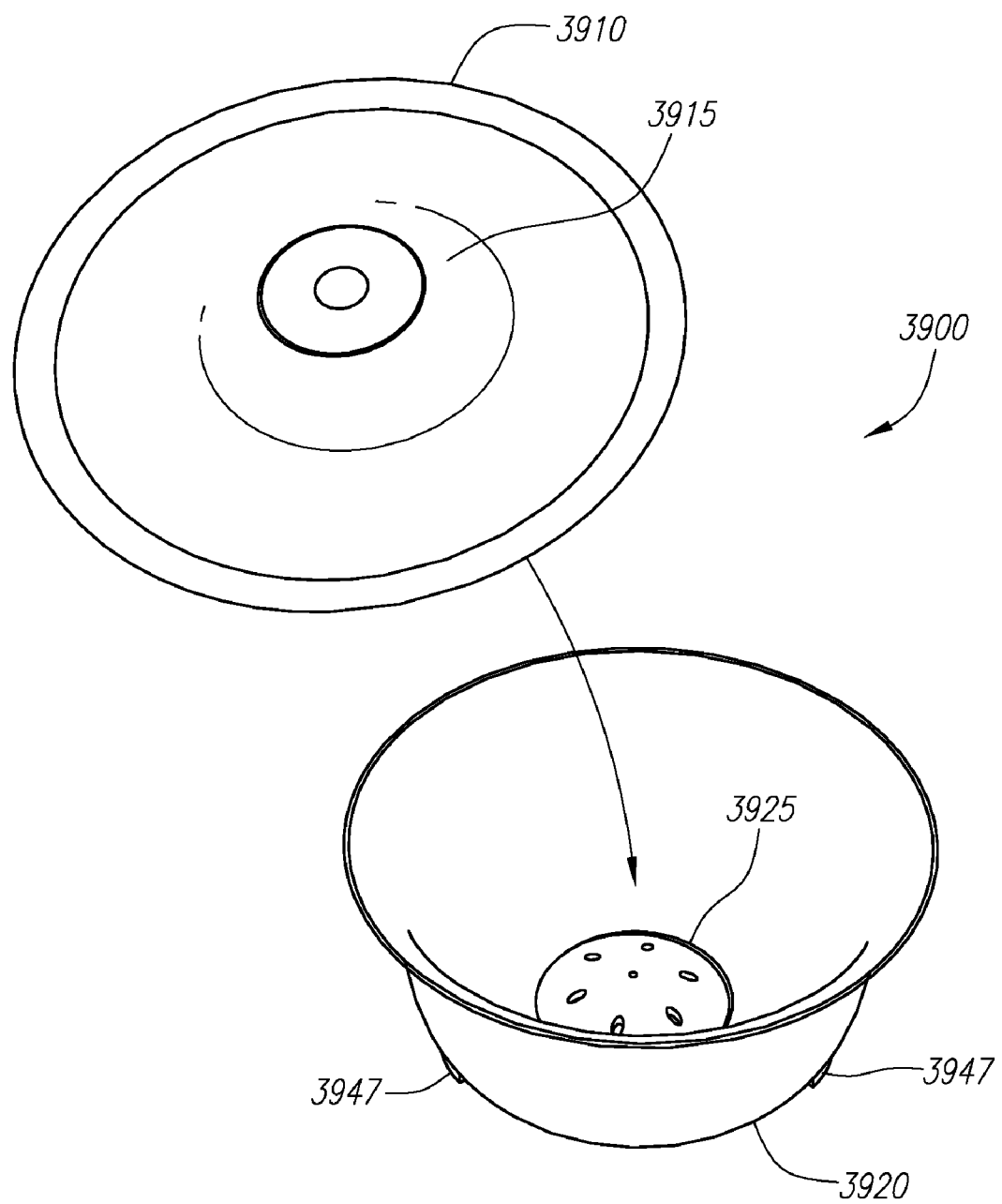

FIGS. 38*a-b* shows an embodiment, 3800, tested as Unit 4 as described in the Experimental Results section. It comprises a first display part that is a platform top 3810 but with high side walls relative to the vent insert receiving area 3815 and the vent insert. It further comprises a second display part 3820. When combined with the first display part, the second display part 3820 comprises a substantially cylindrical fruit ripening chamber, which along with the high side walls of the first display part creates less consistent in its fruit flavor. See Experimental Results below.

As tested, the support surface inside the chamber had a diameter of 235 mm, an internal height of 140 mm, and a top opening 270 mm in diameter. The platform top 3820 had an internal height of about 55 mm, a diameter on its fruit support surface of 210 mm, and a diameter at its top opening of 240 mm comprises a central vent insert receiving area, 3815, and a vent insert. Likewise, the second display part 3820 comprises a central vent insert receiving area 3825 and a vent insert similar to the one shown in FIGS. 9*a-c*, with 5 mm diameter vents. In this embodiment, the second display part is elevated with balancing surfaces in the form of feet (not shown). Further, the chamber is substantially cylindrical, with the cylinder getting wider at the top, but with substantially flat top and bottom surfaces. As shown, for both vent inserts the vents are raised relative to the surrounding surface for ripening fruit so as inhibit fruit from blocking the vents. Further, the vent insert of the second display part creates a convex area at the bottom of the substantially cylindrical chamber.

FIGS. 39-47 show various alternate ripening displays that have unique features or illustrate additional concepts that may be combined with the other embodiments. FIGS. 39*a-b* shows a ripening display 3900 with a first display part 3910, second display part, 3920, and vent insert receiving areas, 3915, and 3925. The second display part, 3920, may rest on a balancing surface comprising feet 3947. The vent insert receiving area is elevated such that when it receives the vent insert 3917, the vents are higher than the rim of the first display part 3910. This elevated vent feature may be beneficially employed in the other embodiments disclosed herein, including that of FIGS. 15 and 16.

Figure 40A:
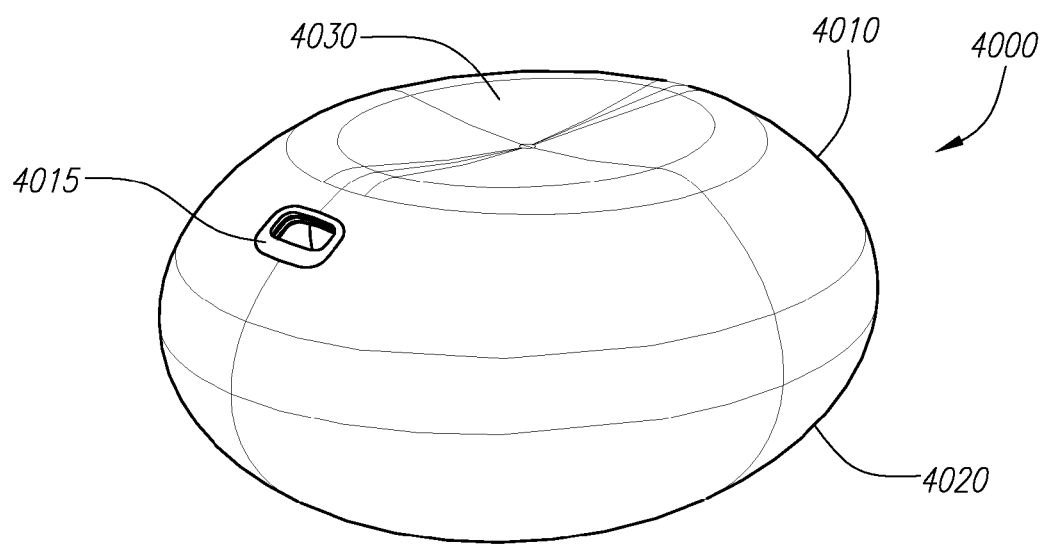
FIGS. 40a-b shows a perspective view of an apparatus for fruit display comprising a first display part and a second display part in closed and open configurations.
Figure 40B:
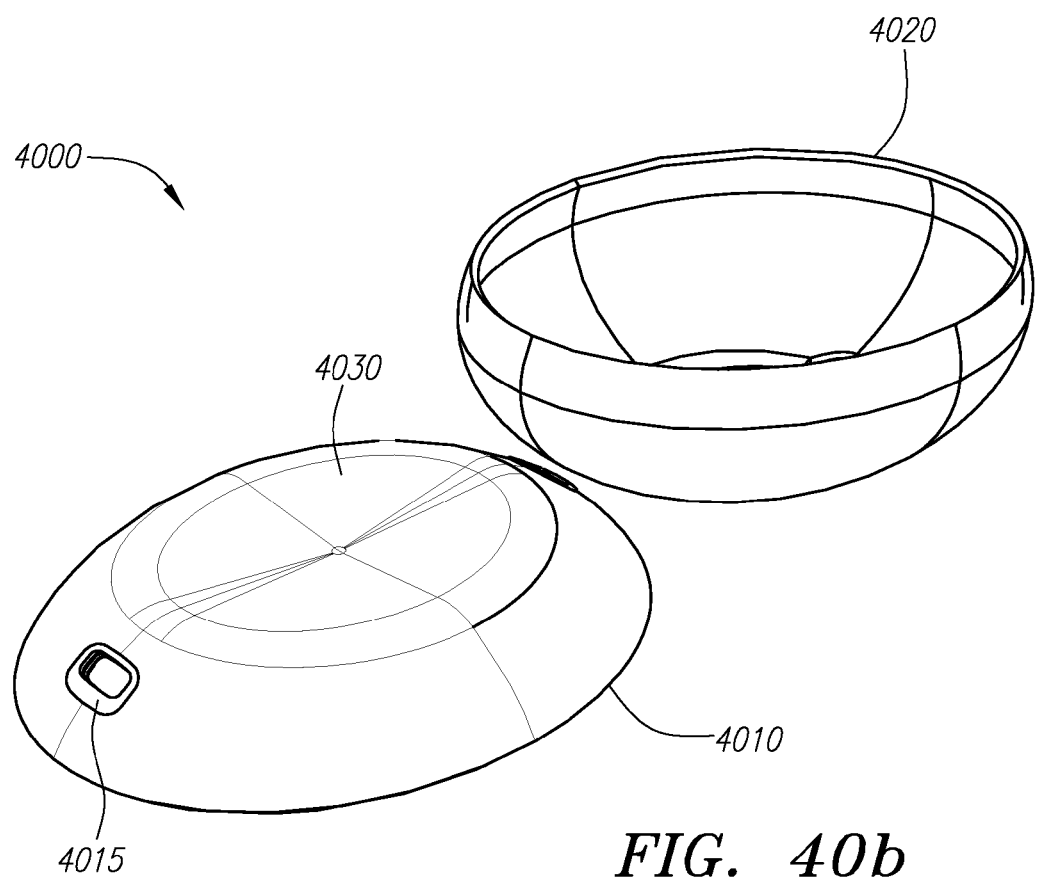

FIGS. 40*a-b* shows an alternate ripening display, 4000, in which the receiving area, 4015, comprises a vent insert that further comprises a lifting surface for the first display part, 4010. The lifting surface may be on the side of the first display part, as shown. A second vent insert receiving area and a vent insert comprising a lifting surface may be included on the opposite side of the first display part. Although the lifting surface functions as a side handle as shown, in a preferred embodiment, the lifting surface may be located on fruit support surface 4030 itself, and may be comprised by a vent insert. These features may be beneficially employed in the other embodiments disclosed herein, including that of FIGS. 15 and 16.

Figure 41A:
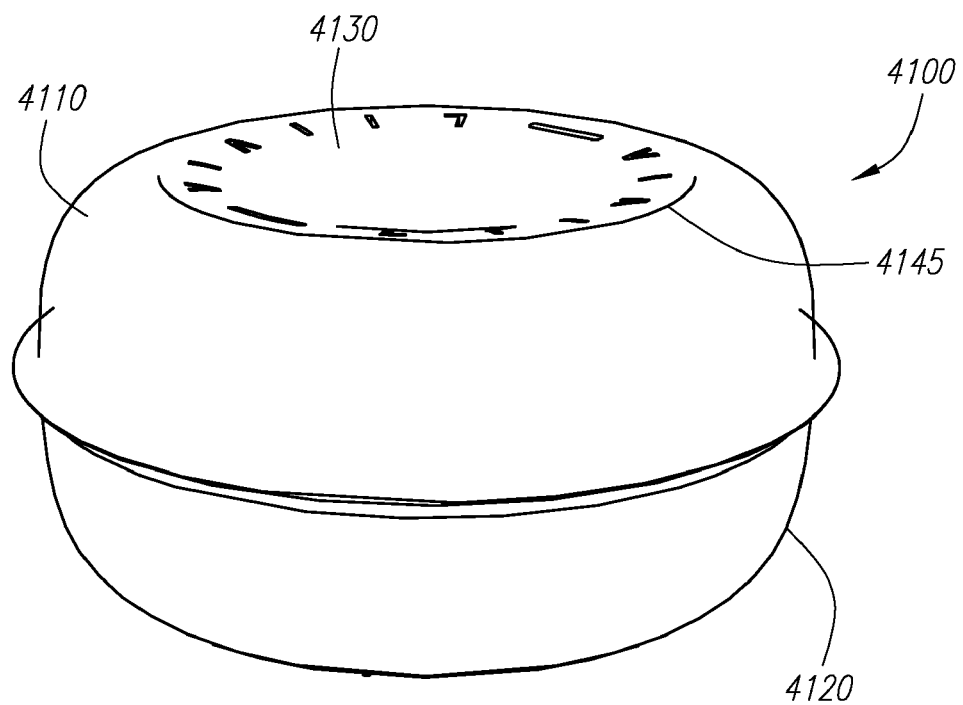
FIG. 41a-b shows a perspective view and a side elevation view of a closed apparatus for fruit display comprising a first display part and a second display part.
Figure 41B:
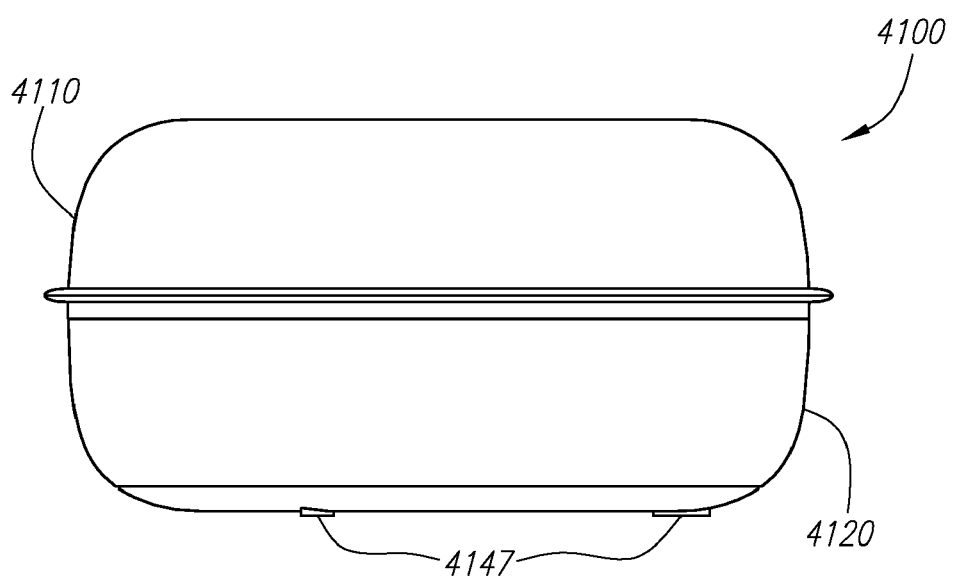

FIG. 41*a-b* shows an alternate ripening display where the first display part, 4110, and the second display part, 4120, are near identical parts that combine together like a shell. (One or both parts may have balancing surfaces such as feet 4147 to elevate the ripening display off the table or other surface and permit gas exchange between the ripening chamber and the outside environment.) The vents in the first and/or second display parts can be created through lettering that is cut, punched or otherwise formed through the parts. This is shown for fruit platform 4130. Alternately, the fruit support surface for ripening fruit may comprise a vent insert receiving area 4145 and a vent insert, whose vents are formed by lettering cut, punch or otherwise formed through the vent insert. These features may be beneficially employed in the other embodiments disclosed herein.

FIGS. 42*a-b* shows an alternate ripening display where the vent insert receiving area, 4215, comprises a lifting surface. In this case, the vent insert 4217 may function as a knob for lifting. Moreover, alternately or additionally, the vent insert receiving area may comprise additional integral vents (not shown). In another alternate aspect, the second display part may comprise an elevated area for holding a piece of fruit. It may be desirable to place a piece of already ripened fruit in the center of the ripening chamber to facilitate ripening. But the ripened fruit is beneficially kept from significant direct contact from the fruit to be ripened. Thus, the ripening display may comprise a ripe fruit holding area within the ripening chamber. As shown, the second display part's vent insert receiving area 4225 comprises a vent insert that contains an elevated portion upon which a ripe piece of fruit may rest. These features may be beneficially employed in the other embodiments disclosed herein.

Figure 43A:
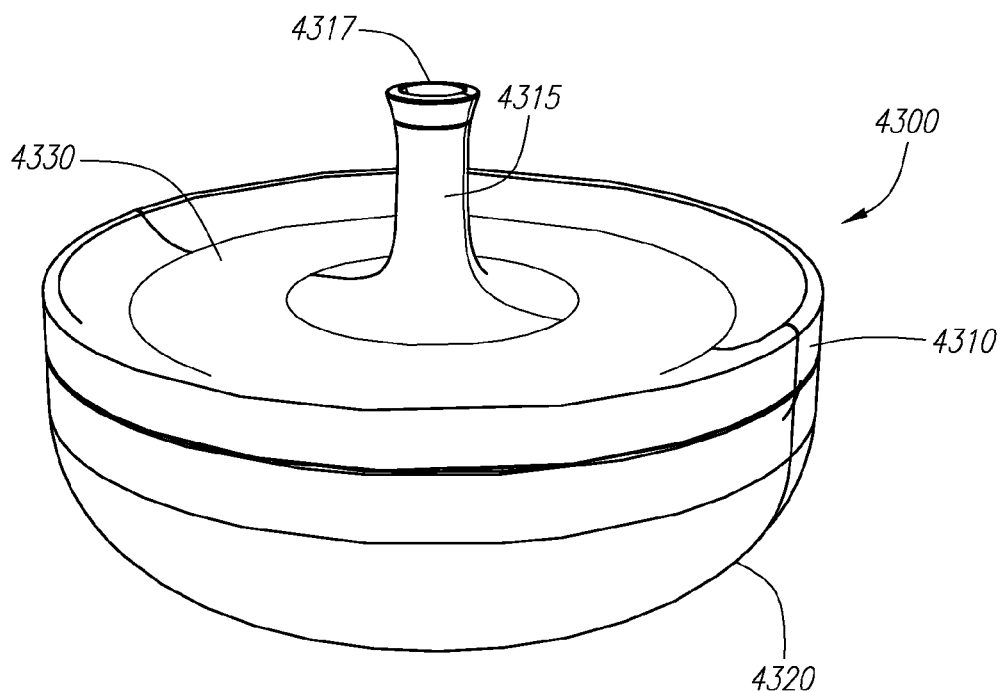
FIGS. 43a-b shows a perspective view of an apparatus for fruit display comprising a first display part and a second display part in closed and open configurations.
Figure 43B:
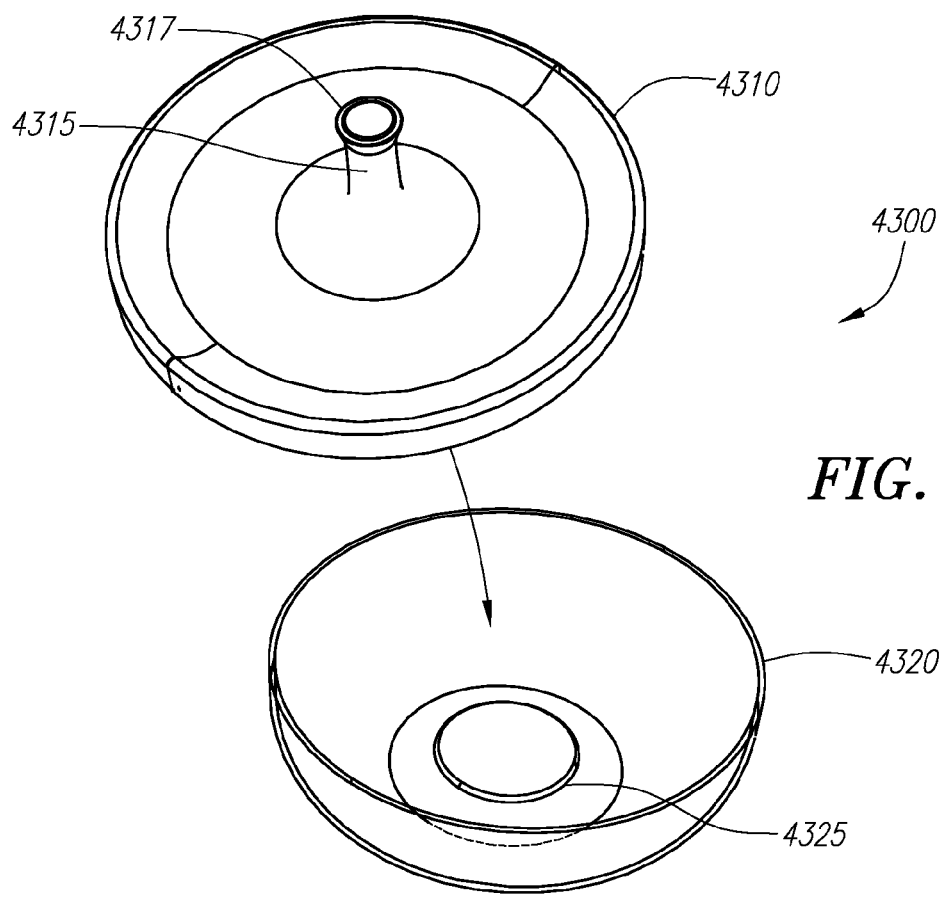

FIGS. 43*a-b* shows a variation on the alternative ripening display of FIGS. 42*a-b*. In this variation, the first display part comprises a lifting surface, in this case, a handle. As shown, the vent insert receiving area, 4315, comprises the lifting surface. The vent insert, 4317, comprises a ring. However, the lifting surface may be integral or attached to the first display part, without a vent insert receiving area or a vent insert. Alternately, the first display part may comprise a vent insert that itself comprises the lifting surface. These features may be beneficially employed in the other embodiments disclosed herein.

Figure 44A:
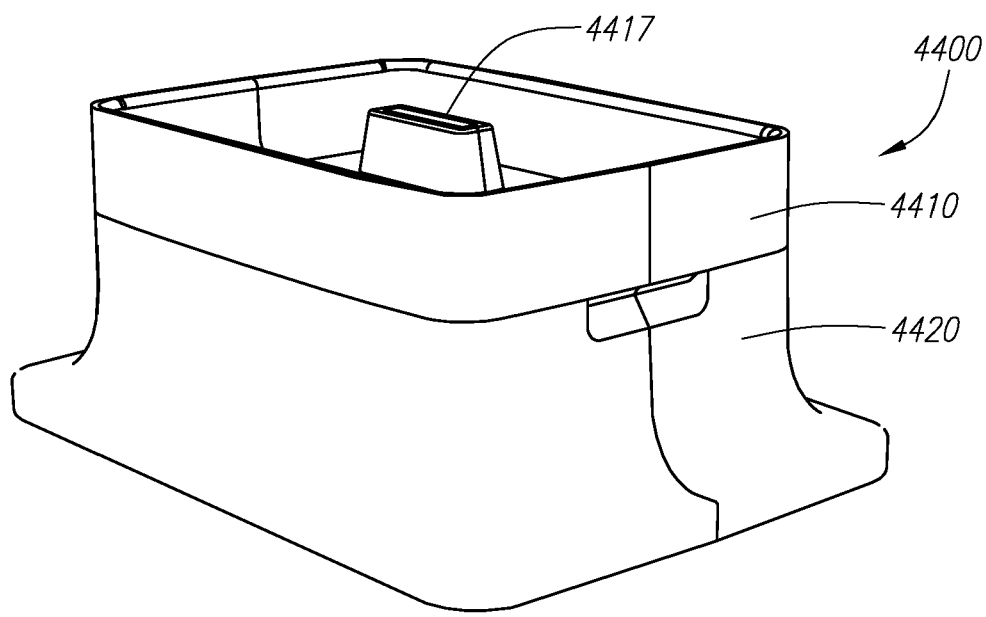
FIGS. 44a-b shows a perspective view of an apparatus for fruit display comprising a first display part and a second display part in closed and open configurations.
Figure 44B:
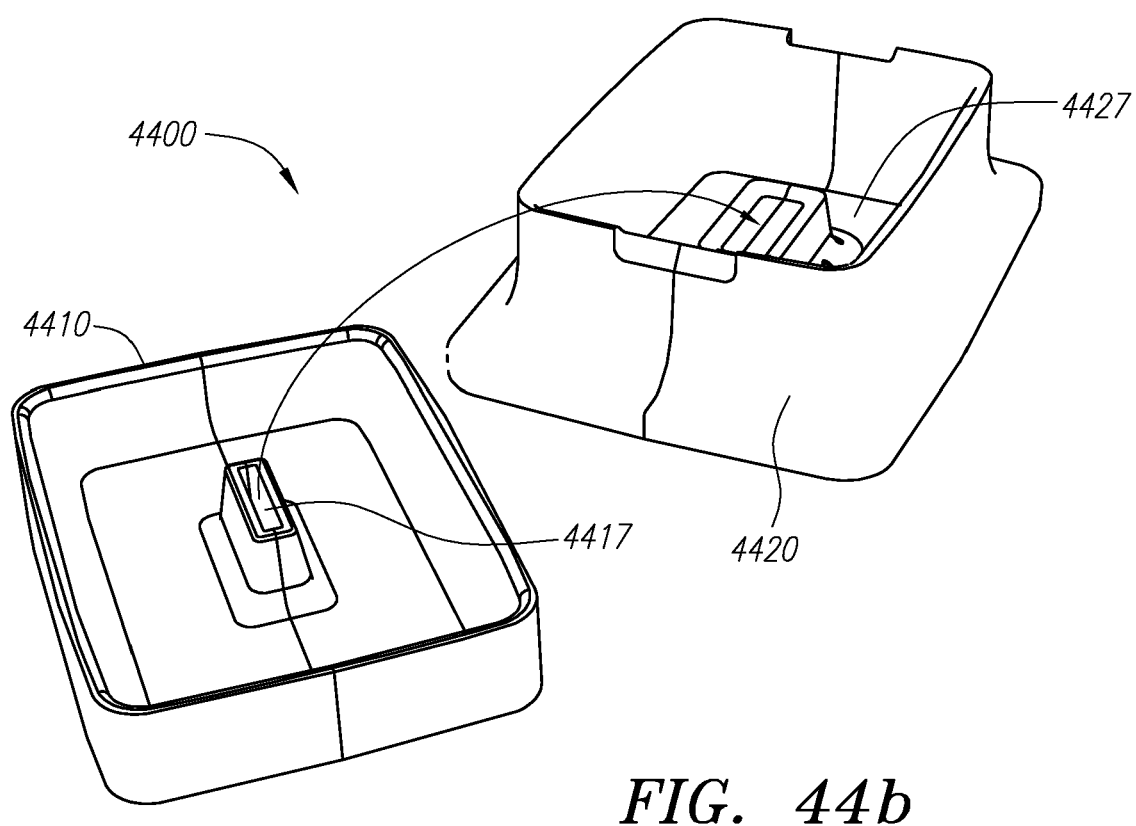
Figure 45A:
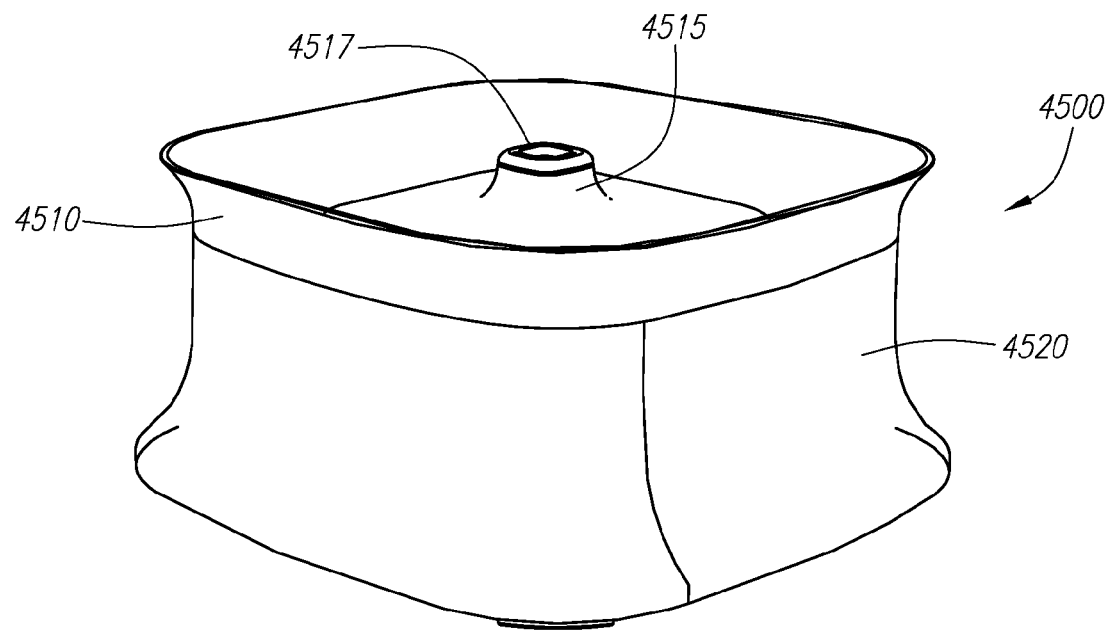
FIGS. 45a-b shows a perspective view of an apparatus for fruit display comprising a first display part and a second display part in closed and open configurations.
Figure 45B:
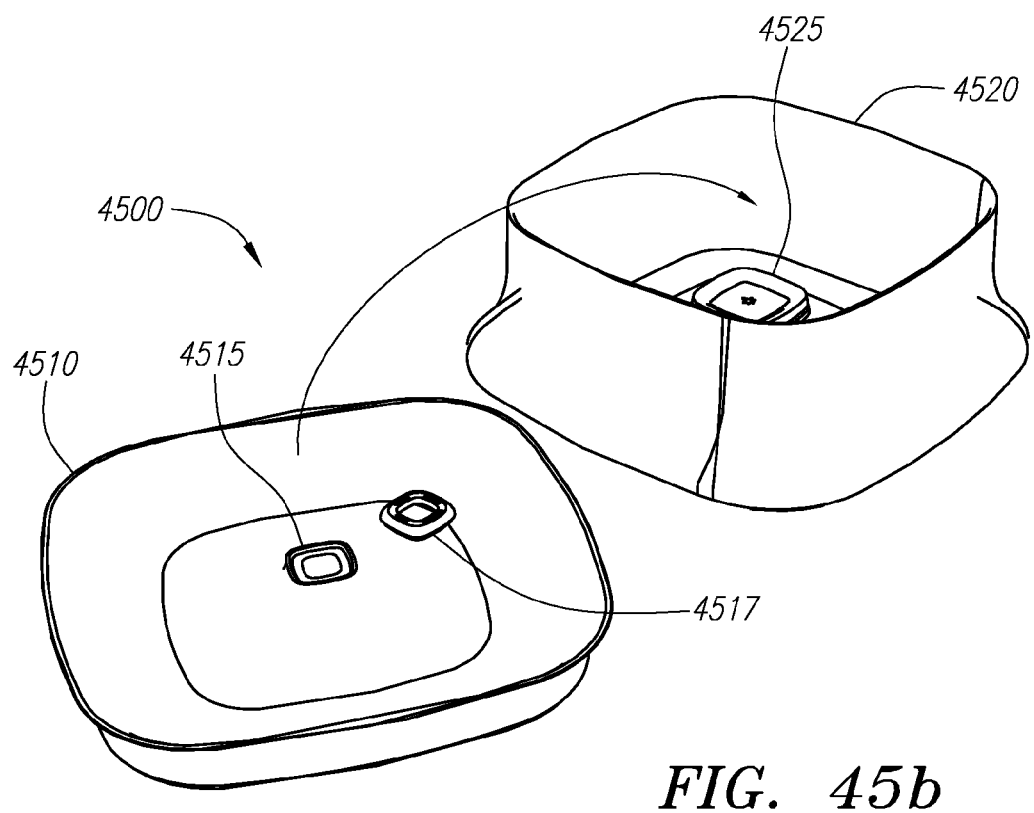
Figure 46A:
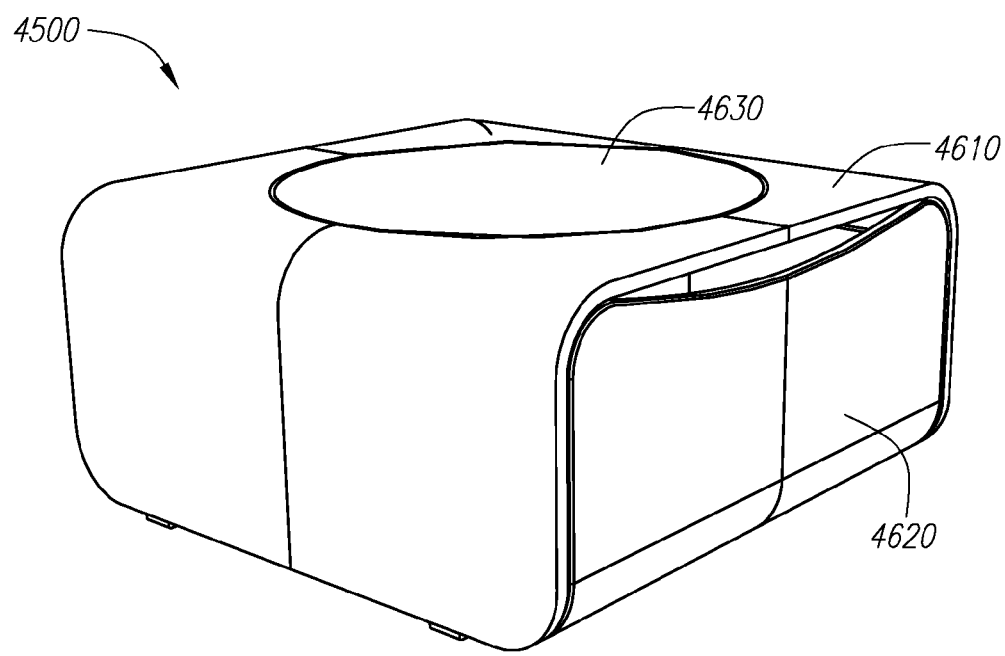
FIGS. 46a-b shows a perspective view of an apparatus for fruit display comprising a first display part and a second display part in closed and open configurations.
Figure 46B:
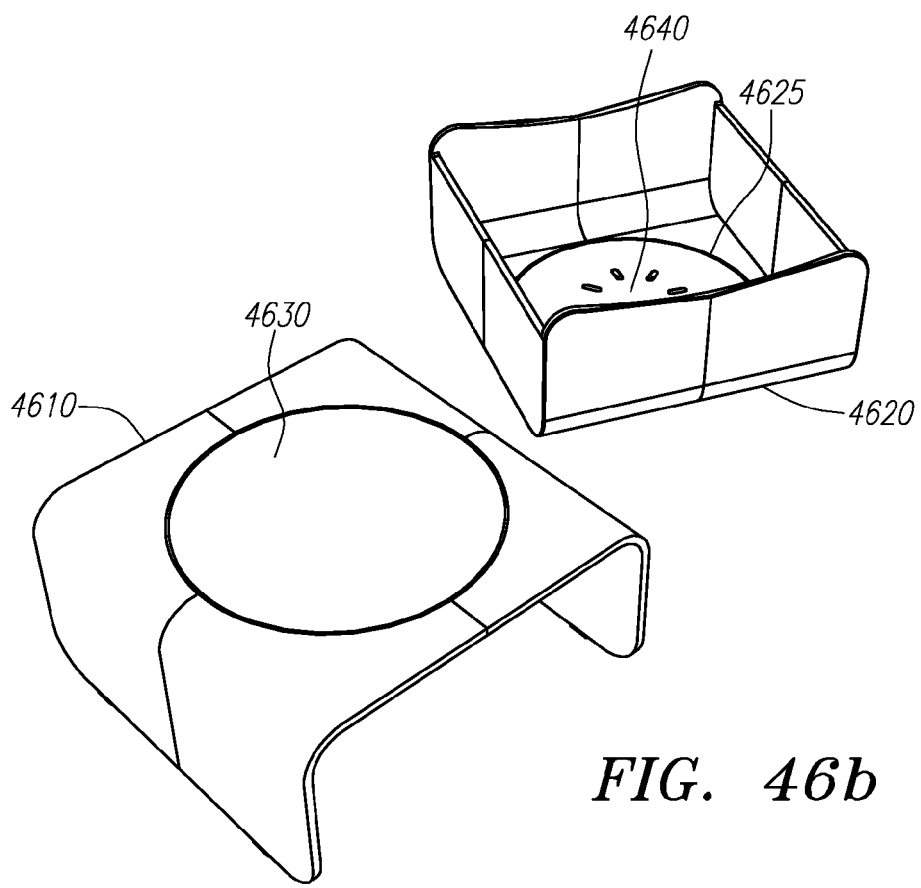

FIGS. 44*a-b* shows a less preferred ripening display 4400, having a rectangular, flat bottom fruit chamber. (A rectangular flat bottom is less desired at least because the fruit spreads out and the ripening gas exposure is uneven). The first display part 4410 comprises a vent insert 4417 and second display part 4420 comprises a vent insert 4427. FIGS. 45*a-b* shows a less preferred ripening display 4500, with squared shape fruit ripening chamber, having rounded internal surfaces. The first display part comprises a vent insert receiving area, 4515, and a vent insert, 4517. Likewise the second display part comprises a vent insert receiving area, 4525, and a vent insert. Alternately, in both FIGS. 44 and 45 the top and second display parts may comprise integral vents. FIG. 46 likewise shows a less preferred ripening display with a rounded square-like fruit chamber. In this case, however, the first display part vent is formed by a gap in the intersection of the first display part 4610 and the second display part 4620. Although the vents are shown as formed on the sides, more preferably the vents are located on the first display part for reasons of gas exchange. Thus, the first display part may have the sloped edge that creates a gap with a straight edged side surface. Further, this display, demonstrates a first display part 4610 that may slide off the second display part in a horizontal direction. These features may be beneficially used with other the first display parts and second display parts disclosed herein.

Figure 47A:
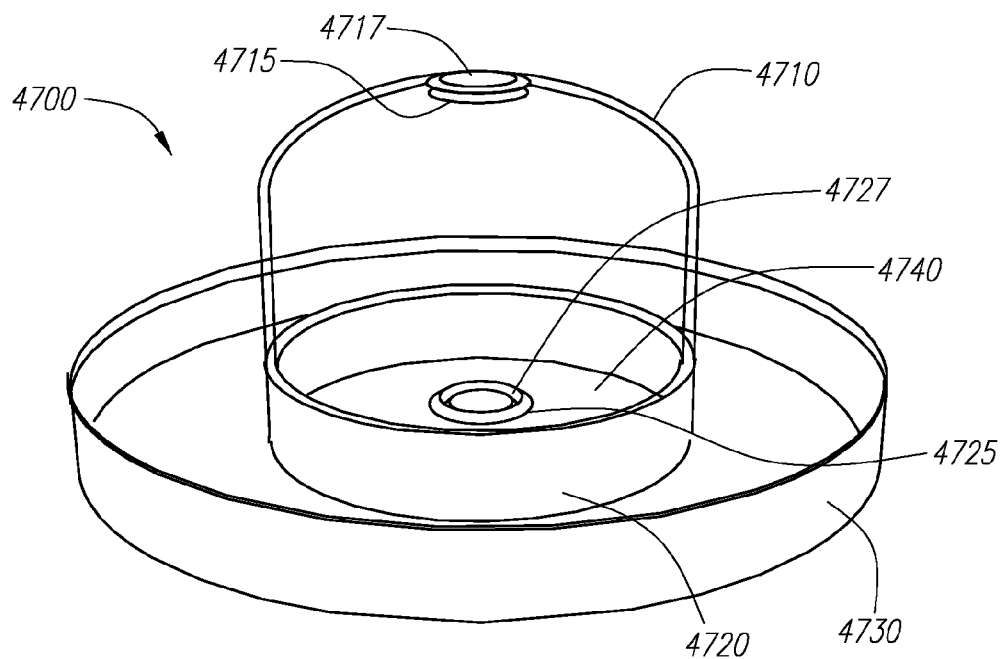
FIGS. 47a-b shows a perspective view of an apparatus for fruit display comprising a first display part and a second display part in closed an open configurations.
Figure 47B:
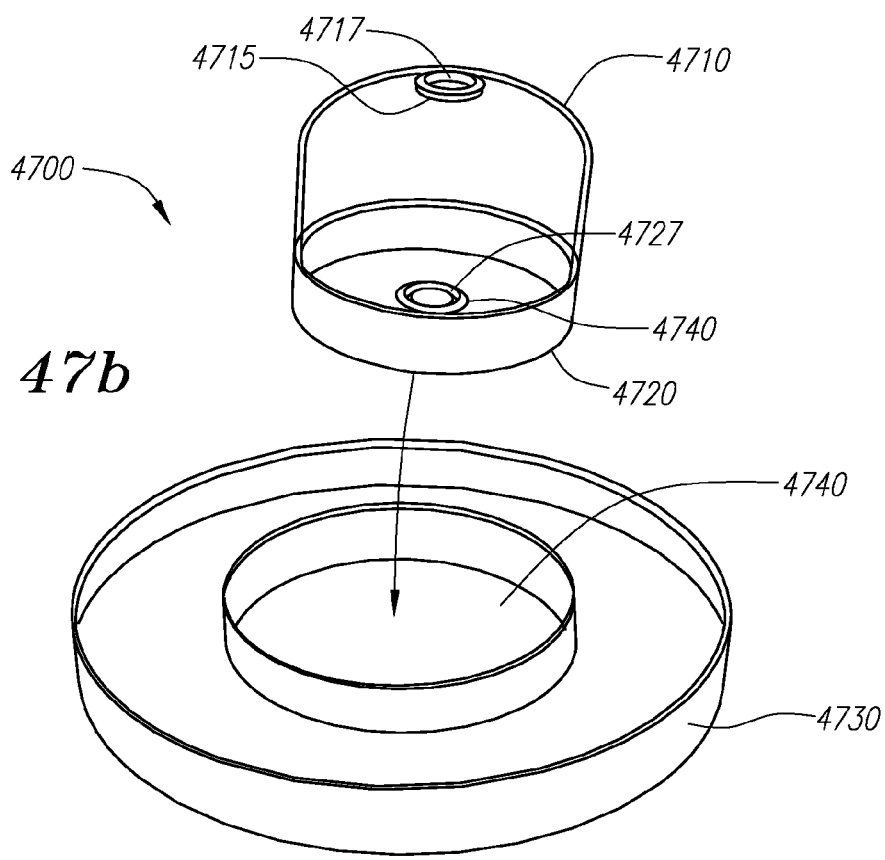

FIGS. 47*a-b* shows a distinct, alternate embodiment, 4700 where the second fruit platform is separable from the ripening chamber without opening the chamber to air. In the particular version shown here, the fruit platform 4730 comprises a ring that receives both a first display part 4710 and a second display part 4720. The first display part may have a vent insert receiving area, 4715, and a vent insert, 4717, as shown. Likewise, the second display part may comprise a vent insert receiving area, 4725, and a vent insert, 4727, in this case, a disc, such that air is passed between the vent insert and the vent insert receiving area. Alternately or additionally, the first display part and second display parts may comprise integral vents. Feet may be used to elevate the base part 4720 and the fruit platform 4730 to permit gas exchange from the fruit-ripening chamber to the outside atmosphere. Although the separable support surface for ripening fruit is shown as a ring, it may take a variety of shapes and locations. Preferably it may be separated without opening the ripening chamber to air. These features may be beneficially used with other embodiments disclosed herein.

FIGS. 48 and 49 show that the second display part may be elongated and have an inwardly sloping and predominantly upwardly curvilinear support surface for ripening fruit. In an alternate embodiment according to the first aspect, at least one fruit support surface for ripening fruit is elastic (defined as returning to an initial form after deformation).

Other alternative embodiments whose features may be beneficially used with each of the embodiments disclosed herein are possible. In one alternate embodiment, the ripener has at last one macro opening in its side for air circulation. A macro opening is defined as an aperture greater than 1 mm wide, preferably between 2 mm-40 mm wide, and preferably between 7 mm and 35 mm wide, and still more preferably between 5 mm and 25 mm wide. As shown in FIG. 50, the ripener may comprise first display part 5010 having fruit support surface for ripening fruit 5030 and second display part 5020 having fruit support surface for ripening fruit 5040. Fruit support surface for ripening fruit 5030 is preferably concave, more preferably concave and at least partly inward sloping, and still more preferably concave, at least partly inward sloping and at least partly curvilinear, and still more preferably concave, at least partly inward sloping, and at least partly upwardly curvilinear, still more preferably concave, at least partly inward sloping, and predominantly upwardly curvilinear, and most preferably concave, at least partly inward sloping, and substantially entirely upwardly curvilinear.

The first display part and second display part have side walls, respectively 5050 and 5025, that, when joined, form a joint side area 5065 having at least one joint macro opening 5075. The joint side area is defined as the external surface surrounding the parts' junction. Still more preferably, the first display part has side walls that are, at least in part, convex and curvilinear, and the second display part also has side walls that are, at least in part, convex and curvilinear. Further, when joined together, the side walls preferably form at least one joint side area portion 5057 that is at least in part inwardly sloped (sloped toward the inside of the ripener), and preferably inwardly sloped and substantially curvilinear, and including a joint macro opening 5075. Thus, the joint side area portion 5057 includes a macro-opening, preferably one that is an inlet, and most preferably one that is vortex-shaped as shown, such that the curvilinear side wall surfaces channel air currents into the ripener vessel. Preferably the joint side area comprises at least two inlets, most preferably vortexes on opposite sides of the ripener, as shown in FIG. 50. Although a joint side area portion that includes a vortex is preferred, alternatively the vortex may be included entirely within the top or second display part. In all these joint side area embodiments, the second display part 5020 is preferably carbon dioxide permeable.

In another alternate embodiment, shown in FIGS. 51-52, the surface contour 5085 below the fruit support surface for ripening fruit 5030 is at least in part concave and downwardly curvilinear, and more preferably substantially entirely concave and downwardly curvilinear. In this preferred embodiment, the second display part's support surface for ripening fruit and the surface contour below the first display part's support surface for ripening fruit create a chamber having curved internal surfaces, and preferably form at least part of a substantially spheroidal chamber 5095 (defined to include substantially spherical, substantially oblate spheroidal or substantially prolate spheroidal shapes). Further, the first display part side walls 5050 and/or the second display part side walls 5025 may be optionally convex and curvilinear, at least in part, and preferably, when joined, form at least one joint side area portion 5057 that is at least partly inwardly sloped and more preferably inwardly sloped and curvilinear, including at least part of an inlet, preferably a vortex. Although a joint side area portion comprising a joint vortex is preferred, a complete inlet may also be formed within the first or second display part. As with other embodiments, preferably the second display part 5020 and its support surface for ripening fruit 5040 are preferably carbon dioxide permeable (made at least in part with a carbon dioxide permeable material and/or containing macro holes).

FIG. 52 shows an alternate embodiment having a first display part that comprises support surface, lip 5082. Lip 5082 rests on the rim 5070 of the second display part such that when the top and second display parts are combined, the first display part's bottom rests within the perimeter of the second display part's rim. Preferably, the first display part comprises a joint surface area that is at least in part convex and curvilinear in at least one place. Preferably an inlet is formed by the side wall of the second display part. The parts may also comprise a joint macro-opening. As with FIG. 51, the surface contour 5085 below the support surface for ripening fruit 5030 is at least in part concave and downwardly curvilinear, and as shown in FIG. 53, more preferably substantially entirely concave and downwardly curvilinear. This results in a chamber 5095 having curved internal surfaces (most preferably forming an irregularly oblate or prolate spheroidal chamber) while reducing the overall height of the ripener. This surface contour 5085 located underneath the fruit support surface may be used with the other embodiments herein, including FIGS. 15 and 16.

FIG. 54 shows an alternative to the lip embodiment of FIG. 53. Rather than a lip, the first display parts side wall includes an outer and inner level forming support surface 5060 at their juncture so that, when the top and second display parts are joined, the support surface 5060 rests on the rim 5070 of the second display part while the first display part's inner level 5090 (or inner sleeve) rests within the perimeter of the rim 5070. This alternative embodiment thus employs the concept of FIG. 17. Preferably, the first display part also comprises a side wall surface that is at least in part convex and curvilinear in at least one place and further comprises at least part of an inlet, preferably part of a vortex, (with the other part at least partially formed by the side wall of the second display part). Likewise, as with FIGS. 51-52, preferably the surface contour 5085 below support surface for ripening fruit 5030 is at least in part concave and downwardly curvilinear, and more preferably substantially entirely concave and downwardly curvilinear, as shown, resulting in a chamber 5095 with curved internal surfaces (most preferably forming an irregularly oblate or prolate spheroidal chamber).

FIG. 55 shows another alternative version of this embodiment, wherein the first display part support surface is a lip 5082 (like in FIG. 53) but lacks downwardly extending walls along parts of its perimeter. Thus, when the first display part is separated from the second display part and balanced, support-surface-up, on a flat surface, the first display part may have a visible underside, such as the arched underside shown. When the first display part is separated from the second display part and balanced on balancing surface 5080, the first display part's fruit support surface for ripening fruit may employ a closable grill or vents. As shown in FIG. 56 (FIG. 55 rotated by ninety degrees), the side wall of the second display part may comprise at least part of an inlet, preferably part of a vortex, with another inlet part, preferably a vortex part. Alternately, the macro-opening may be a joint macro-opening. If the inner level or inner sleeve embodiment of FIGS. 17 and 52 is used, then the inner level or inner sleeve of the first display part may include part of the macro-opening.

FIG. 57 shows an alternate preferred embodiment employing a platform top and a joint macro-opening. Preferably the side 5062 of the platform top is at least in part convex and curvilinear in the joint surface area 5064 (the area where the parts come together). Likewise, the second display part's side wall is preferably at least in part convex and curvilinear at the same portion of the joint surface area and the joint surface area portion comprises at least part of inlet part 5075, most preferably at least part of a vortex part. In this platform top configuration, the underside 5087 of the fruit support surface for ripening fruit is substantially flat. This results in a substantially hemispherical chamber. As with the other platform top embodiments described herein, the platform top's side may comprise an inner and outer level forming a support surface of the first display part, or have a support surface that is a lip, such that, when the first and second display parts are combined, the underside of the first display part's support surface for ripening fruit lies within the perimeter of the rim while its support interface rests on the rim of the second display part. As with other platform top embodiments, the underside of the fruit support surface for ripening fruit may comprise balancing surfaces, such as a substantially flat platform top underside, or one or more feet comprised by the platform top's underside, so that the platform top may balance support-surface-up on a flat surface.

In all embodiments, the side wall macro-openings, which are preferably inlets, and more preferably vortexes, may further comprise lifting surfaces to help the user separate the parts. Thus, the side wall of the first display part preferably comprises at least part of an inlet having a lifting surface. The lifting surface may be textured to facilitate lifting, and most preferably has smooth edges. Although the inlets including lifting surfaces are preferably joint inlets, alternately they may be located entirely within the first display part itself.

Experimental Results for the First Aspect:

Applicants made over a dozen tests of specific features discussed herein. Three designs, FIGS. 36, 37, and 38, were prototyped in SLA (stereolithograpy) plastic models and tested against a Koller-Craft (division of Koller-Enterprises, Inc.) "Ripen Rite" fruit ripening dome (whose shape is shown in the Koller-Craft product insert described in the Background section above) and, for comparison, an open bowl with three vents in its bottom (the bottom half of the "Ripen Rite.") In one test applicants also tested the prototypes against a paper bag. Gas, temperature, and humidity readings were taken, and blind taste tests performed.

Consistent with applicants' understanding of the best mode of using the inventions herein, applicants picked fruit that, although unripe, did not appear to be bruised or damaged in any way. Applicants selected various types of fruit to test, including apples, pears, and bananas (three of the most widely consumed fruits that produce ripening gas). For experimental purposes, in certain experiments applicants changed the source of fruit (such as switching from farmer's market fruit to grocery store bought fruit) and/or fruit variety. Within each experiment, the applicants used the same fruit mix and fruit amount, and placed the fruit in the same relative positions within the units. As is best for practicing the methods of ripening herein, the fruit was not washed before hand and care was taken to avoid bumping or pressing the fruit when placing it in the apparatuses so as to avoid bruising. Although for any particular experiment applicants used the same amount of fruit in each unit, applicants made a consistent effort to pick an amount that substantially filled all the units. Applicants believe that ripening gas concentration is effected by the amount of unused volume in the chamber, and thus the best mode of use is to substantially fill the chambers for use.

The applicants performed the ripening experiments at room temperature, as is generally best for post-store purchase ripening. Both temperature and humidity levels varied with room atmosphere. In each experiment, the fruit was monitored for ripeness, and generally removed on the third or fourth day when the fruit was ripe. Consistent with the best mode of practicing the invention, fruit was examined for color, softness and bruising in order to determine its state of ripeness. In Experiments Five through Ten, the chamber was opened to air daily or every other day and certain of the fruit briefly examined by hand in order to simulate consumer behavior. Upon final removal of the fruit from the units, the fruit was then promptly washed, peeled, cut and eaten in a blind taste test.

Applicants took ethylene and carbon dioxide readings once a day inside the chambers with a Kitagawa gas detector tube system, Model No. 8014-400A, and Kitagawa No. 8014-108SA (ethylene 20-1200 ppm), No. 108B (ethylene 0.1 to 100 ppm) and No. 8014-126SA (carbon dioxide 0.1 to 2.6%) gas detector tubes, distributed by Matheson-Tri-Gas of Montgomeryville, Pa. Applicants also continuously tracked chamber humidity and temperature with Barnstead/ERTCO RHTEMP101 data loggers from Barnstead International of West Paterson, N.J. The data loggers were secured with tape inside the chambers throughout the experiments.

Applicants note that they found a simple, effective, best way to make an apparatus for fruit display with one or more chambers such that the one or more chambers retained an effective amount of ripening gas for substantially accelerated fruit ripening a day or more after one or more of the chambers was filled substantially full of fruit: for each apparatus applicants prototyped, applicants formed a plurality of vents in the chamber, both at its top and at its bottom, by using vent inserts. Applicants then covered some of the vent insert's vents after a test if the ripening gas levels in the chamber seemed low throughout that particular experiment. Bottom vents seemed to have the greatest effect on ethylene concentration in the chamber (too many or too large of vents created low ethylene concentrations). Applicants also increased the chamber's ethylene gas retention in certain cases by covering all or part of a subset of vents in the vent inserts located at the top of the chamber. In one case, for Unit 4, applicants switched to a vent insert with less vent area. After three experiments, Units 3 and 4 were performing suitably. After four experiments, we arrived at vent sizes for all three of the prototype units such that substantially greater than 4 parts per million of ethylene was retained in each chamber on each day. This proved true even at the lowest ethylene concentration average, between 4 and 5 ppm of ethylene for Unit 3, as shown in Table 3C, occurred at average temperature and humidity of 70 degrees. 4 ppm is an effective amount of ripening gas to accelerate fruit ripening. However, ethylene concentrations of 8 ppm and higher are more preferred, and 10 ppm and higher even more preferred.

For example, in Experiment 1 all vents were open. For Unit 3 that meant the four vents in the first display part's vent insert shown in FIG. 36 were open. In Experiment 2, we covered half of each of those vents with tape, giving them a preferred size of about 18 mm by 8 mm, with each vent's center about 32 mm from the center of the vent insert. The ethylene readings were still very faint (approximately 2 ppm of ethylene gas or less in the chambers) despite never opening the chambers to inspect the fruit during the experiment. So for Experiment 3, applicants covered three of the vents at the chamber's bottom with tape, which resulted in three 6 mm vents like that shown in FIG. 36. The vents were each located on a radius 53 mm from the center of the vent insert. In the case of Unit 8, (FIG. 37), we started experiments with all the vents in the chamber bottom's vent insert open. After two experiments, we covered two of every three of these vents entirely, and half covered the third vent. We also fine tuned ethylene retention by switching to a bezel with notches in twos rather than threes. As a result, the Unit 8 apparatus had a chamber that retained ripening gas for substantially accelerated fruit ripening a day or more after being filled substantially full of fruit: as Tables 3-10 show, its daily ethylene readings were generally above 10 parts per million. We made similar adjustments for Unit 4 (FIG. 38.), turning over the bottom of the second display part and vent 3825 to reverse it to its proper orientation. By Experiment 2, we had also elevated the apparatuses consistently a half inch off the table to allow uniform clearance and gas exchange through the bottom vents for all units.

In Experiment 3, Unit 3 was tested as a working unit with the configuration described above (vents half covered) and it delivered exemplary results. Unit 4 tested satisfactory using the vent insert shown in FIG. 38 but its fruit taste test performance was weaker compared to the other units. Unit 8 was tested with two of every three vents and half of the third vent in the second display part's vent insert covered with tape. This led to better ethylene retention in the chamber, and better taste test results. Experiment 3 was performed three times for consistency. The results are shown in Tables 3a-c below. All three units accelerated ripening adequately, averaging greater than 4 ppm of ethylene each day, yet results suggest Unit 3 was the best for consistency of flavor and texture, and had fewer off-flavor fruits relative to the other units, including the open unit.

Applicants note that they found a simple, effective, best way to make an apparatus for fruit display with one or more chambers such that the one or more chambers retained an effective amount of ripening gas for substantially accelerated fruit ripening a day or more after one or more of the chambers was filled substantially full of fruit: for each apparatus applicants prototyped, applicants formed a plurality of vents in the chamber, both at its top and at its bottom, by using vent inserts. Applicants then covered some of the vent insert's vents after a test if the ripening gas levels in the chamber seemed low throughout that particular experiment. Bottom vents seemed to have the greatest effect on ethylene concentration in the chamber (too many or too large of vents created low ethylene concentrations). Applicants also increased the chamber's ethylene gas retention in certain cases by covering all or part of a subset of vents in the vent inserts located at the top of the chamber. In one case, for Unit 4, applicants switched to a vent insert with less vent area. After three experiments, Units 3 and 4 were performing suitably. After four experiments, we arrived at vent sizes for all three of the prototype units such that substantially greater than 4 parts per million of ethylene was retained in each chamber on each day. This proved true even at the lowest ethylene concentration average, between 4 and 5 ppm of ethylene for Unit 3, as shown in Table 3C, which result occurred at about an average temperature and humidity of 70 degrees Fahrenheit and 70 percent, respectively. 4 ppm is an effective and higher are more preferred, and 10 ppm and higher even more preferred amount of ripening gas to accelerate fruit ripening. However, ethylene concentrations of 8 ppm and higher are more preferred, and 10 ppm and higher even more preferred.

By Experiments 5 through 10, the vent sizes had been already corrected and the chambers adequately accelerated ripening with an effective amount of ripening gas. Thus, only minor modifications were made. We tested Unit 3 the same way as in Experiment 3 (removing the enclosing ring). For Unit 4 we drilled out four vents approximately 3-5 mm in diameter at the outer edges of the bottom of the chamber to more widely distribute its vents. And for Unit 8 applicants used a bezel with a three-notch pattern instead of two as shown. In Experiment 6 (and for the rest of the testing) we used the same structural configuration for all the units but exclusively used pears and bananas to get more data points on specific types of fruit. In Experiment 7, applicants switched fruit sources to see if the source of fruit made a difference for taste testing. (It did.) Consistent with the best mode of using the invention, from a taste standpoint, it's best to select and purchase quality fruit for ripening.

In Experiment 8 we added solar powered fans inside the ripening chambers. Wires ran from the solar powered fan to a small solar panel taped to the apparatus or table and connected to a constant light source. Relative to the other experiments, the fan's motion apparently reduced ethylene retention by the chambers (perhaps because it blew ethylene out of the chamber) without improving fruit flavor. Experiment 9 was the same as Experiments 6-7 but two "Ripen Rites" were used, one with a fan and one without, to confirm Experiment 8's results. Finally, Experiment 10 reprised Experiments 6-7 but changed the variety of pears to one that exhibited more color change upon ripening.

Overall, once the vent configurations were set, chamber ripening gas retention was of an effective amount to substantially accelerate fruit ripening in each of the prototypes at all atmospheres tested, including for temperatures around 70 degrees and 70% humidity (See Table 3c). The prototypes also consistently provided better tasting fruit than "Ripen Rite" and the "open" unit, but not in every case. (In Experiment 5 the various units provided very similar tastes. And in Experiment 7 applicants left the fruit in the chambers too long so that it was overripe before the taste test). Although the results were often close, Unit 3 seemed to consistently perform better than the other prototypes as far as taste was concerned. The tasters—applicants—tasted the fruit as indicated but were not aware of which units the fruit samples came from. In general, applicants tasted several pieces of each type of fruit from each unit, and several slices from each piece of fruit they tasted. The experimental results are set out at Tables 1-10 below.

TABLE 1

Experiment 1 Temperature and Humidity Readings

|  | Unit 3 | Unit 4 | Unit 8 | Open |
|---|---|---|---|---|
| Temp ° C. | | | | |
| Min | 20.3 | 19.8 | 19.9 | 19.4 |
| Max | 22.1 | 21.9 | 23.2 | 26.3 |
| Ave Temp | 21.02 | 20.85 | 20.64 | 20.64 |
| Mean Temp | 21.02 | 20.86 | 20.65 | 20.68 |
| S.D. | 0.36 | 0.38 | 0.45 | 0.77 |
| Humidity % | | | | |
| Min | 48 | 42.5 | 45.5 | 36.5 |
| Max | 82 | 84.5 | 97 | 50 |
| Ave Hum. | 75.4 | 77.59 | 92.17 | 41.93 |
| S.D. | 3.98 | 5.72 | 7.41 | 3.14 |

Experiment 1 Average Ethylene and Carbon Dioxide Levels over 4 Days

| $C_2H_4$ in rank order | Ave. reading | $CO_2$ in % | Ave. reading |
|---|---|---|---|
| #3 | 2 | #3 | .23 |
| #4 | 3 | #4 | .27 |
| #8 | 1 | #8 | .37 |

Experiment 1 Taste Test Results

|  | Flavor | Texture | Average | |
|---|---|---|---|---|
| Day 4-Tester 1 | | | | |
| Bananas | | | | |
| #3 | 3.5 | 4 | 3.75 | |
| #4 | 4.5 | 4 | 4.25 | a little mushy, good flavor |
| #8 | 4 | 4 | 4 | |
| Open | 3.5 | 4 | 3.75 | a little hard |
| Bartlett | | | | |
| #3 | 3.5 | 4 | 3.75 | slightly soapy but most intense flavor |
| #4 | 2.5 | 2.5 | 2.5 | sour and bland |
| #8 | 1 | 3 | 2 | bad |
| Open | 3 | 3.5 | 3.250 | |
| Gala | | | | |
| #3 | 4.5 | 4 | 4.25 | |
| #4 | 3 | 4 | 3.5 | |
| #8 | 4 | 4 | 4 | |
| Open | 5 | 4 | 4.5 | good flavor |
| Red Delicious | | | | |
| #3 | 2.5 | 2.5 | 2.5 | |
| #4 | 3 | 3 | 3 | |
| #8 | 3 | 3 | 3 | |
| Open | 2.5 | 3 | 2.75 | |
| Day 4-Tester 2 | | | | |
| Bananas | | | | |
| #3 | 3 | 3.5 | 3.25 | |
| #4 | 2.5 | 2.5 | 2.5 | |
| #8 | 2.5 | 3 | 2.75 | slightly mushy |
| Open | 4 | 4 | 4 | |
| Bartlett | | | | |
| #3 | 3 | 3 | 3 | |
| #4 | 3 | 3 | 3 | |
| #8 | 2.5 | 2.5 | 2.5 | |
| Open | 3.5 | 3.5 | 3.500 | |

TABLE 1-continued

| Gala | | | |
|---|---|---|---|
| #3 | 3 | 3 | 3 |
| #4 | 3 | 3 | 3 |
| #8 | 2.5 | 2.5 | 2.5 |
| Open | 3.5 | 3.5 | 3.5 |
| Red Delicious | | | |
| #3 | 2.5 | 2.5 | 2.5 |
| #4 | 3 | 3 | 3 |
| #8 | 3.5 | 3.5 | 3.5 |
| Open | 4 | 4 | 4 |

TABLE 2

Experiment 2 Temperature and Humidity Readings

|  | Unit 3 | Unit 4 | Unit 8 | RR | Open |
|---|---|---|---|---|---|
| Temp ° C. | | | | | |
| Min | 20.1 | 19.8 | 19.7 | 19.8 | 19.2 |
| Max | 22.3 | 22.3 | 22 | 22.3 | 23.1 |
| Ave Temp | 20.85 | 20.59 | 20.52 | 20.59 | 20.24 |
| Mean Temp | 21.86 | 20.6 | 20.53 | 20.6 | 20.26 |
| S.D. | 0.39 | 0.5 | 0.47 | 0.5 | 0.6 |
| Humidity % | | | | | |
| Min | 34.5 | 34.5 | 30 | 34.5 | 31 |
| Max | 92 | 95.5 | 84.5 | 95.5 | 41.5 |
| Ave Hum. | 83.47 | 87 | 74.77 | 87.03 | 36.24 |
| S.D. | 12.1 | 12.77 | 11.08 | 12.77 | 2.81 |

Experiment 2 Average Ethylene and Carbon Dioxide Levels over 2 Days

| $C_2H_4$ in rank order | Ave. reading | $CO_2$ in % | Ave. reading |
|---|---|---|---|
| #3 | 3 | #3 | .35 |
| #4 | 2 | #4 | .37 |
| #8 | 4 | #8 | .28 |
| RR | 1 | RR | .43 |

Experiment 2 Taste Test Results

|  | Flavor | Texture | Average | |
|---|---|---|---|---|
| Day 3-Tester 1 | | | | |
| Bananas | | | | |
| #3 | 3 | 3 | 3 | |
| #4 | 3.5 | 3 | 3.25 | best |
| #8 | 2.5 | 3 | 2.75 | not ripe enough |
| RR | 3.5 | 3 | 3.25 | |
| Open | 3.5 | 3 | 3.250 | |
| Bartlett | | | | |
| #3 | 2.5 | 3 | 2.75 | best |
| #4 | 2.5 | 3 | 2.75 | tart |
| #8 | 2.5 | 3 | 2.75 | |
| RR | 1.5 | 2.5 | 2 | flavorless |
| Open | 2 | 2.5 | 2.25 | overripe, mushy |
| Gala | | | | |
| #3 | 3.5 | 4 | 3.75 | |
| #4 | 4 | 3.75 | 3.875 | |
| #8 | 4.5 | 4 | 4.25 | |
| RR | 4 | 4 | 4 | |
| Open | 3.5 | 4 | 3.750 | |

TABLE 2-continued

Red Delicious

| | | | | |
|---|---|---|---|---|
| #3 | 4 | 3 | 3.5 | a little mushy |
| #4 | 2 | 3.5 | 2.75 | |
| #8 | 3.5 | 3.5 | 3.5 | |
| RR | 1.5 | 3.5 | 2.5 | |
| Open | 4 | 4 | 4 | |

Day 3-Tester 2

Bananas

| | | | | |
|---|---|---|---|---|
| #3 | 3.5 | 3.5 | 3.5 | best |
| #4 | 3 | 3 | 3 | |
| #8 | 3 | 3 | 3 | starchy |
| RR | 3.5 | 3.5 | 3.5 | |
| Open | 2.5 | 2.5 | 2.5 | mushy, starchy |

Bartlett

| | | | | |
|---|---|---|---|---|
| #3 | 2.5 | 2.5 | 2.5 | |
| #4 | 3 | 3 | 3 | |
| #8 | 2.25 | 2.25 | 2.25 | |
| RR | 3 | 3 | 3 | |
| Open | 2.75 | 2.75 | 2.75 | slightly mushy |

Gala

| | | | | |
|---|---|---|---|---|
| #3 | 2.5 | 4 | 3.25 | bland |
| #4 | 2 | 4 | 3 | bad tart |
| #8 | 2.5 | 4 | 3.25 | slightly tart |
| RR | 2 | 3 | 2.5 | bad, tart |
| Open | 3.5 | 4 | 3.75 | slightly tart |

Red Delicious

| | | | | |
|---|---|---|---|---|
| #3 | 2.5 | 2.5 | 2.5 | |
| #4 | 2.5 | 3 | 2.75 | |
| #8 | 4 | 4 | 4 | |
| RR | 2 | 2.5 | 2.25 | |
| Open | 3 | 4 | 3.5 | |

TABLE 3A

Experiment 3A Temperature and Humidity Readings

| | Unit 3 | Unit 4 | Unit 8 | RR | Open |
|---|---|---|---|---|---|
| Temp ° C. | | | | | |
| Min | 20.2 | 19.9 | 20.1 | 19.9 | 19.8 |
| Max | 22.6 | 22.4 | 22.6 | 23.8 | 22.2 |
| Ave Temp | 20.91 | 20.76 | 20.78 | 20.76 | 20.71 |
| Mean Temp | 20.92 | 20.77 | 20.79 | 20.77 | 20.73 |
| S.D. | 0.45 | 0.45 | 0.44 | 0.54 | 0.54 |
| Humidity % | | | | | |
| Min | 44 | 46.5 | 39 | 45 | 31.5 |
| Max | 99 | 99.5 | 97 | 100 | 57 |
| Ave Hum. | 92.27 | 91.35 | 89.51 | 95 | 43.72 |
| S.D. | 10.58 | 10.55 | 11.09 | 10.7 | 7.49 |

Experiment 3A Average Ethylene and Carbon Dioxide Levels over 2 Days

| $C_2H_4$ in ppm (parts per million) | Ave. reading | $CO_2$ in % | Ave. reading |
|---|---|---|---|
| #3 | 12 | #3 | .65 |
| #4 | 8 | #4 | .56 |
| #8 | 10 | #8 | .55 |
| RR | 15 | RR | .69 |

TABLE 3A-continued

Experiment 3A Taste Test Results

| | Flavor | Texture | Average | |
|---|---|---|---|---|
| Day 2-Tester 1 | | | | |
| Bananas | | | | |
| #3 | 3 | 3 | 3 | |
|  | 2.5 | 3 | 2.75 | |
| #4 | 3.5 | 3 | 3.25 | |
|  | 2 | 3 | 2.5 | |
| #8 | 3.5 | 3 | 3.25 | |
| RR | 3.5 | 3 | 3.25 | |
|  | 3 | 3 | 3 | |
| Open | 2.5 | 3 | 2.75 | |
| Bartlett | | | | |
| #3 | 4 | 3 | 3.5 | |
|  | 3 | 3 | 3 | |
| #4 | 3 | 3 | 3 | a little mushy |
| #8 | 3.5 | 3 | 3.25 | |
|  | 2.5 | 3 | 2.75 | |
| RR | 3 | 3 | 3 | a little mushy |
|  | 2.5 | 3 | 2.75 | |
| Open | 3 | 3 | 3 | |
|  | 2.5 | 3 | 2.75 | |
| Gala | | | | |
| #3 | 3.5 | 3 | 3.25 | |
| #4 | 2.5 | 3 | 2.75 | bad taste |
| #8 | 3 | 3 | 3 | |
| RR | 3.75 | 3 | 3.375 | |
| Open | 4 | 3 | 3.5 | |
| Red Delicious | | | | |
| #3 | 4 | 3 | 3.5 | |
| #4 | 3 | 3 | 3 | |
| #8 | 3.5 | 3 | 3.25 | |
| RR | 4 | 3 | 3.5 | |
| Open | 3 | 3 | 3 | too unripe |
| Day 2-Tester 2 | | | | |
| Bananas | | | | |
| #3 | 3 | 3 | 3 | |
| #4 | 3 | 3 | 3 | |
| #8 | 2.5 | 2.5 | 2.5 | slightly mushy |
| RR | 3 | 2.5 | 2.75 | |
| Open | 2.5 | 2.5 | 2.5 | |
| Bartlett | | | | |
| #3 | 4 | 2.5 | 3.25 | slightly firm |
|  | 3 | 2.5 | 2.75 | |
| #4 | 2.5 | 2.5 | 2.5 | one slightly firm, tart |
| #8 | 4 | 2.5 | 3.25 | slightly gritty |
|  | 3 | 2.5 | 2.75 | |
| RR | 3 | 3 | 3 | |
| Open | 3 | 3 | 3 | slightly mushy |
|  | 4 | 3 | 3.5 | |
| Gala | | | | |
| #3 | 3 | 3 | 3 | |
| #4 | 2.5 | 2.5 | 2.5 | |
| #8 | 2.5 | 3 | 2.75 | |
| RR | 2.5 | 3 | 2.75 | |
| Open | 4 | 4 | 4 | |
| Red Delicious | | | | |
| #3 | 3 | 2 | 2.5 | too soft |
| #4 | 3 | 4 | 3.5 | sweeter |
| #8 | 2.5 | 3 | 2.75 | 2.5+ |
| RR | 2.5 | 2.5 | 2.5 | too ripe |
| Open | 2.5 | 3 | 2.75 | sweet |

TABLE 3B

Experiment 3B Temperature and Humidity Readings

|  | Unit 3 | Unit 4 | Unit 8 | RR | Open |
|---|---|---|---|---|---|
| Temp ° C. | | | | | |
| Min | 20 | 19.8 | 19.8 | 19.8 | 19.5 |
| Max | 24.5 | 24.1 | 24.6 | 24.6 | 25.4 |
| Ave Temp | 21.79 | 21.53 | 21.54 | 21.56 | 21.29 |
| Mean Temp | 21.84 | 21.56 | 21.59 | 21.61 | 21.35 |
| S.D. | 0.98 | 0.98 | 0.97 | 0.99 | 1.06 |
| Humidity % | | | | | |
| Min | 61 | 59.5 | 57.5 | 68.5 | 47.5 |
| Max | 100 | 100 | 98 | 100 | 71 |
| Ave Hum. | 97.36 | 99.16 | 94.64 | 99.29 | 61.67 |
| S.D. | 5.07 | 4.87 | 5.03 | 4.11 | 5.31 |

Experiment 3B Average Ethylene and Carbon Dioxide Levels over 3 Days

| $C_2H_4$ in ppm (parts per million) | Ave. reading | $CO_2$ in % | Ave. reading |
|---|---|---|---|
| #3 | 7 | #3 | 0.62 |
| #4 | 10 | #4 | 1.19 |
| #8 | 8.33 | #8 | 0.58 |
| RR | 15 | RR | 1.73 |

Experiment 3B Taste Test Results

|  | Flavor | Texture | Average | |
|---|---|---|---|---|
| Day 3-Tester 1 | | | | |
| Bananas | | | | |
| #3 | 3 | 3 | 3 | |
| #4 | 3.5 | 3 | 3.25 | |
| #8 | 3.5 | 3 | 3.25 | |
|  | 3 | 3 | 3 | |
| RR | 3 | 2.5 | 2.75 | |
|  | 2.5 | 3 | 2.75 | |
| Open | 3 | 3 | 3 | |
| Bartlett | | | | |
| #3 | 2.5 | 3 | 2.75 | |
|  | 1.5 | 3 | 2.25 | bad flavor |
| #4 | 3.5 | 2 | 2.75 | odd flavor |
| #8 | 3 | 3 | 3 | odd flavor |
|  | 2.5 | 3 | 2.75 | |
| RR | 4 | 3 | 3.5 | |
|  | 3 | 3 | 3 | |
| Open | 4 | 3 | 3.5 | |
|  | 3 | 3 | 3 | |
| Gala | | | | |
| #3 | 2 | 3 | 2.5 | off |
| #4 | 1.5 | 3 | 2.25 | off |
| #8 | 2.5 | 2.5 | 3 | little soft |
| RR | 3 | 3 | 3 | |
| Open | 2.5 | 3 | 2.75 | |
| Red Delicious | | | | |
| #3 | 4 | 3 | 3.5 | little soft |
| #4 | 3 | 4 | 3.5 | little tart |
| #8 | 2.5 | 3 | 2.75 | not ripe enough |
| RR | 3 | 4 | 3.5 | |
| Open | 3.5 | 4 | 3.75 | |
| Day 3-Tester 2 | | | | |
| Bananas | | | | |
| #3 | 3 | 3 | 3 | |
| #4 | 3 | 3 | 3 | |
| #8 | 2.5 | 2.5 | 2.5 | |
| RR | 2.5 | 2.5 | 2.5 | |
| Open | 2.5 | 2.5 | 2.5 | |
| Bartlett | | | | |
| #3 | 2.5 | 3 | 2.75 | |
|  | 2 | 2.5 | 2.25 | |
| #4 | 2.5 | 3 | 2.75 | |
| #8 | 1 | 2 | 1.5 | |
|  | 2.5 | 2.5 | 2.5 | 1 really bad, 1 ok |
| RR | 4 | 4 | 4 | |
|  | 3 | 3 | 3 | 1 sweet, 1 less sweet |
| Open | 2.5 | 3 | 2.75 | |
|  | 3 | 3 | 3 | 1 bland 1 ok |
| Gala | | | | |
| #3 | 2.5 | 3 | 2.75 | bland |
| #4 | 2 | 3 | 2.5 | tart |
| #8 | 2 | 3 | 2.5 | tart |
| RR | 2 | 3 | 2.5 | |
| Open | 2.5 | 2.5 | 2.5 | little soft |
| Red Delicious | | | | |
| #3 | 3 | 2.5 | 2.75 | little soft |
| #4 | 3 | 3 | 3 | |
| #8 | 2.5 | 2.5 | 2.5 | |
| RR | 3 | 3 | 3 | |
| Open | 2.5 | 3 | 2.75 | slightly more tart |

TABLE 3C

Exeriment 3C Temperature and Humidity Readings

|  | Unit 3 | Unit 4 | Unit 8 | RR | Open |
|---|---|---|---|---|---|
| Temp ° C. | | | | | |
| Min | 19.8 | 19.7 | 19.5 | 19.8 | 19.2 |
| Max | 23.1 | 22.4 | 22.4 | 22.4 | 22.3 |
| Ave Temp | 20.99 | 20.92 | 20.79 | 20.93 | 20.46 |
| Mean Temp | 21.02 | 20.95 | 20.83 | 20.97 | 20.5 |
| S.D. | 0.82 | 0.81 | 0.85 | 0.76 | 0.86 |
| Humidity % | | | | | |
| Min | 65 | 59.5 | 61 | 65.5 | 59 |
| Max | 100 | 100 | 100 | 100 | 81.5 |
| Ave Hum. | 97.93 | 99.15 | 95.68 | 98.74 | 71.76 |
| S.D. | 5.74 | 4.87 | 6.05 | 5.25 | 4.69 |

Experiment 3C Ethylene and Carbon Dioxide Levels over 2 Days

| $C_2H_4$ in ppm (parts per million) | Ave. reading | $CO_2$ in % | Ave. reading |
|---|---|---|---|
| #3 | 4.5 | #3 | 0.68 |
| #4 | 11 | #4 | 1.25 |
| #8 | 7.5 | #8 | .575 |
| RR | 15 | RR | 1.13 |

Experiment 3C Day 2-Tester 1

|  | Flavor | Texture | Average | |
|---|---|---|---|---|
| Bananas | | | | |
| #3 | 2.5 | 3 | 2.75 | |
| #4 | 2.5 | 3.5 | 3 | little flavorless |
|  | 3 | 3 | 3 | |
| #8 | 2.5 | 3 | 2.75 | |
| RR | 3.5 | 3 | 3.25 | |
|  | 3 | 3 | 3 | little unripe |
| Open | 3 | 3 | 3 | little |
|  | 2.5 | 2.5 | 2.5 | flavorless |
| Bartlett | | | | |
| #3 | 3.5 | 3.5 | 3.5 | |
|  | 3.25 | 3 | 3.125 | |
| #4 | 3 | 3 | 3 | |
|  | 2.5 | 3 | 2.75 | little watery |

TABLE 3C-continued

| | | | | |
|---|---|---|---|---|
| #8 | 3.5 | 3 | 3.25 | |
| | 3 | 3 | 3 | |
| RR | 2 | 3 | 2.5 | flavorless |
| | 3 | 3 | 3 | |
| Open | 3 | 3 | 3 | |
| | 3.5 | 3.5 | 3.5 | |
| Gala | | | | |
| #3 | 2.5 | 2.5 | 2.5 | too hard |
| #4 | 3 | 3 | 3 | |
| #8 | 3.5 | 3 | 3.25 | |
| RR | 2 | 2.5 | 2.25 | too hard |
| Open | 3.25 | 3 | 3.125 | little mushy |
| Red Delicious | | | | |
| #3 | 3.5 | 3.5 | 3.5 | |
| #4 | 3 | 3 | 3 | little unripe |
| #8 | 3.5 | 3 | 3.25 | little hard |
| RR | 3.5 | 3.5 | 3.5 | |
| Open | 3 | 3.5 | 3.25 | watery flavor |

Exp. 3C-Tester 2

| | Flavor | Texture | Average | |
|---|---|---|---|---|
| Bananas | | | | |
| #3 | 2.5 | 3 | 2.75 | |
| #4 | 3.5 | 3.5 | 3.5 | |
| #8 | 2.5 | 3 | 2.75 | |
| RR | 3 | 3 | 3 | |
| Open | 3 | 3 | 3 | |
| Bartlett | | | | |
| #3 | 2 | 2.5 | 2.25 | |
| #4 | 2 | 2 | 2 | |
| #8 | 2 | 2.5 | 2.25 | |
| RR | 3 | 3 | 3 | not too sweet |
| Open | 2.5 | 2.5 | 2.5 | odd taste |
| Gala | | | | |
| #3 | 3 | 3 | 3 | |
| #4 | 2 | 2 | 2 | weird taste |
| #8 | 2 | 2 | 2 | |
| RR | 2 | 2 | 2 | |
| Open | 2 | 2 | 2 | |
| Red Delicious | | | | |
| #3 | 3 | 4 | 3.5 | |
| #4 | 2.5 | 2.5 | 2.5 | too green |
| #8 | 3 | 3 | 3 | |
| RR | 2 | 2 | 2 | odd taste |
| Open | 2.5 | 2.5 | 2.5 | too green |

TABLE 4A

Experiment 4A Temperature and Humidity Readings

| | Unit 3 | Unit 4 | Unit 8 | Ripen | Open |
|---|---|---|---|---|---|
| Temp ° C. | | | | | |
| Min | 19.90 | 19.70 | 19.60 | 19.60 | 19.30 |
| Max | 22.90 | 25.00 | 23.60 | 23.30 | 23.40 |
| Ave Temp | 20.96 | 20.77 | 20.66 | 20.67 | 20.49 |
| Mean Temp | 20.98 | 20.79 | 20.68 | 20.69 | 20.51 |
| S.D. | 0.48 | 0.64 | 0.53 | 0.50 | 0.58 |
| Humidity % | | | | | |
| Min | 51.50 | 48.00 | 46.50 | 45.50 | 54.00 |
| Max | 99.00 | 100.00 | 98.50 | 100.00 | 66.50 |
| Ave Hum. | 95.01 | 97.51 | 93.93 | 96.66 | 59.75 |
| S.D. | 6.17 | 7.00 | 7.13 | 7.56 | 2.62 |

TABLE 4A-continued

Experiment 4A Average Ethylene and Carbon Dioxide Levels over 3 Days

| $C_2H_4$ in ppm (parts per million) | Ave. reading | $CO_2$ in % | Ave. reading |
|---|---|---|---|
| #3 | 11.67 | #3 | .5 |
| #4 | 11 | #4 | .71 |
| #8 | 11.33 | #8 | .57 |
| RR | 15 | RR | 1.32 |

Experiment 4A: Taste Test Results

| | Flavor | Texture | Average | |
|---|---|---|---|---|
| Day 3-Tester 1 | | | | |
| Bananas | | | | |
| #3 | 2.5 | 2.5 | 2.5 | not much flavor |
| #4 | 2.5 | 2.5 | 2.5 | not much flavor |
| #8 | 2 | 2.5 | 2.25 | |
| RR | 2 | 2.5 | 2.25 | too green |
| Open | 2.5 | 2.5 | 2.5 | |
| Bartlett | | | | |
| #3 | 3.5 | 3.5 | 3.5 | |
| #4 | 3.5 | 3.5 | 3.5 | |
| #8 | 2 | 3 | 2.5 | odd flavor |
| RR | 3.5 | 3.5 | 3.5 | little odd |
| Open | 2.5 | 3 | 2.75 | little odd |
| Gala | | | | |
| #3 | 3.5 | 4 | 3.75 | |
| #4 | 3 | 4 | 3.5 | a little sour |
| #8 | 4 | 4 | 4 | |
| RR | 3 | 4 | 3.5 | odd flavor |
| Open | 3.5 | 4 | 3.75 | |
| Red Delicious | | | | |
| #3 | 3.5 | 4 | 3.75 | |
| #4 | 1.5 | 3 | 2.25 | bad flavor |
| #8 | 3.5 | 2 | 2.75 | too soft |
| RR | 3.5 | 4 | 3.75 | little sour |
| Open | 3 | 3.5 | 3.25 | |
| Day 3-Tester 2 | | | | |
| Bananas | | | | |
| #3 | 3 | 3 | 3 | |
| #4 | 2.5 | 2.5 | 2.5 | soft |
| #8 | 2.5 | 2.5 | 2.5 | soft |
| RR | 3 | 3 | 3 | |
| Open | 2.5 | 3 | 2.75 | |
| Bartlett | | | | |
| #3 | 3 | 3 | 3 | tart |
| #4 | 2.5 | 2.5 | 2.5 | slightly mushy/tart |
| #8 | 3 | 3 | 3 | |
| RR | 2.5 | 2.5 | 2.5 | slightly mushy |
| Open | 3 | 2.5 | 2.75 | funny taste |
| Gala | | | | |
| #3 | 2.5 | 4 | 3.25 | funny/tart |
| #4 | 2.5 | 4 | 3.25 | funny/tart |
| #8 | 2 | 4 | 3 | |
| RR | 3 | 4 | 3.5 | |
| Open | 2 | 4 | 3 | |
| Red Delicious | | | | |
| #3 | 3 | 4 | 3.5 | |
| #4 | 2.5 | 4 | 3.25 | odd |
| #8 | 3.5 | 4 | 3.75 | |
| RR | 3 | 4 | 3.5 | |
| Open | 3 | 4 | 3.5 | |

TABLE 4B

Experiment 4B Temperature and Humidity Readings

|  | Unit 3 | Unit 4* | Unit 8 | RR | Open |
|---|---|---|---|---|---|
| *Temp ° C.* | | | | | |
| Min | 19.80 | 19.70 | 19.40 | 19.60 | 18.80 |
| Max | 23.90 | 25.00 | 23.90 | 23.80 | 23.40 |
| Ave Temp | 21.36 | 20.76 | 21.09 | 21.13 | 20.52 |
| Mean Temp | 21.43 | 20.79 | 21.18 | 21.22 | 20.61 |
| S.D. | 1.16 | 0.64 | 1.29 | 1.26 | 1.30 |
| *Humidity %* | | | | | |
| Min | 52.50 | 48.00 | 48.50 | 54.00 | 48.50 |
| Max | 99.00 | 100.00 | 98.50 | 100.00 | 85.00 |
| Ave Hum. | 94.17 | 97.51 | 92.32 | 97.46 | 73.32 |
| S.D. | 6.51 | 7.00 | 7.30 | 6.58 | 5.99 |

Experiment 4B Average Ethylene and Carbon Dioxide Levels over 3 Days

| $C_2H_4$ in ppm (parts per million) | Ave. reading | $CO_2$ in % | Ave. reading |
|---|---|---|---|
| #3 | 11.67 | #3 | 1.11 |
| #4 | 13.33 | #4 | 1.44 |
| #8 | 12.33 | #8 | .74 |
| RR | 15.33 | RR | 1.44 |

Experiment 4B: Taste Test Results Day 3-Tester 2

| | Flavor | Texture | Average | |
|---|---|---|---|---|
| Bananas | | | | |
| #3 | 3 | 3 | 3 | little soft |
| #4 | 2.5 | 3 | 2.75 | bland, firm |
| #8 | 3 | 3.5 | 3.25 | |
| RR | 2.5 | 2.75 | 2.63 | bland, one good texture, one soft |
| Open | 2.5 | 2.5 | 2.5 | slightly soft, mealy |
| Bartlett | | | | |
| #3 | 4 | 4 | 4 | vert good |
| | 3 | 3 | 3 | slightly odd/tart, softer |
| #4 | 3 | 3 | 3 | |
| | 3 | 3 | 3 | |
| #8 | 4 | 4 | 4 | slightly firm, but not too sweet |
| | 4 | 4 | 4 | sweet, slightly firm |
| RR | 3 | 2.5 | 2.75 | good flavor |
| | 2.5 | 3 | 2.75 | bland |
| Open | 2.5 | 2.5 | 2.5 | slightly bland, mushy |
| | 4 | 4 | 4 | firm |
| Gala | | | | |
| #3 | 3 | 4 | 3.5 | slightly tart |
| #4 | 3 | 3.5 | 3.25 | virtually no tartness |
| #8 | 2.5 | 3.5 | 3 | not as crisp in texture, tart |
| RR | 2 | 4 | 3 | crisp texture, funny taste |
| Open | 2.5 | 4 | 3.25 | tart, crisp texture |

TABLE 4B-continued

| | | | | |
|---|---|---|---|---|
| Red Delicious | | | | |
| #3 | 3 | 3 | 3 | slightly soft, sweet, good |
| #4 | 2 | 3 | 2.5 | firm, uneven tart and too ripe |
| #8 | 3 | 3 | 3 | good overall, slightly soft |
| RR | 2.5 | 2.5 | 2.5 | little soft, funny flavor |
| Open | 2.5 | 4 | 3.25 | firm crisp texture, slightly tart |

*data lost, used experiment 4 data

TABLE 5

Experiment 5 Temperature and Humidity Readings

|  | Unit 3 | Unit 4 | Unit 8 | RR | Open |
|---|---|---|---|---|---|
| *Temp ° C.* | | | | | |
| Min | 19.00 | 18.60 | 18.60 | 18.80 | 18.30 |
| Max | 24.30 | 24.70 | 24.20 | 24.50 | 24.00 |
| Ave Temp | 21.01 | 20.78 | 20.78 | 20.90 | 20.59 |
| Mean Temp | 21.05 | 20.83 | 20.83 | 20.94 | 20.63 |
| S.D. | 0.86 | 0.94 | 0.91 | 0.91 | 0.92 |
| *Humidity %* | | | | | |
| Min | 58.00 | 60.50 | 54.50 | 60.50 | 56.50 |
| Max | 99.50 | 100.00 | 98.00 | 100.00 | 87.50 |
| Ave Hum. | 95.44 | 97.53 | 93.30 | 98.25 | 78.20 |
| S.D. | 5.79 | 5.69 | 6.14 | 5.57 | 5.43 |

Experiment 5 Average Ethylene and Carbon Dioxide Levels over 3 Days

| $C_2H_4$ in ppm (parts per million) | Ave. reading | $CO_2$ in % | Ave. reading |
|---|---|---|---|
| #3 | 8.67 | #3 | .91 |
| #4 | 9.33 | #4 | .93 |
| #8 | 8.67 | #8 | .63 |
| RR | 10 | RR | 1.25 |

Experiment 5 Taste Test Results

| | Flavor | Texture | Average | |
|---|---|---|---|---|
| *Day 3-Tester 1* | | | | |
| Bananas | | | | |
| #3 | 3 | 3 | 3 | |
| | 3.5 | 3 | 3.25 | |
| #4 | 3 | 3 | 3 | |
| | 3.5 | 3 | 3.25 | |
| #8 | 3 | 3 | 3.25 | |
| | 3.25 | 3 | 3.125 | |
| Open | 3 | 3 | 3 | |
| RR | 3 | 3 | 3 | little bland |
| Bartlett | | | | |
| #3 | 3.5 | 3 | 3.25 | |
| | 3 | 3 | 3 | |
| #4 | 3 | 3 | 3 | |
| | 3.5 | 3 | 3.25 | |
| #8 | 3.5 | 3 | 3.25 | |
| | 3.25 | 3 | 3.125 | |
| Open | 4 | 3 | 3.5 | |
| | 3.5 | 3 | 3.25 | |
| RR | 3.5 | 3 | 3.25 | |
| | 3 | 2.5 | 2.75 | |

TABLE 5-continued

Gala

|      |      |     |       |           |
|------|------|-----|-------|-----------|
| #3   | 3    | 3   | 3     |           |
| #4   | 2.5  | 3   | 2.75  |           |
| #8   | 3.5  | 3   | 3.25  |           |
| Open | 3    | 3   | 3     |           |
| RR   | 2    | 3   | 2.5   |           |

Red Delicious

|      |       |     |       |           |
|------|-------|-----|-------|-----------|
| #3   | 3.5   | 3   | 3.25  |           |
| #4   | 3.5   | 3   | 3.25  |           |
| #8   | 3.75  | 3   | 3.375 |           |
| Open | 3     | 3   | 3     |           |
| RR   | 3.25  | 3   | 3.125 | little off |

Day 3-Tester 2

Bananas

|      |     |     |     |
|------|-----|-----|-----|
| #3   | 3   | 3   | 3   |
| #4   | 4   | 4   | 4   |
| #8   | 4   | 4   | 4   |
| Open | 4   | 4   | 4   |
| RR   | 3   | 3   | 3   |

Bartlett

|      |      |      |      |
|------|------|------|------|
| #3   | 2.5  | 2.5  | 2.5  |
| #4   | 2    | 2.5  | 2.25 |
| #8   | 2    | 2    | 2    |
|      | 2.5  | 2.5  | 2.5  |
| Open | 2    | 2    | 2    |
|      | 2.5  | 2.5  | 2.5  |
| RR   | 2    | 2    | 2    |
|      | 2.5  | 2.5  | 2.5  |

Gala

|      |     |     |      |
|------|-----|-----|------|
| #3   | 3   | 4   | 3.5  |
| #4   | 2   | 3   | 2.5  |
| #8   | 3.5 | 4   | 3.75 |
| Open | 3   | 4   | 3.5  |
| RR   | 2   | 3   | 2.5  |

Red Delicious

|      |     |      |      |       |
|------|-----|------|------|-------|
| #3   | 2   | 2.5  | 2.25 | mushy |
| #4   | 2   | 2.5  | 2.25 |       |
| #8   | 3   | 2.5  | 2.75 |       |
| RR   | 2.5 | 2.5  | 2.5  | soft  |
| Open | 2.5 | 2.5  | 2.5  |       |

TABLE 6

Experiment 6 Temperature and Humidity Readings

|          | Unit 3 | Unit 4 | Unit 8 | Ripen | Open |
|----------|--------|--------|--------|-------|------|
| Temp ° C. | | | | | |
| Min      | 19.50  | 19.10  | 18.90  | 19.10 | 18.80 |
| Max      | 25.60  | 25.60  | 25.60  | 25.50 | 25.20 |
| Ave Temp | 21.86  | 21.48  | 21.44  | 21.46 | 21.14 |
| Mean Temp| 21.98  | 21.61  | 21.57  | 21.58 | 21.26 |
| S.D.     | 1.49   | 1.52   | 1.55   | 1.51  | 1.50 |
| Humidity % | | | | | |
| Min      | 69.50  | 67.00  | 65.50  | 69.50 | 54.50 |
| Max      | 100.00 | 100.00 | 100.00 | 100.00| 81.00 |
| Ave Hum. | 98.60  | 98.94  | 97.82  | 99.48 | 71.41 |
| S.D.     | 3.66   | 3.65   | 4.41   | 3.23  | 6.52 |

| C2H4 rank order | Ave. rank | CO2 in % | Ave. reading |
|-----------------|-----------|----------|--------------|
| #3              | ½         | #3       | .85          |
| #4              | ½         | #4       | .97          |
| #8              | 4         | #8       | .63          |
| RR              | 3         | RR       | 1.1          |

TABLE 6-continued

Experiment 6 Taste Test Results

| | Flavor | Texture | Average | |
|---|---|---|---|---|

Day 3-Taster 1 (Most ripe pieces)

Bartlett

|            |      |     |      |
|------------|------|-----|------|
| #3         | 3.5  | 3   | 3.25 |
|            | 2.5  | 3   | 2.75 |
| #4         | 3.5  | 3   | 3.25 |
|            | 3    | 3   | 3    |
| Open       | 4    | 3   | 3.5  |
|            | 3.5  | 3   | 3.25 |
| Ripen-rite | 3    | 3   | 3    |
|            | 3    | 3   | 3    |

Exp. 6: Day 3-Brent (Remaining pieces)

Barlett

|            |      |     |       |
|------------|------|-----|-------|
| #3         | 3    | 3   | 3     |
|            | 1.75 | 3   | 2.375 |
|            | 2.5  | 3   | 2.75  |
| #4         | 2.5  | 3   | 2.75  |
|            | 2.5  | 3   | 2.75  |
|            | 2.25 | 3   | 2.675 |
| #8         | 2    | 3   | 2.5   |
|            | 2.25 | 3   | 2.625 |
|            | 2.5  | 3   | 2.75  |
| Open       | 2    | 3   | 2.5   |
|            | 2.25 | 3   | 2.625 |
|            | 2.5  | 3   | 2.75  |
| Ripen-rite | 3    | 3   | 3     |
|            | 2.5  | 2.5 | 2.5   |
|            | 2.75 | 2.5 | 2.625 |

Day 3-Taster 2 (Most ripe pieces)

Bartlett

|            |     |     |      |                |
|------------|-----|-----|------|----------------|
| #3         | 3   | 2.5 | 2.75 |                |
|            | 2.5 | 2.5 | 2.5  | soft           |
| #4         | 2   | 2.5 | 2.25 | strange, soft  |
| Open       | 2   | 3   | 2.5  | strange, firmer|
| Ripen-rite | 2.5 | 2.5 | 2.5  | strange, soft  |

Exp. 6: Day 3-Chia (the rest)

Barlett

|            |     |     |      |                          |
|------------|-----|-----|------|--------------------------|
| #3         | 2   | 2   | 2    | 2 weird, 1 bland         |
|            |     |     |      | 1 too soft, 1 firm       |
| #4         | 2.5 | 2   | 2.25 | 2 strange/tart, 1 ok     |
| #8         | 1.5 | 2   | 1.75 | 3 weird                  |
| Open       | 1.5 | 2   | 1.75 | 3 weird                  |
| Ripen-rite | 2   | 2   | 2    | 1 bland, 1 strange/tart  |
|            |     |     |      | 2 too soft, 1 firm       |

TABLE 7

Experiment 7 Temperature and Humidity Readings

|          | Unit 3 | Unit 4 | Unit 8 | RR    | Open  |
|----------|--------|--------|--------|-------|-------|
| Temp ° C.| | | | | |
| Min      | 20.00  | 19.80  | 20.00  | 19.90 | 19.70 |
| Max      | 28.40  | 23.50  | 23.40  | 23.80 | 23.70 |
| Ave Temp | 21.36  | 21.13  | 21.19  | 21.17 | 20.89 |
| Mean Temp| 21.42  | 21.16  | 21.22  | 21.20 | 21.01 |
| S.D.     | 1.01   | 0.76   | 0.71   | 0.74  | 0.76  |

TABLE 7-continued

Humidity %

| | | | | | |
|---|---|---|---|---|---|
| Min | 59.50 | 64.50 | 60.00 | 59.00 | 65.50 |
| Max | 100.00 | 100.00 | 100.00 | 100.00 | 87.00 |
| Ave Hum. | 98.70 | 99.16 | 98.59 | 98.57 | 78.54 |
| S.D. | 4.70 | 4.00 | 4.72 | 4.85 | 4.04 |

Experiment 7 Average Ethylene and Carbon Dioxide Levels over 4 Days

| $C_2H_4$ in ppm (parts per | Ave. reading | $CO_2$ in % | Ave. reading |
|---|---|---|---|
| #3 | 16.67 | #3 | .8 |
| #4 | 28.33 | #4 | 1.23 |
| #8 | 18.33 | #8 | 0.87 |
| RR | 18.33 | RR | 0.97 |
| Paper bag | 0 | Paper bag | 0.15 |

Experiment 7 Taste Test Results

| | Flavor | Texture | Average | |
|---|---|---|---|---|
| Day 3-Tester 1 | | | | |
| Barlett | | | | |
| #3 | 2 | 3 | 2.5 | off |
| | 2.25 | 3 | 2.625 | |
| | 2 | 3 | 2.5 | bitter |
| | 2 | 3 | 2.5 | |
| | 2.5 | 3 | 2.75 | |
| #4 | 2.5 | 2.25 | 2.375 | a little bitter |
| | 2.5 | 2.5 | 2.5 | more bitter |
| | 2 | 2.5 | 2.25 | more bitter |
| | 2 | 2.5 | 2.25 | more bitter |
| | 2.5 | 2.5 | 2.5 | very watery |
| #8 | 2.5 | 2.5 | 2.5 | |
| | 2 | 2.5 | 2.25 | bitter |
| | 2.75 | 3 | 2.875 | a tinge bitter |
| | 2.5 | 1.5 | plain, mushy | |
| Open | 2.75 | 3 | 2.875 | |
| | 2.5 | 3 | 2.75 | |
| | 2.5 | 3 | 2.75 | |
| | 2.75 | 3 | 2.875 | |
| | 3.25 | 3 | 3.125 | fine |
| RR | 2.5 | 2.5 | 2.5 | plain |
| | 2.5 | 2.5 | 2.5 | plain |
| | 2.5 | 2.5 | 2.5 | plain |
| | 2.5 | 2.5 | 2.5 | plain |
| | 3 | 3 | 3 | fine |
| Bag | 2.5 | 3 | 2.75 | |
| | 2 | 2.5 | 2.25 | little off |
| | 2.25 | 2.5 | 2.375 | |
| | 2.75 | 2.5 | 2.675 | |
| | 3 | 2.5 | 2.75 | fine, little mushy |
| Day 3-Tester 2 | | | | |
| Barlett | | | | |
| #3 | 2.5 | 2 | 2.25 | 2 odd, 2 ok too soft |
| #4 | 2 | 2 | 2 | one ok, rest bad too soft |
| #8 | 2.5 | 2 | 2.25 | 2 too ripe but ok 2 bad and too ripe 1 odd |
| Open | 2 | 2 | 2 | 4 odd, 1 ok |
| RR | 2 | 2 | 2 | 1 ok, rest odd too soft |
| Bag | 2 | 2.5 | 2.25 | some bland, some tart some too soft |

TABLE 8

Experiment 8 Temperature and Humidity Readings

| | Unit 3 | Unit 4 | Unit 8 | RR | Open |
|---|---|---|---|---|---|
| Temp ° C. | | | | | |
| Min | 15.40 | 15.20 | 15.30 | 16.20 | 15.80 |
| Max | 27.20 | 25.70 | 26.40 | 26.40 | 23.90 |
| Ave Temp | 22.60 | 21.49 | 22.13 | 22.16 | 20.40 |
| Mean Temp | 22.83 | 21.67 | 22.35 | 22.39 | 20.53 |
| S.D. | 2.11 | 1.84 | 2.06 | 2.08 | 1.58 |
| Humidity % | | | | | |
| Min | 48.50 | 49.50 | 47.50 | 53.00 | 48.00 |
| Max | 77.50 | 97.00 | 98.50 | 100.00 | 79.00 |
| Ave Hum. | 61.06 | 74.87 | 82.73 | 82.92 | 62.26 |
| S.D. | 5.96 | 13.06 | 14.40 | 13.23 | 5.51 |

Experiment 8 Average Ethylene and Carbon Dioxide Levels over 5 Days*

| $C_2H_4$ in rank order | Ave. reading** | $CO_2$ in % | Ave. reading |
|---|---|---|---|
| #3 | 5.67 | #3 | 0.11 |
| #4 | 4 | #4 | .1 |
| #8 | 7.67 | #8 | .12 |
| RR | 11 | RR | .12 |

Experiment 8 Taste Test Results

| | Flavor | Texture | Average | |
|---|---|---|---|---|
| Day 6-Tester 1 | | | | |
| Barlett | | | | |
| #3 | 3.25 | 3 | 3.125 | |
| | 3 | 3 | 3 | |
| | 2.5 | 3 | 2.75 | |
| #4 | 2 | 3 | 2.5 | |
| | 3.25 | 3 | 3.125 | |
| | 2.5 | 3 | 2.75 | watery |
| #8 | 3 | 3 | 3 | |
| | 2 | 3 | 2.5 | |
| | 3 | 3 | 3 | little watery |
| Open | 2 | 3 | 2.5 | tart |
| | 2.25 | 3 | 2.625 | tart |
| | 2 | 3 | 2.5 | tart |
| RR | 2.5 | 3 | 2.75 | |
| | 2 | 3 | 2.5 | |
| | 3.25 | 3 | 3.125 | |
| Day-Tester 2 | | | | |
| Barlett | | | | |
| #3 | 3 | 2 | 2.5 | fairly sweet, little soft |
| | 3 | 2 | 2.5 | fairly sweet, little soft |
| | 2.5 | 2 | 2.25 | not as sweet, too soft |
| #4 | 2.75 | 2 | 2.375 | too soft |
| | 2.75 | 2 | 2.375 | too soft |
| | 2.5 | 2 | 2.25 | too soft |
| #8 | 2 | 2 | 2 | too soft |
| | 2.5 | 3 | 2.75 | good firmness |
| | 2.75 | 2.5 | 2.625 | little soft |
| Open | 2 | 2 | 2 | too soft |
| | 2 | 2 | 2 | too soft |
| | 2 | 2 | 2 | too soft |
| RR | 2.75 | 2.5 | 2.625 | little soft |
| | 2.5 | 2 | 2.25 | too soft |
| | 2.5 | 2 | 2.25 | too soft |

*device malfunction day 1, missing readings
**units tested with fans

TABLE 9

Experiment 9 Temperature and Humidity Readings

|  | Unit 3 | Unit 4 | Unit 8 | RR | Open | RR w/fan |
|---|---|---|---|---|---|---|
| Temp ° C. | | | | | | |
| Min | 20.40 | 20.10 | 19.40 | 19.10 | 19.40 | 20.20 |
| Max | 25.80 | 24.50 | 26.20 | 25.30 | 24.50 | 23.80 |
| Ave Temp | 21.62 | 21.61 | 21.38 | 21.45 | 21.58 | 22.35 |
| Mean Temp | 21.66 | 21.64 | 21.42 | 21.49 | 21.63 | 22.39 |
| S.D. | 0.82 | 0.78 | 0.84 | 0.87 | 0.94 | 0.85 |
| Humidity % | | | | | | |
| Min | 49.00 | 54.00 | 49.50 | 54.50 | 49.00 | 56.00 |
| Max | 100.00 | 100.00 | 99.00 | 100.00 | 73.00 | 100.00 |
| Ave Hum. | 94.35 | 96.96 | 93.97 | 97.35 | 62.13 | 94.93 |
| S.D. | 7.68 | 6.20 | 6.97 | 6.73 | 6.29 | 8.68 |

Experiment 9 Average Ethylene and Carbon Dioxide Levels over 4 Days

| $C_2H_4$ in ppm (parts per million) | Ave. reading | $CO_2$ in % | Ave. reading |
|---|---|---|---|
| #3 | 15 | #3 | 0.66 |
| #4 | 15 | #4 | 0.79 |
| #8 | 13 | #8 | 0.68 |
| RR | 14.25 | RR | 0.91 |
| RR w/fan | 12.25 | RR w/fan | 0.60 |

Experiment 9 Taste Test Results

| | Flavor | Texture | Average | |
|---|---|---|---|---|
| Day 4-Tester 1 | | | | |
| Bartlett | | | | |
| #3 | 3.5 | 3 | 3.25 | little soft |
| | 3.75 | 3 | 3.375 | |
| | 3.5 | 3 | 3.25 | |
| #4 | 3.25 | 3 | 3.125 | |
| | 3.25 | 3 | 3.125 | |
| | 2 | 3 | 2.5 | very watery, flavorless |
| #8 | 3.25 | 3 | 3.125 | little watery |
| | 3.75 | 3 | 3.375 | |
| | 2.5 | 3 | 2.75 | watery |
| Open | 2.5 | 3 | 2.75 | sour |
| | 3.25 | 3 | 3.125 | |
| | 2.25 | 3 | 2.625 | sour |
| RR | 3 | 3 | 3 | little tart |
| | 3.5 | 3 | 3.25 | |
| | 3.5 | 3 | 3.25 | |
| RR w/fan | 3 | 3 | 3 | |
| | 2.5 | 3 | 2.75 | sour |
| | 4 | 3 | 3.5 | |
| Day 4-Tester 2 | | | | |
| Bartlett | | | | |
| #3 | 3 | 3 | 3 | slightly tart |
| | 2.5 | 2.5 | 2.5 | slightly tart |
| | 2 | 2.5 | 2.5 | little dry, little grainy |
| #4 | 3 | 3 | 3 | fairly sweet, little soft |
| | 2 | 2.5 | 2.25 | not sweet, toof soft and grainy |
| | 2 | 2.5 | 2.25 | flavorless |
| #8 | 3 | 2.5 | 2.75 | too soft |
| | 2 | 2.5 | 2.25 | very tart |
| | 2.5 | 3 | 2.75 | little green and bland |
| Open | 2 | 2.5 | 2.25 | tart, too soft |
| | 3 | 2.5 | 2.75 | fairly sweet, little soft |
| | 2.5 | 3 | 2.75 | tart, little green |
| RR | 2.5 | 2.5 | 2.5 | little soft |
| | 3 | 2.5 | 2.75 | little soft and grainy |
| | 2 | 2.5 | 2.25 | little green, tart |
| RR w/fan | 2.5 | 3 | 2.75 | slightly bland |
| | 2.5 | 2.5 | 2.5 | |
| | 2 | 2.5 | 2.25 | too tart |

TABLE 10

Experiment 10 Temperature and Humidity Readings

|  | Unit 3 | Unit 4 | Unit 8 | RR | Open |
|---|---|---|---|---|---|
| Temp ° C. | | | | | |
| Min | 19.80 | 19.40 | 19.50 | 19.30 | 19.40 |
| Max | 26.10 | 25.80 | 26.10 | 26.00 | 26.30 |
| Ave Temp | 23.12 | 22.94 | 22.95 | 22.80 | 22.72 |
| Mean Temp | 23.19 | 23.01 | 23.03 | 22.92 | 22.80 |
| S.D. | 1.18 | 1.20 | 1.21 | 1.24 | 1.25 |
| Humidity % | | | | | |
| Min | 44.50 | 43.00 | 39.50 | 44.50 | 43.00 |
| Max | 99.50 | 100.00 | 100.00 | 100.00 | 68.00 |
| Ave Hum. | 90.96 | 94.08 | 93.00 | 94.99 | 57.00 |
| S.D. | 11.01 | 11.94 | 12.58 | 10.81 | 5.50 |

Experiment 10 Average Ethylene and Carbon Dioxide Levels over 4 Days

| $C_2H_4$ in ppm (parts per | Ave. reading | $CO_2$ in % | Ave. reading |
|---|---|---|---|
| #3 | 8.25 | #3 | 0.36 |
| #4 | 7.5 | #4 | 0.36 |
| #8 | 11.25 | #8 | 0.41 |
| RR | 14.25 | RR | .55 |

Experiment 10 Taste Test Results 2 new Bartlett, 2 Packhams from Exp. 9 (indicated by "P")

| | Flavor | Texture | Average | |
|---|---|---|---|---|
| Day 3-Tester 1 | | | | |
| #3-P | 3.5 | 2.75 | 3.125 | too soft |
| | 2.75 | 2.75 | 2.75 | |
| P | 3.5 | 2.75 | 3.125 | too soft |
| | 2.25 | 3 | 2.625 | no flavor |
| #4 | 2 | 2.5 | 2.25 | |
| | 2 | 2.5 | 2.25 | |
| P | 3 | 2.5 | 2.75 | |
| P | 3 | 2.5 | 2.75 | too soft |
| #8 | 2.5 | 3 | 2.75 | |
| | 3 | 3 | 3 | |
| | 3 | 3 | 3 | |
| P | 3 | 3 | 3 | too soft |
| Open-P | 3.5 | 2.5 | 3 | too soft |
| | 2.5 | 3 | 2.75 | |
| | 3 | 3 | 3 | |
| | 2 | 3 | 2.5 | bad, bitter |
| RR | 3.5 | 2.5 | 3 | too soft |
| | 3 | 3 | 3 | |
| | 2 | 3 | 2.5 | |
| | 3 | 3 | 3 | |
| Day 3-Tester 2 | | | | |
| #3 | 3 | 4 | 3.5 | |
| | 2.5 | 4 | 3.25 | |
| P | 3 | 2.5 | 2.75 | |
| P | 2.5 | 3 | 2.75 | |
| #4 | 3 | 4 | 3.5 | |
| | 3 | 4 | 3.5 | |
| P | 3.5 | 2.5 | 3 | |
| P | 3 | 2.5 | 2.75 | |
| #8 | 3 | 4 | 3.5 | |
| | 3 | 4 | 3.5 | slightly tart |
| | 2 | 2.5 | 2.25 | crunchy, not ready |
| | 2 | 2 | 2 | mushy |
| Open | 2 | 4 | 3 | tart |
| | 3 | 4 | 3.5 | |
| P | 3 | 2 | 2.5 | |
| P | 3 | 2 | 2.5 | |
| RR | 3.5 | 4 | 3.75 | |
| | 3.5 | 4 | 3.75 | |
| P | 3 | 3 | 3 | |
| P | 2.5 | 2.5 | 2.5 | |

TABLE 10-continued 1 new Bartlett (indicated by "B"), 2 new Packham

Day 5-Tester 1

| | | | | |
|---|---|---|---|---|
| #3 | 2.75 | 3 | 2.875 | little off, less flavorful |
| | 3.75 | 3 | 3.375 | |
| | 3.75 | 3 | 3.375 | |
| #4 B | 3.25 | 3 | 3.125 | |
| | 3.25 | 3 | 3.125 | little plain |
| | 2.75 | 3 | 2.875 | little sour |
| #8 B | 2.5 | 3 | 2.75 | |
| | 3.5 | 3 | 3.25 | good |
| | 3.25 | 3 | 3.125 | |
| Open | 2.5 | 3 | 2.75 | little off, less flavorful |
| | 3 | 3 | 3 | little flavorless |
| | 3.25 | 3 | 3.125 | |
| RR | 2.75 | 3 | 2.875 | |
| | 3.25 | 2.5 | 2.875 | little soft |
| | 3 | 3 | 3 | little unripe |

Day 5-Tester 2

| | | | | |
|---|---|---|---|---|
| #3 | 2 | 3 | 2.5 | |
| | 3 | 2.5 | 2.75 | sweet, juicy, little soft post-test flavor upgrade to 3.5 |
| | 2.5 | 3 | 2.75 | little tart |
| #4 | 3 | 3 | 3 | |
| | 3 | 3 | 3 | |
| | 3.5 | 3 | 3.25 | |
| #8 | 3 | 2.5 | 2.75 | juicy, little soft |
| | 3 | 3 | 3 | sweet, juicy, little soft |
| | 2 | 2 | 2 | not ripe, dry |
| Open | 2 | 2.5 | 2.25 | tart |
| | 3 | 3 | 3 | sweet juicy |
| | 2.5 | 2.5 | 2.5 | little tart, soft |
| RR | 2.5 | 2.5 | 2.5 | little tart, little soft |
| | 2 | 2 | 2 | too hard, dry |
| | 3 | 3 | 3 | sweet, juicy, little soft |

Second Aspect

According to a second separate aspect, a fruit ripener may comprise certain preferred rigid materials. In general, the materials and structure should maintain moisture around the fruit (this reduces the fruits' water loss and has a lubricating effect that protects the fruit from physical damage). The materials and structure should also maintain ethylene presence around the fruit (to facilitate ripening). The material and/or structure should also be substantially permeable to oxygen and carbon dioxide in order to maintain cellular respiration in the fruit and decrease ethylene generated "green soft."

According to this second aspect, the use of substantially transparent materials is preferred since they facilitate display and evaluation of fruit ripeness. According to one preferred embodiment of this second aspect, the fruit ripener is a substantially rigid vessel, comprising top and second display parts. Preferably, the ripener comprises a second display part (including a fruit support surface for ripening fruit) in which the second display part and most preferably its support surface for ripening fruit, are made at least in part of a carbon dioxide permeable material that is rigid or rigid upon deployment. Preferably the material has a carbon dioxide transmission rate that maintains the carbon dioxide content of the vessel at below 1% and most preferably approaches carbon dioxide levels in the atmosphere (about 0.03%) during ripening.

In another embodiment, the ripener surfaces may be made at least in part of a rigid oxygen gas permeable material such that oxygen gas levels in the vessel are maintained at greater than 10%, and most preferably approaches oxygen gas atmospheric levels (about 21%). Most preferably, the top and second display parts comprise a single rigid material that has both such oxygen and carbon dioxide transfer properties. Alternatively, the parts may each employ multiple materials to achieve both purposes, and need not employ the same material. In a preferred embodiment, all or part of the ripener surface may be textured to promote gas exchange. If more than one material is used, the transmission rates of the materials should take one another's gas transmission properties into consideration in order to achieve the internal gas equilibrium as close to atmospheric $O2$ and $CO2$ as possible.

As is known, these parameters may be balanced by using the variables that affect vessel atmosphere. For example by using:

$$PO2 = RRO2 * t * W/A * (O2\text{ atm} - O_2\text{ pkg})$$

$$PCO_2 = RRCO2 * t * W/A * (CO2\text{ pkg} - CO_2\text{ atm})$$

Where $PO_2$=Oxygen permeability of the container material (ml-mil/m2-day-atm)

$PCO_2$=Carbon dioxide permeability of the container material (ml-mil/m2-day-atm)

RRO2=Respiration rate as product consumption of $O_2$ (ml/kg-hr)

RRCO2=Respiration rate as product production of $CO_2$ (ml/kg-hr)

t=material thickness

W=product weight (kg)

A=material surface area

Certain polymer materials are preferred. By way of example, Dow Chemical Co. (Insite™) and Exxon Chemical Co. (Exxpol™) use a single site catalyst to produce polymer resins, namely polyolefins, with reduced distribution of polymer chain length, molecular weight and density. These single site polymer resins and plastics (whether or not a mettalocene catalyst) may be used in place of glass and polymethyl methacrylate. Dow offers polyolefin plastomers (POP's) suitable for injection molding, or blow molding (if thinner walls are desired). The Dow and Exxon technologies can produce clear polymers with very high oxygen transmission rates (OTR's) and low moisture vapor transmission rates. Micro-perforated and micro-porous materials that provide high OTR's and/or high carbon dioxide permeability and that are substantially rigid may also be used. Fluorosilicone acrylics and silicone acrylics, including those used for rigid gas permeable contact lenses, are also commercially available with very high OTR's. Alternatively, the parts and surfaces may be made all or in part of gas permeable materials that are substantially rigid upon deployment.

In a preferred embodiment, the ripener is substantially impermeable to water vapor and ethylene gas. Most preferably, the ripener has low permeability to ethylene gas and water vapor such that ethylene (relative density 0.979) builds up in the vessel and the vessel humidity is between 90% and 95% during ripening. However, a wider range of humidities, such as between 50%-100% or 85%-97%, may be used to less desired effect.

Figure 58:
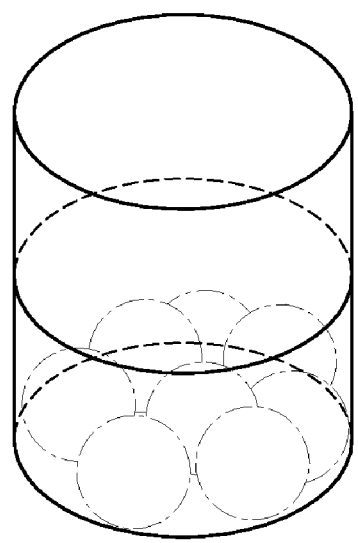
FIG. 58 is a perspective view of an apparatus for fruit display.
Figure 59:
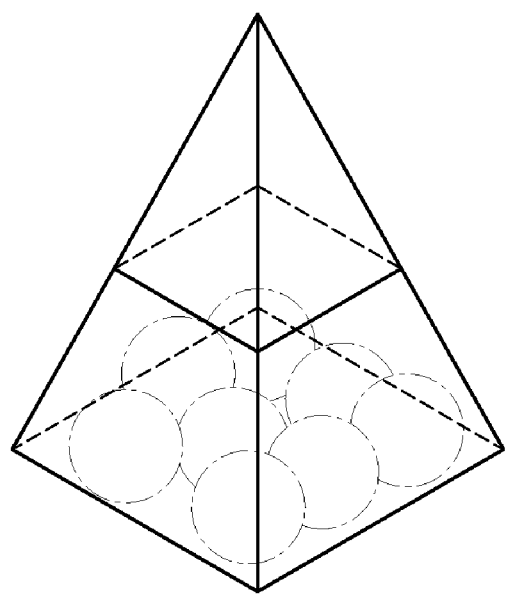
FIG. 59 is a perspective view of an apparatus for fruit display.

Since the preferred ripener according to this second aspect has reduced dependency on air-flow patterns for gas exchange and distribution, it may readily take on many different and unusual shapes without unduly limiting performance. Thus, in addition to being used in the ripeners of the first aspect, the materials of the second aspect may be used to form a ripener of any shape, such as a tubular column or a pyramid, as shown in FIGS. 58-59. Instead of the macro-opening of the first aspect, the displays gas exchange area could alternatively be formed by the oxygen permeable materials of the second aspect, but preferably would ensure comparable gas exchange.

In all second aspect embodiments, the rigid gas permeable materials are preferably at least on the bottom of the vessel and one other surface of the ripener. Most preferably, the second display part is elevated, such as by using feet, to allow gas transfer under the vessel's bottom. All or part of the ripener surface may be textured to promote gas exchange by increasing its surface area. In lieu of or in addition to separable parts, as shown, the vessel may contain at least one fruit access portion (such as a removable surface or a hinged door) so that fruit may be placed inside and taken from the vessel.

Third Aspect

Figure 60:
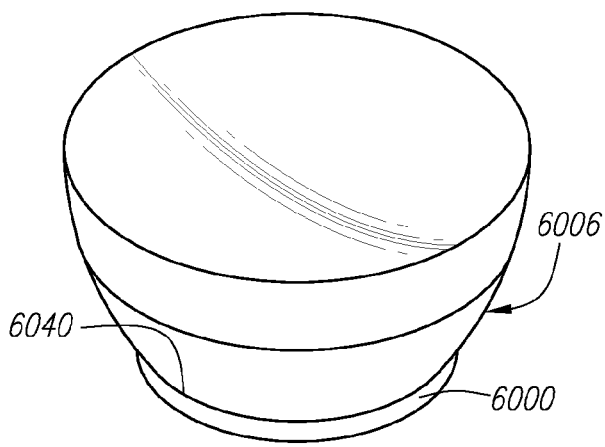
FIG. 60 is a perspective view of an apparatus for fruit display.
Figure 61:
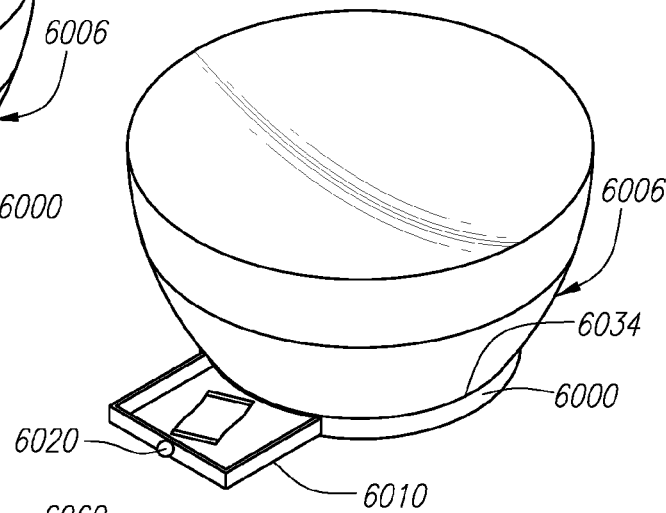
FIG. 61 is a perspective view of an apparatus for fruit display.

According to a third separate aspect, shown by way of example in FIGS. 60-61, the ripener comprises one or more ripening agent holders and may receive a ripening agent (or a ripening agent unit comprising a ripening agent). A ripening agent is a material that is or gives off a chemical that promotes ripening, and includes solid materials that have absorbed or adsorbed a ripening agent solution. This third aspect may be used in connection with the other aspects, or separately from them, but is particularly complementary to the first aspect, since the use of an additional ripening agent accelerates fruit ripening and thus increases the need to control ripening rates by employing the second support surface for ripening fruit.

Although ripening agents including ripening solids (including Zeolite, paper, or foam, soaked in a ripening solution) can be directly placed with fruit inside a container and loosely covered by a plastic sheet, in a reusable ripener it is difficult to replace these solids and the user may have to open the chamber extensively to air, remove the fruit, and/or directly handle the ripening agent.

The third aspect has two parts. According to a first part of the third aspect, the ripener comprises a vessel—having a chamber that will directly contain the fruit—and a holder. The ripener may be of unibody construction or formed by attachment. Preferably, the ripener comprises a holder located outside the vessel chamber. Most preferably, the vessel chamber need not be opened to access the holder or replace the ripening agent.

In one preferred embodiment according to the first part of the third aspect, shown in FIG. 60, a vessel base 6000 comprises a holder having one or more compartments that may receive a ripening agent (or ripening agent unit comprising a ripening agent). The top of the vessel base (which may comprise the bottom of the fruit platform 6040) is at least in part ripening agent permeable. The vessel base is the structure that supports the vessel while it is resting on another surface. In this embodiment, the vessel base 6000 is detachable from the second display part 6006 to facilitate replacement or refreshment of the ripening agent. For example, the vessel base 6000 may comprise screw threads or snap portions so that it may detach from the second display part 6006.

Figure 62:
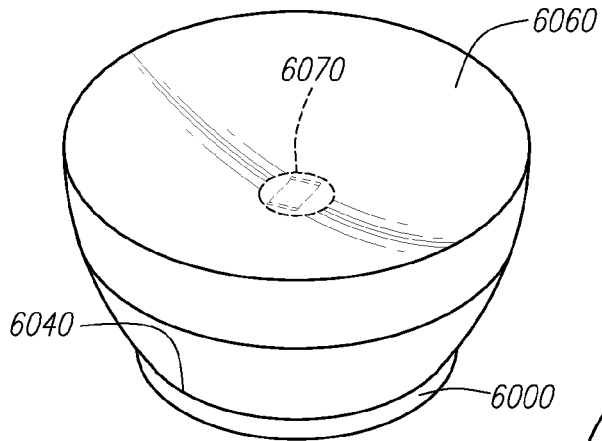
FIG. 62 is a perspective view of an apparatus for fruit display.

Alternatively or additionally, as shown in FIG. 61, the vessel base 6000 may comprise a compartment access portion, such as a tray 6010, having knob 6020, to facilitate replacement or refreshment of the ripening agent. Although, as shown in FIGS. 60-61, the holder is preferably outside the fruit vessel chamber, in an alternate embodiment, shown in FIG. 62, the first display part may comprise at least one holder 6070 (preferably having at least one compartment) that is attached to the underside of fruit platform 6060. The vessel base and the vessel may be of unibody construction. Although the ripening agent unit is shown loose in a holder including a compartment, the holder preferably secures the ripening agent or ripening agent unit to the ripener.

According to a second part of the third aspect, a ripening agent unit comprises a ripening solid and a casing. Preferably, the ripening agent unit is pre-loaded so the user does not need to directly handle the ripening agent. Although rigid or semi-rigid casings are preferred, the ripening solid may alternatively be encased in a soft or flexible casing, such as a mesh, that is at least in part permeable to the ripening solid's ripening agent, and most preferably is substantially permeable to the agent. The ripening solid preferably comprises a non-respiring and, most preferably, inorganic material.

In a preferred method according to the second part of the third aspect, the user receives the ripening agent unit comprising a ripening solid and a casing. Most preferably, the ripening agent unit has been pre-loaded with the ripening agent so that the user does not need to directly handle the ripening solid prior to use. The user then places the ripening agent unit in the holder so that the unit is held by the holder, and preferably is attached to it.

The first and second parts of the third aspect may be beneficially combined. In a preferred embodiment, the ripener comprises a vessel chamber that will directly contain the fruit and a holder that will receive a ripening agent unit. The ripening agent unit itself may comprise a ripening agent and casing, and is preferably in the form of a cartridge. A cartridge is defined as a ripening agent unit including a casing contoured to be securely received by a holder. For cartridge embodiments, the holder comprises a receptacle contoured to securely accept the cartridge. To achieve sustained release of the ripening agent, the cartridge preferably comprises a ripening solid and a casing. More preferably, the ripening solid is a non-respiring material, and, still more preferably, an inorganic material (such as polyethylene foam, polyurethane foam, or rubber foam) impregnated with an ethylenic agent, such as a halide of ethylene. Still more preferably, the ripening solid comprises polyethylene foam impregnated with ethylene-dichloride or 2-chlorothylphosphonic acid (in about 3-4% aqueous solution) or, less preferably, acetylene in a non-flammable form. Finally, the user preferably receives replacements for ripening units in a closed, non-gas permeable container.

Figure 63:
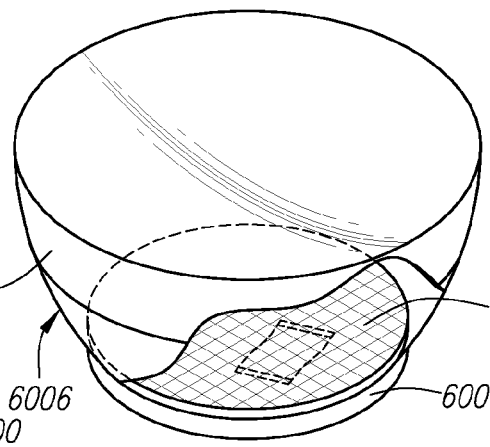
FIG. 63 is a perspective cut away view of an apparatus for fruit display.

As shown in FIG. 63, the second display part 6006 may comprise an integral vessel base 300. Preferably the vessel base is permeable to carbon dioxide gas. In contrast with the embodiment of FIG. 60, the ripening agent (or ripening agent unit) is replaced by removing fruit support surface for ripening fruit 6040 and placing the ripening agent in the vessel base 6000.

Figure 64:
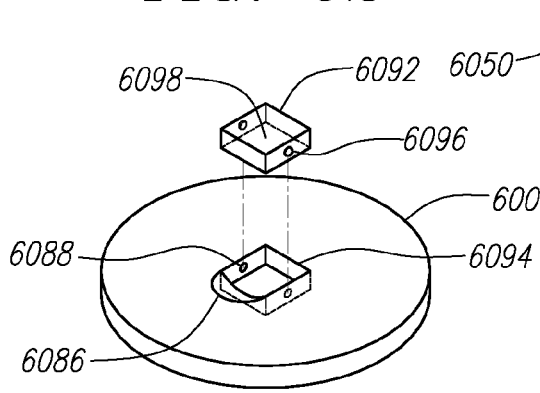
FIG. 64 is a perspective view of a base and a cartridge.

In another, more preferred embodiment, the ripening agent unit may be secured from the underside of the vessel base 6000. By way of example, FIG. 64 shows the underside of vessel base 6000, having a holder, ripening agent unit receptacle 6094, to which the ripening agent unit attaches. The ripening agent unit is cartridge 6092, which has tabs 6096 that fit into indented portions 6088 of the receptacle. The vessel base has a depressed area 6086 adjoining the receptacle 6094 so that the inserted cartridge may be lifted out of the receptacle using a finger. Most preferably, the bottom 6098 of cartridge 6092 is not permeable to the ripening agent, so that the agent principally rises toward the fruit chamber when the cartridge is deployed in the base. Preferably the top of the vessel base 6000 is the underside of the second display part platform (not shown), whose surface is preferably permeable to the ripening agent.

Although FIG. 64 shows the ripening agent unit receptacle 6094 located on the underside of vessel base 6000, alternately the receptacle may be located in the side of the vessel base, or in other parts of the ripener. Preferably, for ripening agents lighter than air, the receptacle should be at or lower than the fruit chamber's mid-point, and more preferably, beneath the fruit chamber itself. For ripening agents heavier than air, the receptacle should be higher than the fruit chamber mid-point, and more preferably, above the chamber itself.

Although FIG. 64 shows the ripening agent unit as a cartridge, other ripening units may be used. Further, the ripening agent unit or units can be manually removed from the contoured holder receptacle and replaced by a new unit or units, or they may be refreshed and replaced. Alternatively, the ripening agent unit may be placed directly in the fruit vessel, with or without use of a holder.

In a variation on the third aspect, the parts and surfaces of the fruit ripener themselves may be ripening solids, and preferably can be removed and replaced, or refreshed and redeployed (such as by soaking in known ethylene-producing liquids or sprays). For example, the second display part's fruit platform of FIG. 63 may itself comprise a ripening solid that may be removed and replaced. Likewise, the base 6000 itself or any other ripener surface or part thereof may comprise a ripening solid such that it may be removed and replaced. Thus, the ripener's structural elements may function as ripening agents units.

In an alternate embodiment, the ripening agent may be directly introduced to the ripener chamber or ripener holder as a liquid or gel rather than as part of a unit. As with other ripeners, less preferably, the ripening agent may be delivered to the ripener using compressed ripening gas.

Fourth Aspect

Figure 65:
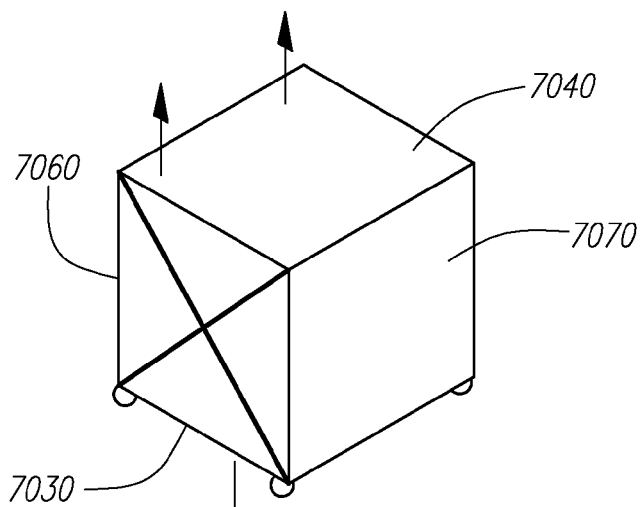
FIG. 65 is a perspective view of a ripener.
Figure 66:
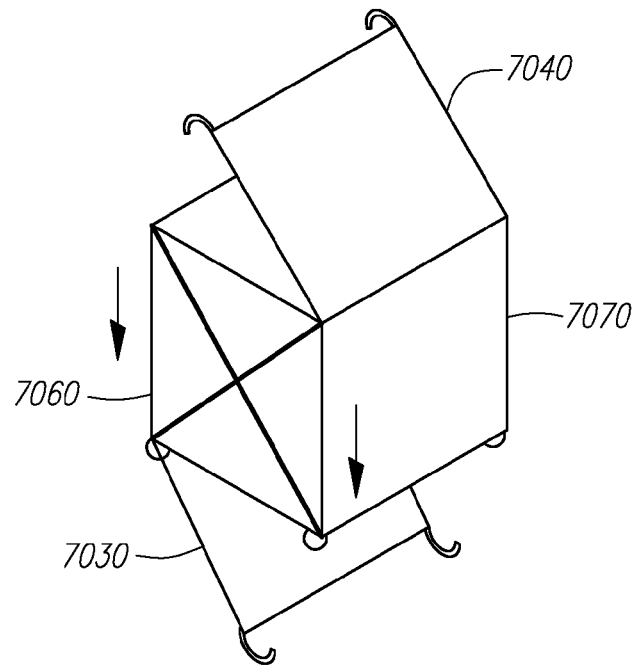
FIG. 66 is a perspective view of the ripener of FIG. 65 preparing to collapse.

According to a fourth aspect, the ripener comprises a skin attached to a structural skeleton. The structural skeleton may be an endoskeleton or an exoskeleton, which may articulate. Preferably, the skin comprises substantially oxygen and carbon dioxide permeable material. Alternately or additionally the skin may be ventilated such that ethylene and moisture are substantially retained, but carbon dioxide and oxygen are substantially transmitted. The skin is preferably transparent for fruit viewing and preferably foldable. It may also be foldable and elastic. The ripener may comprise two fruit support surface for ripening fruits and is preferably at least partially collapsible. In FIG. 65 the ripener comprises a first fruit platform 7030 and a second fruit platform 7040. The second fruit platform 7040 is hooked to the top of the ripener's side wall 7060, but may be detached and be rotated about the top of the other side wall 7070, to which it is hinged, as shown in FIG. 66. Likewise, the first fruit platform 7030 may be detached from side wall 7070 and rotated about the bottom of the side wall 7060, to which it is hinged. With both platforms detached from their respective opposite side walls, the X-shaped skeleton will collapse and the ripener will flatten.

Figure 67:
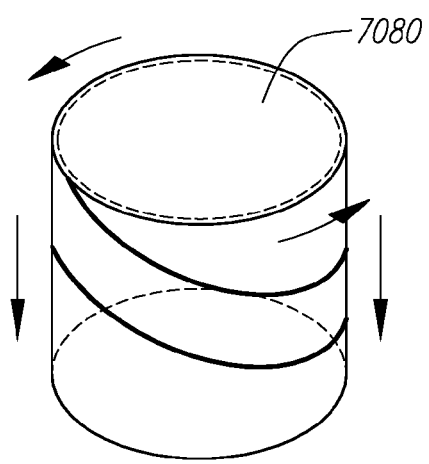
FIG. 67 is a perspective view of a ripener.
Figure 68:
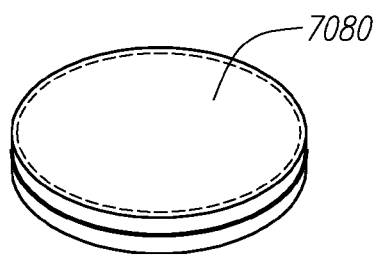
FIG. 68 is a perspective view of the ripener of FIG. 67 in collapsed state.

In an alternate set of embodiments according to the fourth aspect, shown by way of example in FIGS. 67-68, rather than comprising articulating joints, the ripener is an integral collapsible unit with at least two repeatable, stable configurations. According to this embodiment, the unit may comprise an access portion, such as a zippered flap 7080, for placing and removing fruit. In accordance with the collapsible ripener embodiments, the skeleton may be tensioned with a spring, such as in collapsible utility containers made by Fiskars. Thus, the unit may readily collapse by inducing stress to part of the skeleton. Alternately, a collapsible skeleton may comprise a shape-memory material, such as nitinol, that can change shape at room temperature and/or upon stress-inducement.

Figure 69:
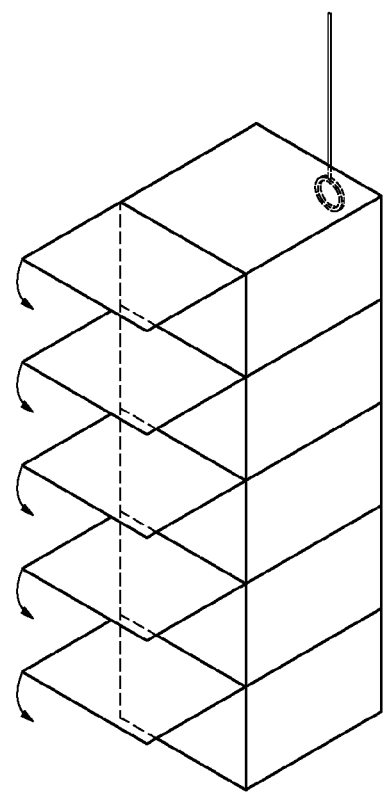
FIG. 69 is a perspective view of an apparatus for fruit display.

In a preferred embodiment, shown in FIG. 69, the ripener may be hung from a wall. The ripener is preferably made of a foldable material, which is most preferably substantially oxygen and carbon dioxide permeable. The ripener may have multiple access portions, such as flaps. As shown, the flaps may fold into the fruit compartments for purposes of collapsing the ripener.

Fifth Aspect

According to the fifth separate aspect, the ripener comprises one or more fruit support surfaces having fruit guides. Thus, according to this separate aspect, the fruit support surfaces, including ones that are all or partly flat, may beneficially comprise one or more fruit guides to reduce fruit rolling and increase stability. The fruit guides may comprise surface tabs, ridges, pits, dips or any other surface feature that provides lateral support for the fruit (inhibits lateral motion). This aspect may be combined with any of the other aspects, and may be used in connection with non-gas permeable ripener materials, such as glass or polymethyl methacrylate, or gas permeable ripener materials.

Sixth Aspect

Figure 70:
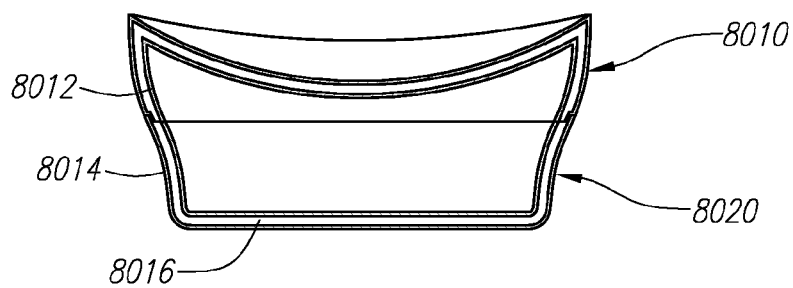
FIG. 70 is a cross-section view of an apparatus for fruit display having a double wall.

According to a sixth, separate aspect, the ripener comprises a substantially rigid double wall in at least one of its parts. By way of example, FIG. 70 shows a first display part 8010 comprising a double wall including an oxygen permeable inner wall 8012. Likewise, second display part 8020 has a substantially rigid double wall, including a carbon dioxide permeable inner wall. The outer wall 8014 may be ventilated or made from gas permeable materials. The walls may be separated by an air gap 8016.

Figure 71:
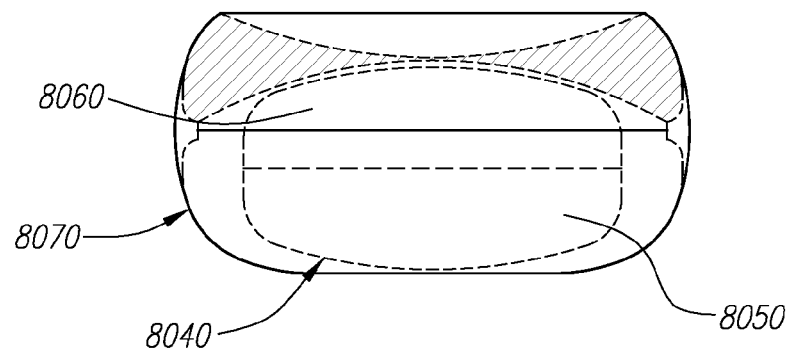
FIG. 71 is a side elevation view of an apparatus for fruit display having an insert.

Alternatively, in a preferred embodiment, the double wall includes an inner wall formed by substantially rigid inset container 8040. This permits carbon dioxide and oxygen exchange, but helps trap water vapor and ethylene. The inner wall may be colored, or otherwise patterned, and may be replaceable to change the ripener's color. The inset comprises bottom inset part 8050 and top inset part 8060. In the preferred embodiment, the outer wall 8070 may be made of glass or non-permeable plastic, such as polymethyl methacrylate. In both FIGS. 70-71 the outer wall is preferably ventilated to allow oxygen and carbon dioxide transfer. Preferably, the top portion of the inset comprises an oxygen permeable material. Likewise the second display part of the inset portion preferably comprises a carbon dioxide permeable material. The underside of the ripener's second display part (not shown) is preferably ventilated to allow carbon dioxide exchange with the atmosphere. In this way, the ripener achieves proper gas exchange, maintenance and circulation. According to this sixth aspect, the double wall may also comprise an insulating layer between the inner and outer walls. Preferably the insulating layer comprises an air gap, which preferably circulates air to and from the vessel chamber.

In accordance with the embodiments disclosed herein, for any aspect, the interior of the ripener can be coated with an anti-fog coating, such as a register coating, in order to provide better visibility for the fruit and to prevent water droplets from forming. Alternately, the anti-fog compound may be included in the material itself in a manner that causes it to migrate to the material's inner surface. Thus, for example, a glass, polymethyl methacrylate or other non-gas permeable material vessel, or an oxygen or carbon dioxide permeable material, may be coated with an anti-fog coating, such as a register coating, or have an anti-fog compound included in the material itself in a manner that causes it to migrate to the material's inner surface. Likewise, for any embodiment disclosed herein, the ripener may comprise a heater and/or a temperature monitor. A fan may also be added to the embodiments to increase circulation and promote gas exchange.

We claim:

1. An apparatus for fruit ripening and display whereby fruit ripening is substantially accelerated comprising
 a) two or more display parts wherein
  the size of said two or more display parts permits them to fit entirely on a countertop two feet long by two feet wide when combined;
 b) one or more chambers for retaining ripening gas formed at least in part by the combination of two or more of the display parts wherein
  i) at least one of said one or more of the chambers has one or more walls comprising gas impermeable material and is ventilated by at least two vents sufficient for one or more of the chambers to retain an effective amount of ripening gas a day after one or more of the chambers are filled substantially full of ripening gas-producing fruit whereby fruit ripening is substantially accelerated;
  ii) at least one or more chambers for retaining fruit ripening gas are substantially hemispherical or substantially ellipsoidal; and
 c) two or more support surfaces for ripening fruit wherein
  i) one or more of said two or more display parts comprise at least part of one of the two or more support surfaces for ripening fruit;
  ii) one or more of said two or more display parts comprise at least part of another of the two or more support surfaces for ripening;
  iii) at least one of the aforesaid support surfaces for ripening fruit is enclosed inside one or more chambers for retaining fruit ripening gas when one or more of the chambers are formed at least in part by combination of two or more of the display parts;
  iv) at least one of the one or more support surfaces for ripening fruit is located outside of the one or more chambers for retaining ripening gas when one or more of the chambers are formed at least in part by combination of two or more of the display parts;
  v) at least one of the one or more support surfaces for ripening fruit that are located outside of the one or more chambers for retaining ripening gas when one or more of the chambers are formed at least in part by combination of two or more of the display parts is at least in part concave and at least in part inwardly sloped.

2. The apparatus of claim 1 wherein the display parts form a single substantially hemispherical or substantially ellipsoidal chamber.

3. The apparatus of claim 1 wherein the outside and inside support surfaces are different.

4. The apparatus of claim 1 wherein the effective amount of ripening gas is greater than 4 parts per million of ethylene one day after one or more of the chambers is substantially filled with fruit that gives off ripening gas and kept at an average room temperature of about 70 degrees Fahrenheit and an average relative humidity of about 70%.

5. The apparatus of claim 1 wherein the effective amount of ripening gas is greater than 10 parts per million of ethylene one day after one or more of the chambers is substantially filled with fruit that gives off ripening gas and kept at an average room temperature of about 70 degrees Fahrenheit and an average relative humidity of about 70%.

6. The apparatus of claim 1 wherein at least one of the one or more support surfaces located outside of the one or more chambers for retaining ripening gas comprises a fruit guide.

7. The apparatus of claim 6 wherein at least one of the one or more chambers comprises a bottom having one or more vents.

8. The apparatus of claim 1 wherein at least one of the one or more support surfaces located outside of the one or more chambers for retaining ripening gas comprises a vent insert.

9. An apparatus for fruit display whereby fruit ripening is substantially accelerated comprising
 a) two or more display parts wherein
  the size of said two or more display parts permits them to fit entirely on a countertop two feet long by two feet wide when the display parts are combined;
 b) one or more chambers for retaining ripening gas wherein
  i) one or more of the chambers are formed at least in part by the combination of two or more of the display parts
  ii) at least one of said one or more of the chambers has one or more walls comprising gas impermeable material and is ventilated sufficient for one or more of the chambers to retain ripening gas a day after one or more of the chambers are filled substantially full of ripening gas producing fruit whereby fruit ripening is substantially accelerated;
 c) two or more support surfaces for ripening fruit wherein
  i) one or more of said two or more display parts comprise at least part of one of the two or more support surfaces for ripening fruit;
  ii) at least one support surface for ripening fruit is enclosed inside one or more chambers for retaining fruit ripening gas when the one or more of the chambers are formed at least in part by combination of two or more of the display parts;
  iii) one or more support surfaces for ripening fruit are located outside of the one or more chambers for retaining ripening gas when one or more of the chambers are formed by at the combination of two or more of the display parts;
  iv) one or more of the support surfaces for ripening fruit that are located outside of the one or more chambers for retaining ripening gas when one or more of the chambers are formed at least in part by the combination of two or more of the display parts are at least in part concave and at least in part inwardly sloped; and
  v) one or more of the support surfaces for ripening fruit that are located outside of the one or more chambers for retaining ripening gas when one or more of the chambers are formed at least in part by two or more of the display parts comprises vents for one or more of the chambers.

10. The apparatus for display of claim 9 where the vents are not on the same level as the surrounding support surface.

11. The apparatus for display of claim 9 wherein the vents are lower than their surrounding support surface such that fruit tends not to cover the vents when placed on the support surface.

12. The apparatus for display of claim 9 wherein one or more of the support surface comprises a vent insert that further comprises the vents.

13. The apparatus for display of claim 9 wherein one or more of the support surfaces for ripening fruit that are located outside of the one or more chambers for retaining ripening gas when the chambers are formed by at least the first and second parts comprises vents for one or more of the chambers, where the vents are on the same level as their surrounding support surface area, and further comprises a fruit guide.

14. The apparatus for display of claim 13 wherein the fruit guide is a support surface feature.

15. The apparatus of claim 14 wherein the outside and inside support surfaces are different.

16. The apparatus of claim 13 further comprising one or more base parts that have a recessed portion on their internal circumferences that allows gas exchange with the outer atmosphere.

17. The apparatus of claim 9 wherein the chamber is ventilated such that the ripening gas in the chamber is greater than 4 parts per million of ethylene one day after one or more of the chambers is substantially filled with fruit that gives off ripening gas and kept at an average room temperature of about 70 degrees Fahrenheit and an average relative humidity of about 70%.

18. The apparatus of claim 17 wherein the chamber is ventilated with at least one vent insert.

19. The apparatus of claim 17 wherein the outside and inside support surfaces are different.

20. The apparatus of claim 19 wherein at least one of the two or more display parts are made substantially out of glass.

21. The apparatus of claim 20 wherein the chamber is ventilated with at least one vent insert.

22. The apparatus of claim 20 wherein the display parts are partially separated.

23. The apparatus of claim 9 wherein one or more of said two or more display parts comprises feet.

24. The apparatus of claim 9 wherein at least one of the one or more support surfaces located outside of the one or more chambers for retaining ripening gas comprises a fruit guide.

25. The apparatus of claim 24 wherein at least one of the one or more chambers comprises a bottom having one or more vents.

26. An apparatus for fruit display comprising
a) two or more display parts wherein
   the size of said two or more display parts permits them to fit entirely on a countertop two feet long by two feet wide when the display parts are combined;
b) one or more chambers for retaining ripening gas wherein
   i) one or more of the chambers are formed at least in part by the combination of two or more of the display parts
   ii) at least one of said one or more of the chambers has one or more walls comprising gas impermeable material and is ventilated sufficient for one or more of the chambers to retain ripening gas for substantially accelerated fruit ripening a day after one or more of the chambers are filled substantially full of ripening gas producing fruit;
c) two or more support surfaces for ripening fruit wherein
   i) one or more of said two or more display parts comprise at least part of one of the two or more support surfaces for ripening fruit;
   ii) at least one support surface for ripening fruit is enclosed inside one or more chambers for retaining fruit ripening gas when the one or more of the chambers are formed at least in part by combination of two or more of the display parts;
   iii) one or more support surfaces for ripening fruit are located outside of the one or more chambers for retaining ripening gas when one or more of the chambers are formed by at the combination of two or more of the display parts;
   iv) one or more of the support surfaces for ripening fruit that are located outside of the one or more chambers for retaining ripening gas when one or more of the chambers are formed at least in part by the combination of two or more of the display parts are at least in part concave and at least in part inwardly sloped; and
   v) one or more of the support surfaces for ripening fruit that are located outside of the one or more chambers for retaining ripening gas when one or more of the chambers are formed at least in part by two or more of the display parts comprises a vent insert that comprises vents for one or more of the chambers.

27. An apparatus for fruit display comprising
a) two or more display parts wherein
   the size of said two or more display parts permits them to fit entirely on a countertop two feet long by two feet wide when the display parts are combined;
b) one or more chambers for retaining ripening gas wherein
   i) one or more of the chambers are formed at least in part by the combination of two or more of the display parts
   ii) at least one of said one or more of the chambers has one or more walls comprising gas impermeable material and is ventilated sufficient for one or more of the chambers to retain ripening gas for substantially accelerated fruit ripening a day after one or more of the chambers are filled substantially full of ripening gas producing fruit;
c) two or more support surfaces for ripening fruit wherein
   i) one or more of said two or more display parts comprise at least part of one of the two or more support surfaces for ripening fruit;
   ii) at least one support surface for ripening fruit is enclosed inside one or more chambers for retaining fruit ripening gas when the one or more of the chambers are formed at least in part by combination of two or more of the display parts;
   iii) one or more support surfaces for ripening fruit are located outside of the one or more chambers for retaining ripening gas when one or more of the chambers are formed by the combination of two or more of the display parts;
   iv) one or more of the support surfaces for ripening fruit that are located outside of the one or more chambers for retaining ripening gas when one or more of the chambers are formed at least in part by the combination of two or more of the display parts are at least in part concave and at least in part inwardly sloped;
   v) and one or more of the support surfaces for ripening fruit that are located outside of the one or more chambers for retaining ripening gas when one or more of the chambers are formed at least in part by two or more of the display parts comprises vents for one or more of the chambers where the vents are on the same level as their surrounding support surface area, and further comprises a fruit guide.

28. The apparatus for fruit display of claim 27 wherein the fruit guide is a support surface feature.

29. The apparatus for fruit display of claim 28 wherein the outside and inside support surfaces are different.

30. The apparatus for fruit display of claim 27 further comprising one or more base parts which have a recessed portion on their internal circumferences that allows gas exchange with the outer atmosphere.

31. An apparatus for fruit display comprising
a) two or more display parts wherein
the size of said two or more display parts permits them to fit entirely on a countertop two feet long by two feet wide when the display parts are combined;
b) one or more chambers for retaining ripening gas wherein
i) one or more of the chambers are formed at least in part by the combination of two or more of the display parts
ii) at least one of said one or more of the chambers has one or more walls comprising gas impermeable material and is ventilated sufficient for one or more of the chambers to retain ripening gas for substantially accelerated fruit ripening a day after one or more of the chambers are filled substantially full of ripening gas producing fruit;
c) two or more support surfaces for ripening fruit wherein
i) one or more of said two or more display parts comprise at least part of one of the two or more support surfaces for ripening fruit;
ii) at least one support surface for ripening fruit is enclosed inside one or more chambers for retaining fruit ripening gas when the one or more of the chambers are formed at least in part by combination of two or more of the display parts;
iii) one or more support surfaces for ripening fruit are located outside of the one or more chambers for retaining ripening gas when one or more of the chambers are formed by at the combination of two or more of the display parts;
iv) one or more of the support surfaces for ripening fruit that are located outside of the one or more chambers for retaining ripening gas when one or more of the chambers are formed at least in part by the combination of two or more of the display parts are at least in part concave and at least in part inwardly sloped;
v) one or more of the support surfaces for ripening fruit that are located outside of the one or more chambers for retaining ripening gas when one or more of the chambers are formed at least in part by two or more of the display parts comprises vents for one or more of the chambers; and
vi) wherein the chamber is ventilated such that the ripening gas in the chamber is greater than 4 parts per million of ethylene one day after one or more of the chambers is substantially filled with fruit that gives off ripening gas and kept at an average room temperature of about 70 degrees Fahrenheit and an average relative humidity of about 70%, and wherein the chamber is ventilated with at least one vent insert.

32. An apparatus for fruit display comprising
a) two or more display parts wherein
the size of said two or more display parts permits them to fit entirely on a countertop two feet long by two feet wide when the display parts are combined;
b) one or more chambers for retaining ripening gas wherein
i) one or more of the chambers are formed at least in part by the combination of two or more of the display parts
ii) at least one of said one or more of the chambers has one or more walls comprising gas impermeable material and is ventilated sufficient for one or more of the chambers to retain ripening gas for substantially accelerated fruit ripening a day after one or more of the chambers are filled substantially full of ripening gas producing fruit;
c) two or more support surfaces for ripening fruit wherein
i) one or more of said two or more display parts comprise at least part of one of the two or more support surfaces for ripening fruit;
ii) at least one support surface for ripening fruit is enclosed inside one or more chambers for retaining fruit ripening gas when the one or more of the chambers are formed at least in part by combination of two or more of the display parts;
iii) one or more support surfaces for ripening fruit are located outside of the one or more chambers for retaining ripening gas when one or more of the chambers are formed by at the combination of two or more of the display parts;
iv) one or more of the support surfaces for ripening fruit that are located outside of the one or more chambers for retaining ripening gas when one or more of the chambers are formed at least in part by the combination of two or more of the display parts are at least in part concave and at least in part inwardly sloped;
v) one or more of the support surfaces for ripening fruit that are located outside of the one or more chambers for retaining ripening gas when one or more of the chambers are formed at least in part by two or more of the display parts comprises vents for one or more of the chambers;
vi) and wherein at least one chamber is ventilated such that the ripening gas in the chamber is greater than 4 parts per million of ethylene one day after one or more of the chambers is substantially filled with fruit that gives off ripening gas and kept at an average room temperature of about 70 degrees Fahrenheit and an average relative humidity of about 70%, wherein two or more display parts are made substantially out of glass, wherein at least one outside and inside support surfaces are different, and wherein at least one chamber is ventilated by at least one vent insert.

33. An apparatus for fruit ripening and display whereby fruit ripening is substantially accelerated comprising
a) two or more display parts wherein
the size of said two or more display parts permits them to fit entirely on a countertop two feet long by two feet wide when combined;
b) one or more chambers for retaining ripening gas are formed at least in part by the combination of two or more of the display parts wherein
i) at least one of said one or more of the chambers has one or more walls comprising gas impermeable material and is ventilated by at least two vents sufficient for one or more of the chambers to retain an effective amount of ripening gas a day after one or more of the chambers are filled substantially full of ripening gas-producing fruit whereby fruit ripening is substantially accelerated;

ii) at least one or more chambers for retaining fruit ripening gas are substantially hemispherical; and c) two or more support surfaces for ripening fruit wherein
i) one or more of said two or more display parts comprise at least part of one of the two or more support surfaces for ripening fruit;
ii) one or more of said two or more display parts comprise at least part of another of the two or more support surfaces for ripening;
iii) at least one of the aforesaid support surfaces for ripening fruit is enclosed inside one or more chambers for retaining fruit ripening gas when one or more of the chambers are formed at least in part by combination of two or more of the display parts;
iv) at least one of the one or more support surfaces for ripening fruit is located outside of the one or more chambers for retaining ripening gas when one or more of the chambers are formed at least in part by combination of two or more of the display parts;
v) at least one of the one or more support surfaces for ripening fruit that are located outside of the one or more chambers for retaining ripening gas when one or more of the chambers are formed at least in part by combination of two or more of the display parts is at least in part concave and at least in part inwardly sloped.

34. The apparatus for display of claim 33 wherein the two or more display parts at least in part form a single substantially hemispherical chamber.

35. The apparatus for display of claim 33 wherein there are two display parts.

36. The apparatus for display of claim 33 wherein the effective amount of ripening gas is greater than 4 parts per million of ethylene one day after one or more of the chambers is substantially filled with fruit that gives off ripening gas and kept at an average room temperature of about 70 degrees Fahrenheit and an average relative humidity of about 70%.

37. The apparatus for display of claim 34 wherein the effective amount of ripening gas is greater than 10 parts per million of ethylene one day after one or more of the chambers is substantially filled with fruit that gives off ripening gas and kept at an average room temperature of about 70 degrees Fahrenheit and an average relative humidity of about 70%.

38. An apparatus for fruit ripening and display whereby fruit ripening is substantially accelerated comprising
a) two or more display parts wherein
the size of said two or more display parts permits them to fit entirely on a countertop two feet long by two feet wide when combined;
b) one or more chambers for retaining ripening gas formed at least in part by the combination of two or more of the display parts wherein
i) at least one of said one or more of the chambers has one or more walls comprising gas impermeable material and is ventilated by at least two vents sufficient for one or more of the chambers to retain an effective amount of ripening gas a day after one or more of the chambers are filled substantially full of ripening gas-producing fruit whereby fruit ripening is substantially accelerated;
ii) at least one or more chambers for retaining fruit ripening gas are substantially spheroidal; and c) two or more support surfaces for ripening fruit wherein
i) one or more of said two or more display parts comprise at least part of one of the two or more support surfaces for ripening fruit;
ii) one or more of said two or more display parts comprise at least part of another of the two or more support surfaces for ripening;
iii) at least one of the aforesaid support surfaces for ripening fruit is enclosed inside one or more chambers for retaining fruit ripening gas when one or more of the chambers are formed at least in part by combination of two or more of the display parts;
iv) at least one of the one or more support surfaces for ripening fruit is located outside of the one or more chambers for retaining ripening gas when one or more of the chambers are formed at least in part by combination of two or more of the display parts;
v) at least one of the one or more support surfaces for ripening fruit that are located outside of the one or more chambers for retaining ripening gas when one or more of the chambers are formed at least in part by combination of two or more of the display parts is at least in part concave and at least in part inwardly sloped.

39. The apparatus for display of claim 38 wherein the two or more display parts at least in part form a single substantially spheriodal chamber.

40. The apparatus for display of claim 38 wherein there are two display parts.

41. The apparatus for display of claim 39 wherein the effective amount of ripening gas is greater than 4 parts per million of ethylene one day after one or more of the chambers is substantially filled with fruit that gives off ripening gas and kept at an average room temperature of about 70 degrees Fahrenheit and an average relative humidity of about 70%.

42. The apparatus for display of claim 38 wherein the effective amount of ripening gas is greater than 10 parts per million of ethylene one day after one or more of the chambers is substantially filled with fruit that gives off ripening gas and kept at an average room temperature of about 70 degrees Fahrenheit and an average relative humidity of about 70%.

43. An apparatus for fruit ripening and display whereby fruit ripening is substantially accelerated comprising
a) two or more display parts wherein
the size of said two or more display parts permits them to fit entirely on a countertop two feet long by two feet wide when combined;
b) one or more chambers for retaining ripening gas formed at least in part by the combination of two or more of the display parts wherein
i) at least one of said one or more of the chambers has one or more walls comprising gas impermeable material and is ventilated by at least two vents sufficient for one or more of the chambers to retain an effective amount of ripening gas a day after one or more of the chambers are filled substantially full of ripening gas-producing fruit whereby fruit ripening is substantially accelerated;
ii) at least one or more chambers for retaining fruit ripening gas are substantially ellipsoidal; and c) two or more support surfaces for ripening fruit wherein
i) one or more of said two or more display parts comprise at least part of one of the two or more support surfaces for ripening fruit;

ii) one or more of said two or more display parts comprise at least part of another of the two or more support surfaces for ripening;
iii) at least one of the aforesaid support surfaces for ripening fruit is enclosed inside one or more chambers for retaining fruit ripening gas when one or more of the chambers are formed at least in part by combination of two or more of the display parts;
iv) at least one of the one or more support surfaces for ripening fruit is located outside of the one or more chambers for retaining ripening gas when one or more of the chambers are formed at least in part by combination of two or more of the display parts;
v) at least one of the one or more support surfaces for ripening fruit that are located outside of the one or more chambers for retaining ripening gas when one or more of the chambers are formed at least in part by combination of two or more of the display parts is at least in part concave and at least in part inwardly sloped.

44. The apparatus for display of claim 43 wherein the two or more display parts at least in part form a single substantially ellipsoidal chamber.

45. The apparatus for display of claim 43 wherein there are two display parts.

46. The apparatus for display of claim 44 wherein the effective amount of ripening gas is greater than 4 parts per million of ethylene one day after one or more of the chambers is substantially filled with fruit that gives off ripening gas and kept at an average room temperature of about 70 degrees Fahrenheit and an average relative humidity of about 70%.

47. The apparatus for display of claim 43 wherein the effective amount of ripening gas is greater than 10 parts per million of ethylene one day after one or more of the chambers is substantially filled with fruit that gives off ripening gas and kept at an average room temperature of about 70 degrees Fahrenheit and an average relative humidity of about 70%.

* * * * *